United States Patent
Rahman et al.

(10) Patent No.: US 10,153,818 B2
(45) Date of Patent: Dec. 11, 2018

(54) LINEAR COMBINATION CODEBOOK FOR CSI REPORTING IN ADVANCED WIRELESS COMMUNICATION SYSTEMS

(71) Applicant: Samsung Electronics Co., Ltd., Suwon-si (KR)

(72) Inventors: Md. Saifur Rahman, Plano, TX (US); Eko Onggosanusi, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/650,715

(22) Filed: Jul. 14, 2017

(65) Prior Publication Data

US 2018/0034519 A1 Feb. 1, 2018

Related U.S. Application Data

(60) Provisional application No. 62/367,184, filed on Jul. 27, 2016, provisional application No. 62/371,663, (Continued)

(51) Int. Cl.
*H04B 7/0456* (2017.01)
*H04L 1/00* (2006.01)
*H04B 7/0452* (2017.01)
*G06F 17/16* (2006.01)

(52) U.S. Cl.
CPC ......... *H04B 7/0456* (2013.01); *H04B 7/0452* (2013.01); *H04L 1/0023* (2013.01); (Continued)

(58) Field of Classification Search
CPC ... H04B 7/0456; H04B 7/0452; H04L 1/0023; H04L 1/003; H04L 1/0029; G06F 17/16
See application file for complete search history.

(56) References Cited

U.S. PATENT DOCUMENTS

2014/0050280 A1* 2/2014 Stirling-Gallacher ...................... H04B 7/0486 375/296
2014/0254508 A1 9/2014 Krishnamurthy et al.
(Continued)

FOREIGN PATENT DOCUMENTS

WO 2014137772 A1 9/2014
WO 2016080743 A1 5/2016

OTHER PUBLICATIONS

International Search Report for International Application No. PCT/KR2017/008073, dated Nov. 23, 2017. (3 pages).
(Continued)

*Primary Examiner* — Dac Ha

(57) ABSTRACT

A method of a user equipment (UE) for a channel state information (CSI) feedback in an advanced communication system. The method comprises receiving, from a base station (BS), CSI feedback configuration information for a pre-coding matrix indicator (PMI) feedback based on a linear combination (LC) codebook, wherein the PMI comprises a first PMI ($i_1$) and a second PMI ($i_2$), determining the first PMI ($i_1$) and the second PMI ($i_2$) indicating an LC pre-coder that corresponds to a weighted linear combination of a first beam and a second beam, wherein the first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively; and the second PMI ($i_2$) indicates weights assigned to the first beam and the second beam. The method further comprises transmitting, to the BS, the CSI feedback over an uplink channel including the determined first PMI ($i_1$) and the second PMI ($i_2$).

20 Claims, 27 Drawing Sheets

Related U.S. Application Data filed on Aug. 5, 2016, provisional application No. 62/380,794, filed on Aug. 29, 2016, provisional application No. 62/397,103, filed on Sep. 20, 2016, provisional application No. 62/410,917, filed on Oct. 21, 2016, provisional application No. 62/417,797, filed on Nov. 4, 2016, provisional application No. 62/420,412, filed on Nov. 10, 2016, provisional application No. 62/423,234, filed on Nov. 17, 2016, provisional application No. 62/463,815, filed on Feb. 27, 2017.

(52) U.S. Cl.
CPC .............. *G06F 17/16* (2013.01); *H04L 1/003* (2013.01); *H04L 1/0029* (2013.01)

(56) References Cited

U.S. PATENT DOCUMENTS

| 2015/0270081 | A1* | 9/2015 | Hartl | ....................... | B60R 16/03 361/170 |
| 2016/0142117 | A1 | 5/2016 | Rahman et al. | | |
| 2018/0034612 | A1* | 2/2018 | Lin | ....................... | H04L 5/0048 |

OTHER PUBLICATIONS

Samsung, "Linear combination codebook and CSI reporting"; 3GPP TSG RAN WG1 Meeting #84bis; R1-162693; Busan, Korea, Apr. 11-15, 2016. (6 pages).

ZTE Corporation, et al., "Discussion on CSI reporting of linear combination codebook"; 3GPP TSG RAN WG1 Meeting #85; R1-165444; Nanjing, China May 23-27, 2016. (5 pages).

Samsung, "LC based explicit CSI feedback and simulation results"; 3GPP TSG RAN WG1 Meeting #85; R1-164781; Nanjing, China May 23-27, 2016. (10 pages).

"New WID Proposal: Enhancements on Full-Dimension (FD) MIMO for LTE," 3GPP TSG RAN Meeting #71, RP-160623, Goteborg, Sweden, Mar. 7-10, 2016, 8 pages.

"ETSI Technical Specification; LTE; Evolved Universal Terrestrial Radio Access (E-UTRA); Physical Channels and Modulation, (3GPP TS 36.211 Version 13.0.0 Release 13)," ETSI TS 136 211, V13.0.0, Jan. 2016, 143 pages.

"ETSI Technical Specification; LTE; Evolved Universal Terrestrial Radio Access (E-UTRA); Multiplexing and Channel Coding, (3GPP TS 36.212 Version 13.0.0 Release 13)," ETSI TS 136 212, V13.0.0, Jan. 2016, 123 pages.

"ETSI Technical Specification; LTE; Evolved Universal Terrestrial Radio Access (E-UTRA); Physical Layer Procedures, (3GPP TS 36.213 Version 13.0.0 Release 13)," ETSI TS 136 213, V13.0.0, May 2016, 328 pages.

"ETSI Technical Specification; LTE; Evolved Universal Terrestrial Radio Access (E-UTRA); Medium Access Control (MAC) Protocol Specification, (3GPP TS 36321 Version 13.0.0 Release 13)," ETSI TS 136 321, V13.0.0, Feb. 2016, 84 pages.

"ETSI Technical Specification; LTE; Evolved Universal Terrestrial Radio Access (E-UTRA); Radio Resource Control (RRC) Protocol Specification, (3GPP TS 36.331 Version 13.0.0 Release 13)," ETSI TS 136 321, V13.0.0, Jan. 2016, 670 pages.

\* cited by examiner

| # ports | Port layouts, and $(N_1, N_2)$ values | # ports | Port layouts, and $(N_1, N_2)$ values |
|---|---|---|---|
| 20 | (2,5) (1,10)<br>(5,2)<br>(10,1) | 28 | (2,7) (1,14)<br>(7,2)<br>(14,1) |
| 24 | (3,4) (2,6) (1,12)<br>(4,3)<br>(6,2)<br>(12,1) | 32 | (4,4) (2,8) (1,16)<br>(8,2)<br>(16,1) |

| Codebook-Config | Rank 1 beam group | |
|---|---|---|
| | $N_1 \geq N_2$ | $N_1 < N_2$ |
| 1 | | |
| 2 | | |
| 3 | | |
| 4 | | |

FIGURE 29

| Port layouts, Number of ports | Basis for LC codebook | | Number of beams ($L'$) |
|---|---|---|---|
| | $N_1 \geq N_2$ | $N_1 < N_2$ | |
| 1D, {4, 8, 16, 20, 24, 28, 32} ports | | - | {2, 4, 8, 10, 12, 14, 16} |
| 2D, {4, 8, 12, 16, 20, 24, 28, 32} ports | | | {4, 6, 8, 10, 12, 14, 16} |

FIGURE 32

| BGI or BI | Master beam group type | Option 0 | Option 1 |
|---|---|---|---|
| 0 | Non-orthogonal | | |
| 1 | | | |
| 2 | | | |
| 3 | | | |
| 4 | Orthogonal | | |
| 5 | | | |
| 6 | | | |
| 7 | | | |

FIGURE 30

| Codebook-Config | Port layouts, Number of ports | Basis for LC codebook $N_1 \geq N_2$ | Basis for LC codebook $N_1 < N_2$ | Number of beams (L') |
|---|---|---|---|---|
| 1 | 1D, 4 ports | (diagram: 2 beams at $0, O_1$) | - | 2 |
| 1 | 1D, 8 ports | (diagram: 4 beams at $0, O_1, 2O_1, 3O_1$) | - | 4 |
| 1 | 1D, {16, 20, 24, 28, 32} ports | (diagram: 8 beams at $0, O_1, 2O_1, 3O_1, 4O_1, 5O_1, 6O_1, 7O_1$) | - | 8 |
| 1 | 2D, 8 ports | (diagram: beams at $(0,0), (O_1,0), (0,O_2), (?, ?)$) | - | 4 |
| 1 | 2D, 12 ports | (diagram: 6 beams, 2 rows × 3 cols at $0, O_1, 2O_1$ and $0, O_2$) | (diagram: 6 beams, 3 rows × 2 cols) | 6 |
| 1 | 2D, {16, 20, 24, 28, 32} ports | (diagram: 8 beams, 2 rows × 4 cols) | (diagram: 8 beams, 4 rows × 2 cols) | 8 |
| 2 | 2D, {8, 16, 20, 24, 28, 32} ports | (diagram: 2×4 grid) | (diagram: 4×2 grid) | 4 |
| 3 | 2D, {8, 16, 20, 24, 28, 32} ports | (diagram: 2×4 checkerboard) | (diagram: 4×2 checkerboard) | 4 |
| 4 | 1D, {4, 8, 16, 20, 24, 28, 32} ports | (diagram: 1×4 row) | - | 4 |
| 4 | 2D, {8, 16, 20, 24, 28, 32} ports | (diagram: 2×4, bottom row filled) | (diagram: 4×2, right column filled) | 4 |

FIGURE 31

LINEAR COMBINATION CODEBOOK FOR CSI REPORTING IN ADVANCED WIRELESS COMMUNICATION SYSTEMS

CROSS-REFERENCE TO RELATED APPLICATIONS AND CLAIM OF PRIORITY

The present application claims priority to U.S. Provisional Patent Application Ser. No. 62/367,184, filed on Jul. 27, 2016, entitled "Linear Combination Codebook for CSI Reporting in Advanced Wireless Communication Systems;" U.S. Provisional Patent Application Ser. No. 62/371,663, filed on Aug. 5, 2016, entitled "Linear Combination Codebook for CSI Reporting in Advanced Wireless Communication Systems;" U.S. Provisional Patent Application Ser. No. 62/380,794, filed on Aug. 29, 2016, entitled "Method and Apparatus for Linear Combination Codebook based CSI Reporting in Advanced Wireless Communication Systems;" U.S. Provisional Patent Application Ser. No. 62/397,103, filed on Sep. 20, 2016, entitled "Method and Apparatus for Higher Rank Linear Combination Codebook based CSI Reporting in Advanced Wireless Communication Systems;" U.S. Provisional Patent Application Ser. No. 62/410,917, filed on Oct. 21, 2016, entitled "Method and Apparatus for Linear Combination Codebook based CSI Reporting in Advanced Wireless Communication Systems;" U.S. Provisional Patent Application Ser. No. 62/417,797, filed on Nov. 4, 2016, entitled "Method and Apparatus for Linear Combination Codebook based CSI Reporting in Advanced Wireless Communication Systems;" U.S. Provisional Patent Application Ser. No. 62/420,412, filed on Nov. 10, 2016, entitled "Method and Apparatus for Linear Combination Codebook based CSI Reporting in Advanced Wireless Communication Systems;" U.S. Provisional Patent Application Ser. No. 62/423,234, filed on Nov. 17, 2016, entitled "Method and Apparatus for Linear Combination Codebook based CSI Reporting in Advanced Wireless Communication Systems;" and U.S. Provisional Patent Application Ser. No. 62/463,815, filed on Feb. 27, 2017, entitled "Method and Apparatus for Linear Combination Codebook based CSI Reporting in Advanced Wireless Communication Systems." The content of the above-identified patent documents are incorporated herein by reference.

TECHNICAL FIELD

The present application relates generally to channel state information (CSI) reporting operation in advanced wireless communication systems. More specifically, this disclosure relates to linear combination precoding matrix indicator (PMI) codebook for CSI reporting.

BACKGROUND

Understanding and correctly estimating the channel in an advance wireless communication system between a user equipment (UE) and an eNode B (eNB) is important for efficient and effective wireless communication. In order to correctly estimate the channel conditions, the UE may report (e.g., feedback) information about channel measurement, e.g., CSI, to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

The present disclosure relates to a pre-$5^{th}$-generation (5G) or 5G communication system to be provided for supporting higher data rates beyond $4^{th}$-generation (4G) communication system such as long term evolution (LTE). Embodiments of the present disclosure provide an advanced CSI reporting based on a linear combination codebook for MIMO wireless communication systems.

In one embodiment, a user equipment (UE) for a channel state information (CSI) feedback in an advanced communication system is provided. The UE comprises a transceiver configured to receive, from a base station (BS), CSI feedback configuration information for a pre-coding matrix indicator (PMI) feedback based on a linear combination (LC) codebook, wherein the PMI comprises a first PMI ($i_1$) and a second PMI ($i_2$). The UE further comprises at least one processor configured to determine the first PMI ($i_1$) and the second PMI ($i_2$) indicating an LC pre-coder that corresponds to a weighted linear combination of a first beam and a second beam. The first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively, and the second PMI ($i_2$) indicates weights assigned to the first beam and the second beam. The UE further comprises the transceiver configured to transmit, to the BS, the CSI feedback over an uplink channel including the first PMI ($i_1$) and the second PMI ($i_2$).

In another embodiment, a base station (BS) for a channel state information (CSI) feedback in an advanced communication system is provided. The BS comprises a transceiver configured to transmit, to a user equipment (UE), CSI feedback configuration information for a pre-coding matrix indicator (PMI) feedback based on a linear combination (LC) codebook, wherein the PMI comprises a first PMI ($i_1$) and a second PMI ($i_2$). The first PMI ($i_1$) and the second PMI ($i_2$) indicate an LC pre-coder that corresponds to a weighted linear combination of a first beam and a second beam, the first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively, and the second PMI ($i_2$) indicates weights assigned to the first beam and the second beam. The BS further comprises the transceiver configured to receive, from the UE, the CSI feedback over an uplink channel including the first PMI ($i_1$) and the second PMI ($i_2$).

In yet another embodiment, a method of a user equipment (UE) for a channel state information (CSI) feedback in an advanced communication system is provided. The method comprises receiving, from a base station (BS), CSI feedback configuration information for a pre-coding matrix indicator (PMI) feedback based on a linear combination (LC) codebook, wherein the PMI comprises a first PMI ($i_1$) and a second PMI ($i_2$), determining the first PMI ($i_1$) and the second PMI ($i_2$) indicating an LC pre-coder that corresponds to a weighted linear combination of a first beam and a second beam. The first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively, and the second PMI ($i_2$) indicates weights assigned to the first beam and the second beam. The method further comprises transmitting, to the BS, the CSI feedback over an uplink channel including the determined first PMI ($i_1$) and the second PMI ($i_2$).

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

Aspects, features, and advantages of the present disclosure are readily apparent from the following detailed description, simply by illustrating a number of particular embodiments and implementations, including the best mode contemplated for carrying out the present disclosure. The present disclosure is also capable of other and different embodiments, and its several details can be modified in various obvious respects, all without departing from the spirit and scope of the present disclosure. Accordingly, the drawings and description are to be regarded as illustrative in nature, and not as restrictive. The present disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), disclosure can be extended to other OFDM-based transmission waveforms or multiple access schemes such as filtered OFDM (F-OFDM).

This present disclosure covers several components which can be used in conjunction or in combination with one another, or can operate as standalone schemes.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 13 illustrates an example dual-polarized antenna port layouts for {20, 24, 28, 32} ports according to embodiments of the present disclosure;

FIG. 19 illustrates an example class A W1 beam groups for rank 1-8 and codebook-configuration 2, 3, and 4 according to embodiments of the present disclosure;

FIG. 26 illustrates an example beam selection from an orthogonal master beam group with (L1, L2)=(4, 2) for 2D layouts according to embodiments of the present disclosure;

FIG. 29 illustrates a table for a Codebook-Config parameter to rank 1 beam grouping mapping according to embodiments of the present disclosure;

FIG. 30 illustrates a table for BGI or BI to beam group mapping for an LC codebook according to embodiments of the present disclosure;

FIG. 31 illustrates a table for a basis for an LC codebook CB1 according to embodiments of the present disclosure; and FIG. 32 illustrates a table for a basis for a LC W1 codebook CB2 according to embodiments of the present disclosure.

DETAILED DESCRIPTION

FIG. 1 through FIG. 28, discussed below, and the various embodiments used to describe the principles of the present disclosure in this patent document are by way of illustration only and should not be construed in any way to limit the scope of the disclosure. Those skilled in the art may understand that the principles of the present disclosure may be implemented in any suitably arranged system or device.

The following documents and standards descriptions are hereby incorporated by reference into the present disclosure as if fully set forth herein: 3GPP TS 36.211 v13.0.0, "E-UTRA, Physical channels and modulation" (REF1); 3GPP TS 36.212 v13.0.0, "E-UTRA, Multiplexing and Channel coding" (REF2); 3GPP TS 36.213 v13.0.0, "E-UTRA, Physical Layer Procedures" (REF3); 3GPP TS 36.321 v13.0.0, "E-UTRA, Medium Access Control (MAC) protocol specification" (REF4); 3GPP TS 36.331 v13.0.0, "E-UTRA, Radio Resource Control (RRC) protocol specification" (REF5); and RP-160623, "New WID Proposal: Enhancements on Full-Dimension (FD) MIMO for LTE," Samsung.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
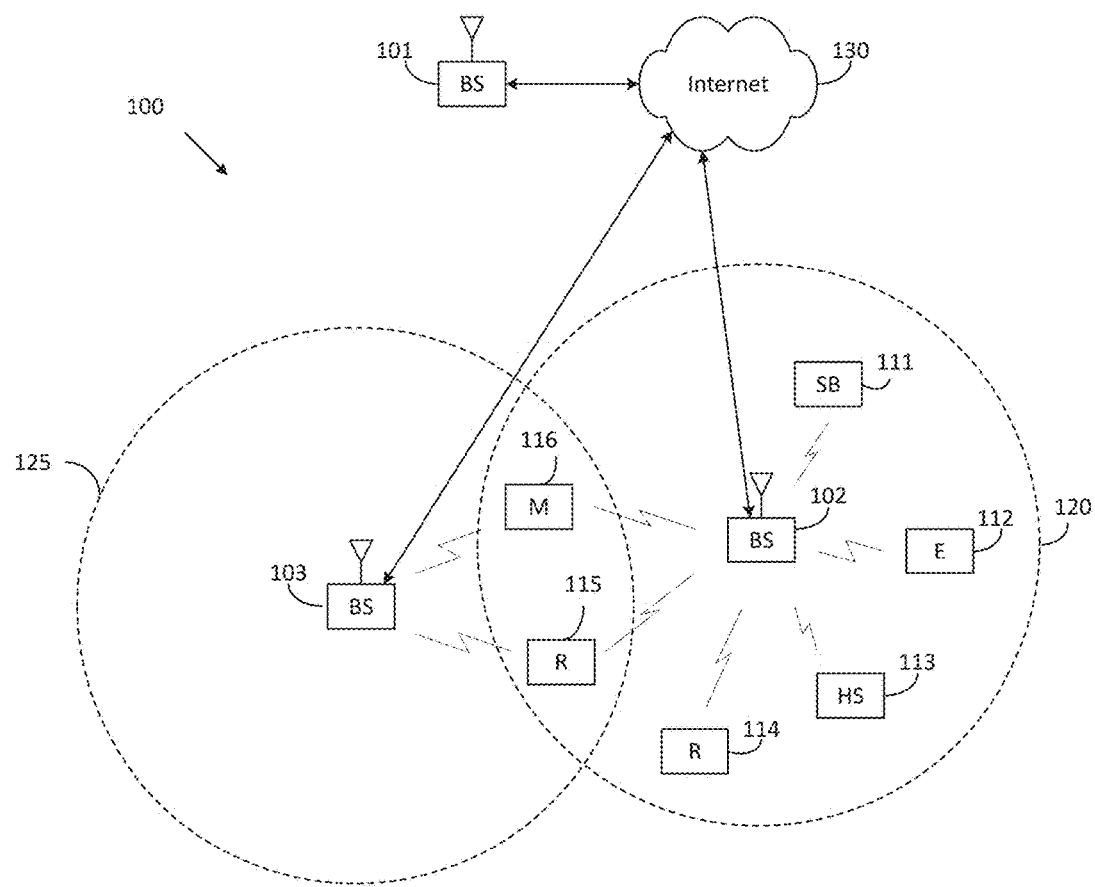
FIG. 1 illustrates an example wireless network according to embodiments of the present disclosure.
Figure 2:
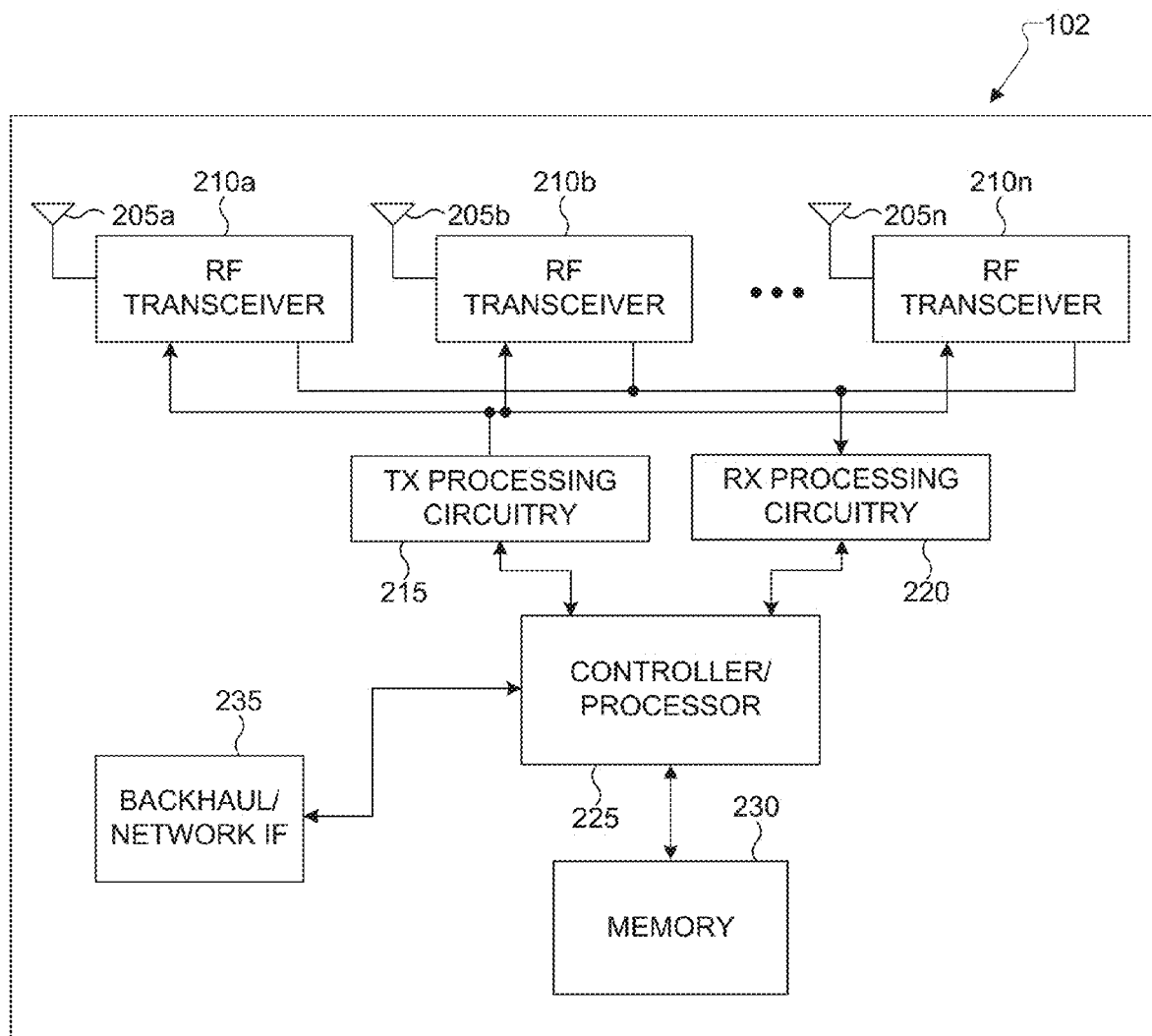
FIG. 2 illustrates an example eNodeB (eNB) according to embodiments of the present disclosure.
Figure 3:
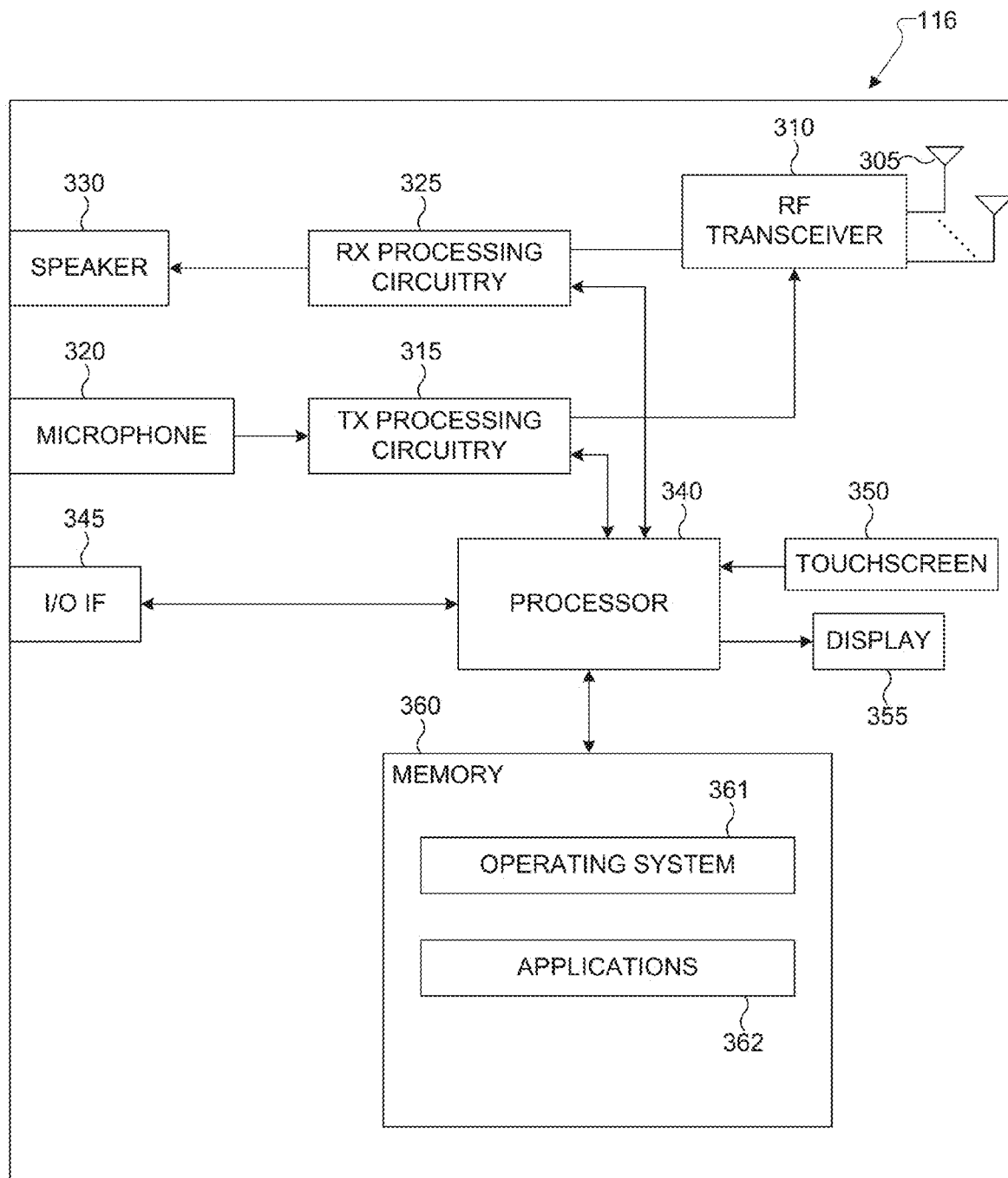
FIG. 3 illustrates an example user equipment (UE) according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs)

within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), gNB, a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for efficient CSI reporting on PUCCH in an advanced wireless communication system. In certain embodiments, and one or more of the eNBs 101-103 includes circuitry, programming, or a combination thereof, for receiving efficient CSI reporting on uplink channel in an advanced wireless communication system.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

In some embodiments, the RF transceivers 210a-210n are capable of transmitting, to a user equipment (UE), CSI feedback configuration information for a pre-coding matrix indicator (PMI) feedback based on a linear combination (LC) codebook, wherein the PMI comprises a first PMI ($i_1$) and a second PMI ($i_2$), wherein the first PMI ($i_1$) and the second PMI ($i_2$) indicate an LC pre-coder that corresponds to a weighted linear combination of a first beam and a second beam, the first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively, and the second PMI ($i_2$) indicates weights assigned to the first beam and the second beam.

In some embodiments, the RF transceivers 210a-210n are capable of receiving, from the UE, the CSI feedback over an uplink channel including the first PMI ($i_1$) and the second PMI ($i_2$).

In such embodiments, the first PMI ($i_1$) includes a relative power indicator (RPI) ($I_p$) indicating a power of a weight assigned to the second beam relative to a power of a weight assigned to the first beam, and wherein the power of the weight assigned to the first beam is set to 1 and the power of the weight assigned to the second beam is set to a value among $\{0, \sqrt{1/4}, \sqrt{1/2}, 1\}$, and wherein a ($i_{1,1}$) and a ($i_{1,2}$) indicate an index of the first beam in a first dimension and a second dimension, respectively, and a ($d_1$) and a ($d_2$) indicate a distance of the second beam from the first beam in the first dimension and the second dimension, respectively.

In such embodiments, the first beam and the second beam correspond to two discrete Fourier transform (DFT) beams selected from an oversampled DFT codebook comprising DFT beams:

$$v_{l_1,l_2} = \left[ u_{l_2} \quad e^{j\frac{2\pi l_1}{O_1 N_1}} u_{l_2} \quad \ldots \quad e^{j\frac{2\pi l_1(N_1-1)}{O_1 N_1}} u_{l_2} \right]^T,$$

-continued $u_{l_2} = 1$ if $N_2 = 1$;

$u_{l_2} = \begin{bmatrix} 1 & e^{j\frac{2\pi l_2}{O_2 N_2}} & \ldots & e^{j\frac{2\pi l_2(N_2-1)}{O_2 N_2}} \end{bmatrix}$ otherwise, $0 \le l_1 \le O_1 N_1 - 1$, and $0 \le l_2 \le O_2 N_2 - 1$, where $N_1$ and $N_2$ indicate a first and a second number of antenna ports in the first and the second dimensions, respectively, and $O_1$ and $O_2$ indicate a first and a second oversampling factors in the first and second dimensions, respectively.

In such embodiments, the distance $(d_1, d_2)$ of the second beam relative to a first beam index $(k_1^{(0)}, k_2^{(0)})$ indicated by the first beam indicator $(i_{1,1}, i_{1,2})$ is such that the $(d_1)$ belongs to a set of integers $\{0, 1, \ldots, L_1-1\}$ and the $(d_2)$ belongs to a set of integers $\{0, 1, \ldots, L_2-1\}$, respectively, wherein a beam group size $(L_1, L_2)$ is determined by: $N_1 \ge N_2 > 1$: $L_1 = \min(N_1, 4)$ $L_2 = 2$; $N_2 > N_1 > 1$: $L_2 = \min(N_2, 4)$, $L_1 = 2$; and $N_2 = 1$: $L_1 = \min(N_1, 8)$, $L_2 = 1$.

In such embodiments, a second beam index $(k_1^{(1)}, k_2^{(1)})$ is determined by: $k_1^{(1)} = k_1^{(0)} + O_1 d_1$, $k_2^{(1)} = k_2^{(0)} + O_2 d_2$, where the $(d_1, d_2)$ is such that the $(d_1)$ belongs to a set of integers $\{0, 1, \ldots, \min(N_1, L_1)-1\}$, the $(d_2)$ belongs to a set of integers $\{0, 1, \ldots, \min(N_2, L_2)-1\}$, and $(d_1, d_2) \ne (0, 0)$.

In such embodiments, the second beam indicator $(i_{1,3})$ and the distance $(d_1, d_2)$ of the second beam are mapped based on a table given by:

| | $N_1 \ge N_2$, | | | | | | $N_2 > N_1$, | | | | | | |
| | $N_1 \ge 4$, | $N_1 = 3$, | $N_1 = 2$, | $N_2 \ge 4$, | $N_2 = 3$, | $N_1 \ge 8$ | $N_1 = 2$, | $N_1 = 4$, |
| | $N_2 \ne 1$ | $N_2 = 2$ | $N_2 = 2$ | $N_1 \ne 1$ | $N_1 = 2$ | $N_2 = 1$ | $N_2 = 1$ | $N_2 = 1$ |
| Value of $i_{1,3}$ | $d_1$ $d_2$ | $d_1$ $d_2$ | $d_1$ $d_2$ | $d_1$ $d_2$ | $d_1$ $d_2$ | $d_1$ $d_2$ | $d_1$ $d_2$ | $d_1$ $d_2$ |
|---|---|---|---|---|---|---|---|---|
| 0 | 1  0 | 1  0 | 1  0 | 0  1 | 0  1 | 1  0 | 1  0 | 1  0 |
| 1 | 2  0 | 2  0 | 0  1 | 0  2 | 0  2 | 2  0 |      | 2  0 |
| 2 | 3  0 | 0  1 | 1  1 | 0  3 | 1  0 | 3  0 |      | 3  0 |
| 3 | 0  1 | 1  1 |      | 1  0 | 1  1 | 4  0 |      |      |
| 4 | 1  1 | 2  1 |      | 1  1 | 1  2 | 5  0 |      |      |
| 5 | 2  1 |      |      | 1  2 |      | 6  0 |      |      |
| 6 | 3  1 |      |      | 1  3 |      | 7  0. |     |      |

In some embodiments, the RF transceivers 210a-210n are capable of receiving a single wideband (WB) bit stream that indicates three components jointly, the $(i_{1,1}, i_{1,2})$ indicating the first beam, the $(i_{1,3})$ indicating the distance $(d_1, d_2)$ of the second beam from the first beam, and the $(I_p)$ indicating the power of the weight assigned to the second beam.

In some embodiments, the RF transceivers 210a-210n are capable of receiving multiple WB bit streams that indicate three components separately, a first bit stream for the $(i_{1,1}, i_{1,2})$ indicating the first beam, and either a second bit stream jointly indicating the $(i_{1,3})$ and the $(I_p)$ for the second beam or a second bit stream and a third bit stream separately indicating the $(i_{1,3})$ and the $(I_p)$ for the second beam, respectively.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of CSI reporting on an uplink channel. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

In some embodiments, the RF transceiver 310 is capable of receiving, from a base station (BS), CSI feedback configuration information for a pre-coding matrix indicator (PMI) feedback based on a linear combination (LC) codebook, wherein the PMI comprises a first PMI ($i_1$) and a second PMI ($i_2$).

In some embodiments, the RF transceiver 310 is capable of transmitting, to the BS, the CSI feedback over an uplink channel including the first PMI ($i_1$) and the second PMI ($i_2$).

In such embodiments, the first PMI ($i_1$) includes a relative power indicator (RPI) (In) indicating a power of a weight assigned to the second beam relative to a power of a weight assigned to the first beam, and wherein the power of the weight assigned to the first beam is set to 1 and the power of the weight assigned to the second beam is set to a value among $\{0, \sqrt{1/4}, \sqrt{1/2}, 1\}$.

In such embodiments, the first beam and the second beam correspond to two discrete Fourier transform (DFT) beams selected from an oversampled DFT codebook comprising DFT beams:

$$v_{l_1,l_2} = \left[ u_{l_2} \; e^{j\frac{2\pi l_1}{O_1 N_1}} u_{l_2} \; \ldots \; e^{j\frac{2\pi l_1(N_1-1)}{O_1 N_1}} u_{l_2} \right]^T,$$

$$u_{l_2} = 1 \text{ if } N_2 = 1;$$

-continued $$u_{l_2} = \left[ 1 \; e^{j\frac{2\pi l_2}{O_2 N_2}} \; \ldots \; e^{j\frac{2\pi l_2(N_2-1)}{O_2 N_2}} \right] \text{ otherwise,}$$

$$0 \leq l_1 \leq O_1 N_1 - 1, \text{ and } 0 \leq l_2 \leq O_2 N_2 - 1,$$

where $N_1$ and $N_2$ indicate a first and second number of antenna ports in the first and the second dimensions, respectively, and $O_1$ and $O_2$ indicate a first and a second oversampling factors in the first and second dimensions, respectively.

In such embodiments, the distance ($d_1$, $d_2$) of the second beam relative to a first beam index ($k_1^{(0)}$, $k_2^{(0)}$) indicated by the first beam indicator ($i_{1,1}$, $i_{1,2}$) is such that the ($d_1$) belongs to a set of integers $\{0,1, \ldots, L_1-1\}$ and the ($d_2$) belongs to a set of integers $\{0, 1, \ldots, L_2-1\}$, respectively.

In such embodiments, a beam group size ($L_1$, $L_2$) is determined by: $N_1 \geq N_2 > 1$. $L_1 = \min(N_1, 4)$, $L_2 = 2$; $N_2 > N_1 > 1$: $L_2 = \min(N_2, 4)$, $L_1 = 2$; $N_2 = 1$: $L_1 = \min(N_1, 8)$, $L_2 = 1$.

In such embodiments, a second beam index ($k_1^{(1)}$, $k_2^{(1)}$) is determined by: $k_1^{(1)} = k_1^{(0)} + O_1 d_1$, $k_2^{(1)} = k_2^{(0)} + O_2 d_2$, where the ($d_1$, $d_2$) is such that the ($d_1$) belongs to a set of integers $\{0, 1, \ldots, \min(N_1, L_1)-1\}$, the ($d_2$) belongs to a set of integers $\{0, 1, \ldots, \min(N_2, L_2)-1\}$, and ($d_1$, $d_2$)≠(0, 0).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for CSI reporting on an uplink channel. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

In some embodiments, the processor 340 is capable of determining the first PMI ($i_1$) and the second PMI ($i_2$) indicating an LC pre-coder that corresponds to a weighted linear combination of a first beam and a second beam.

In such embodiments, the first PMI ($i_1$) includes a first beam indicator ($i_{1,1}$, $i_{1,2}$) and a second beam indicator ($i_{1,3}$) that indicate the first beam and a distance ($d_1$, $d_2$) of the second beam in accordance with the first beam, respectively.

In such embodiments, a $(i_{1,1})$ and a $(i_{1,2})$ indicate an index of the first beam in a first dimension and a second dimension, respectively.

In such embodiments, a $(d_1)$ and a $(d_2)$ indicate a distance of the second beam from the first beam in the first dimension and the second dimension, respectively.

In such embodiments, the second PMI $(i_2)$ indicates weights assigned to the first beam and the second beam.

In such embodiments, the first PMI $(i_1)$ includes a relative power indicator (RPI) $(I_n)$ indicating a power of a weight assigned to the second beam relative to a power of a weight assigned to the first beam, and wherein the power of the weight assigned to the first beam is set to 1 and the power of the weight assigned to the second beam is set to a value among $\{0, \sqrt{1/4}, \sqrt{1/2}, 1\}$.

In such embodiments, the first beam and the second beam correspond to two discrete Fourier transform (DFT) beams selected from an oversampled DFT codebook comprising DFT beams:

$$v_{l_1,l_2} = \left[ u_{l_2} \quad e^{j\frac{2\pi l_1}{O_1 N_1}} u_{l_2} \quad \cdots \quad e^{j\frac{2\pi l_1(N_1-1)}{O_1 N_1}} u_{l_2} \right]^T,$$

$$u_{l_2} = 1 \text{ if } N_2 = 1;$$

$$u_{l_2} = \left[ 1 \quad e^{j\frac{2\pi l_2}{O_2 N_2}} \quad \cdots \quad e^{j\frac{2\pi l_2(N_2-1)}{O_2 N_2}} \right] \text{ otherwise,}$$

$$0 \leq l_1 \leq O_1 N_1 - 1, \text{ and } 0 \leq l_2 \leq O_2 N_2 - 1,$$

where $N_1$ and $N_2$ indicate a first and second number of antenna ports in the first and the second dimensions, respectively, and $O_1$ and $O_2$ indicate a first and a second oversampling factors in the first and second dimensions, respectively.

In such embodiments, the distance $(d_1, d_2)$ of the second beam relative to a first beam index $(k_1^{(0)}, k_2^{(0)})$ indicated by the first beam indicator $(i_{1,1}, i_{1,2})$ is such that the $(d_1)$ belongs to a set of integers $\{0, 1, \ldots, L_1-1\}$ and the $(d_2)$ belongs to a set of integers $\{0, 1, \ldots, L_2-1\}$, respectively.

In such embodiments, a beam group size $(L_1, L_2)$ is determined by: $N_1 \geq N_2 > 1$: $L_1 = \min(N_1, 4)$, $L_2 = 2$; $N_2 > N_1 > 1$: $L_2 = \min(N_2, 4)$, $L_1 = 2$; and $N_2 = 1$: $L_1 = \min(N_1, 8)$, $L_2 = 1$.

In such embodiments, a second beam index $(k_1^{(1)}, k_2^{(1)})$ is determined by: $k_1^{(1)} = k_1^{(0)} + O_1 d_1$, $k_2^{(1)} = k_2^{(0)} + O_2 d_2$, where the $(d_1, d_2)$ is such that the $(d_1)$ belongs to a set of integers $\{0, 1, \ldots, \min(N_1, L_1)-1\}$, the $(d_2)$ belongs to a set of integers $\{0, 1, \ldots, \min(N_2, L_2)-1\}$, and $(d_1, d_2) \neq (0, 0)$.

In some embodiments, the processor 340 is capable of mapping between the second beam indicator $(i_{1,3})$ and the distance $(d_1, d_2)$ of the second beam based on a table given by:

In some embodiments, the processor 340 is capable of reporting a single wideband (WB) bit stream that indicates three components jointly, the $(i_{1,1}, i_{1,2})$ indicating the first beam, the $(i_{1,3})$ indicating the distance $(d_1, d_2)$ of the second beam from the first beam, and the $(I_p)$ indicating the power of the weight assigned to the second beam.

In some embodiments, the processor 340 is capable of reporting multiple WB bit streams that indicate three components separately, a first bit stream for the $(i_{1,1}, i_{1,2})$ indicating the first beam, and either a second bit stream jointly indicating the $(i_{1,3})$ and the $(I_p)$ for the second beam or a second bit stream and a third bit stream separately indicating the $(i_{1,3})$ and the $(I_p)$ for the second beam, respectively.

In some embodiments, the processor 340 is capable of separating the distance $(d_1, d_2)$ of the second beam in accordance with a PMI $(i_{1,1-2}, i_{1,2-2})$, wherein the $(d_1)$ of the distance $(d_1, d_2)$ corresponds to a $(i_{1,1-2})$ of the PMI $(i_{1,1-2}, i_{1,2-2})$ and the $(d_2)$ of the distance $(d_1, d_2)$ corresponds to a $(i_{1,2-2})$ of the PMI $(i_{1,1-2}, i_{1,2-2})$, and wherein if one PMI $(i_3)$ or $(i_{1,1-2}, i_{1,2-2})$ is reported to the BS, a bit width for the PMI is determined by $\lceil \log_2 (L_1 L_2) \rceil$ and if two PMIs, $(i_{1,1-2})$ and $(i_{1,2-2})$, are reported to the BS, bit widths for the two PMIs are determined by $\lceil \log_2 (L_1) \rceil$ and $\lceil \log_2 (L_2) \rceil$, respectively.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
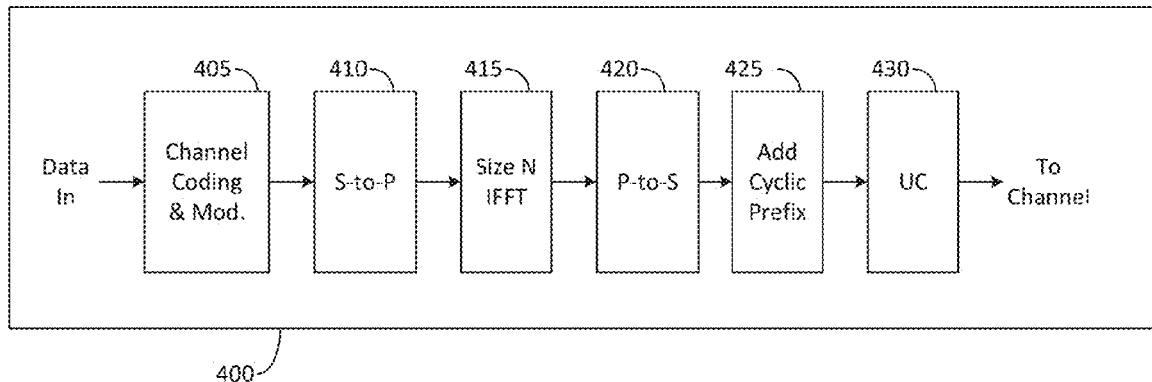
FIG. 4A illustrates a high-level diagram of an orthogonal frequency division multiple access transmit path according to embodiments of the present disclosure.
Figure 4B:
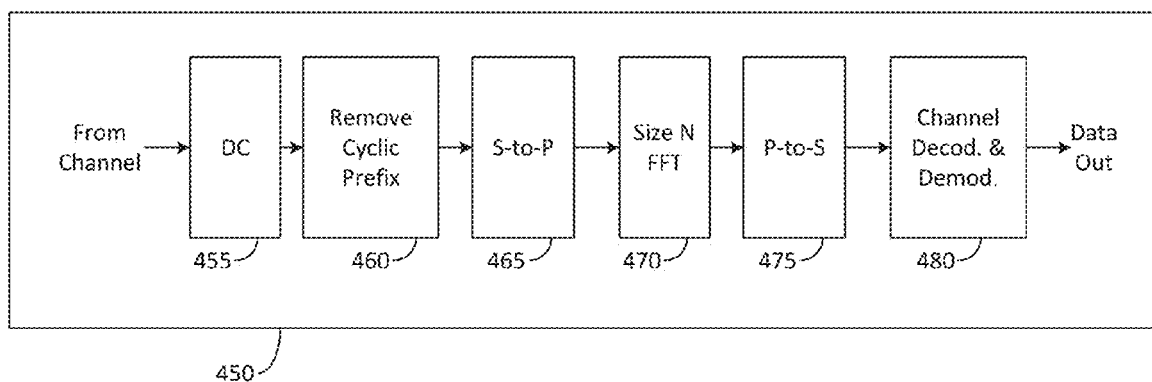
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In

| | $N_1 \geq N_2$, $N_1 \geq 4$, $N_2 \neq 1$ | | $N_1 = 3$, $N_2 = 2$ | | $N_1 = 2$, $N_2 = 2$ | | $N_2 > N_1$, $N_2 \geq 4$, $N_1 \neq 1$ | | $N_2 = 3$, $N_1 = 2$ | | $N_1 \geq 8$, $N_2 = 1$ | | $N_1 = 2$, $N_2 = 1$ | | $N_1 = 4$, $N_2 = 1$ | |
|---|---|---|---|---|---|---|---|---|---|---|---|---|---|---|---|---|
| Value of $i_{1,3}$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ |
| 0 | 1 | 0 | 1 | 0 | 1 | 0 | 0 | 1 | 0 | 1 | 1 | 0 | 1 | 0 | 1 | 0 |
| 1 | 2 | 0 | 2 | 0 | 0 | 1 | 0 | 2 | 0 | 2 | 2 | 0 | | | 2 | 0 |
| 2 | 3 | 0 | 0 | 1 | 1 | 1 | 0 | 3 | 1 | 0 | 3 | 0 | | | 3 | 0 |
| 3 | 0 | 1 | 1 | 1 | | | 1 | 0 | 1 | 1 | 4 | 0 | | | | |
| 4 | 1 | 1 | 2 | 1 | | | 1 | 1 | 1 | 2 | 5 | 0 | | | | |
| 5 | 2 | 1 | | | | | 1 | 2 | | | 6 | 0 | | | | |
| 6 | 3 | 1 | | | | | 1 | 3 | | | 7 | 0. | | | | |

FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It may be appreciated that in an alternate embodiment of the disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback (e.g., reporting) framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basic functions and vectors may be achieved. In another example, updated channel feedback parameters (e.g., the channel angular spreads) may be obtained at low mobility using UE-specific higher-layer signaling. In addition, a CSI reporting (feedback) may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-term precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
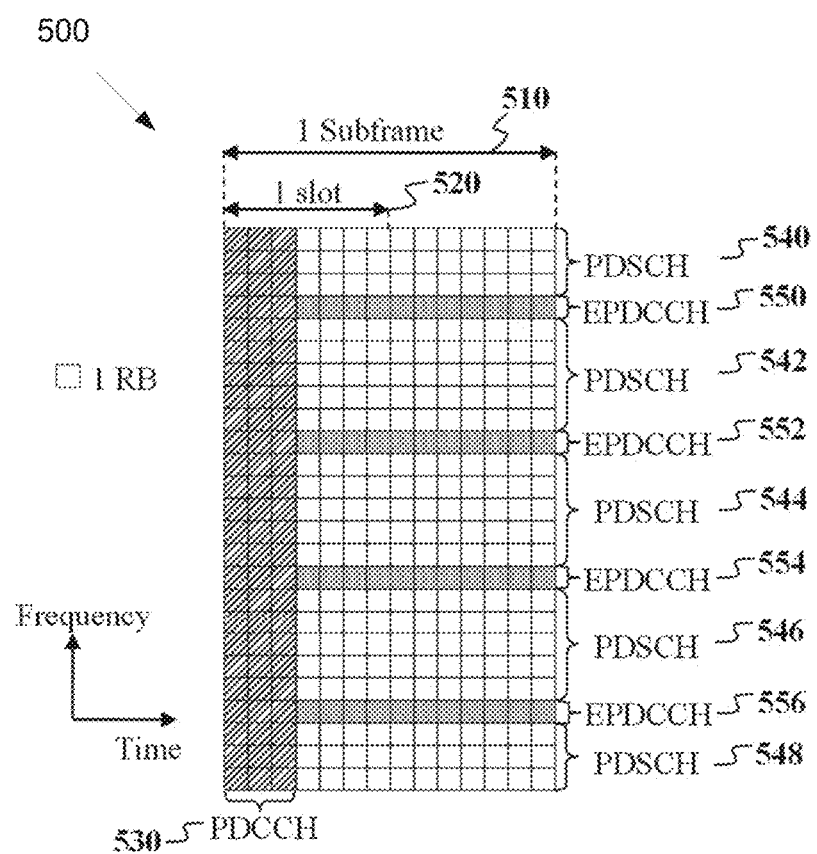
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining Z SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCI}$ RBs for a total of $Z=O_F+\lfloor(n_{s0}+y\cdot N_{EPDCCH})/D\rfloor$ REs for a PDSCH transmission BW. An EPDCCH transmission is achieved in either one RB or multiple of RBs.

Figure 6:
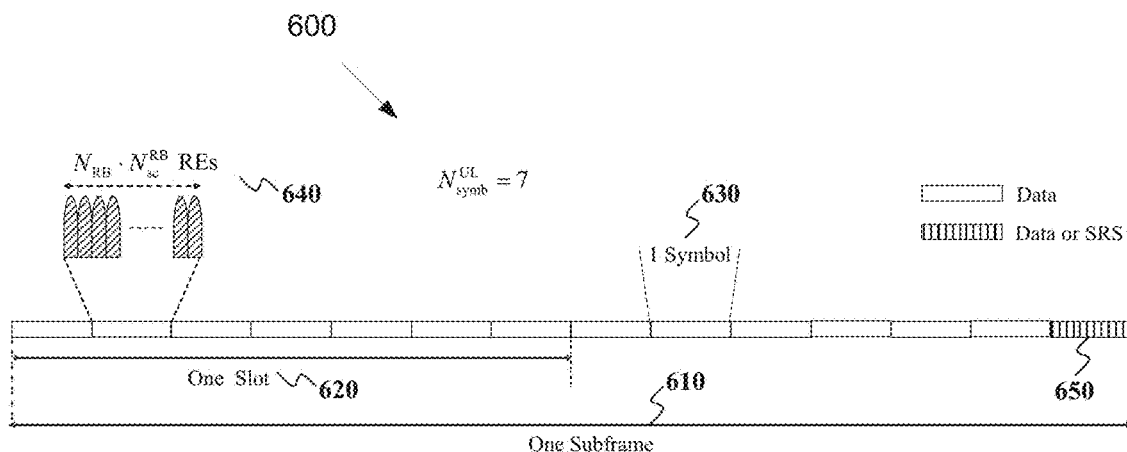
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \ (N_{symb}^{UL}-1)-N_{SRS}$, where $N_{SRS}=1$ if a last subframe symbol is used to transmit SRS and $N_{SRS}=0$ otherwise.

Figure 7:
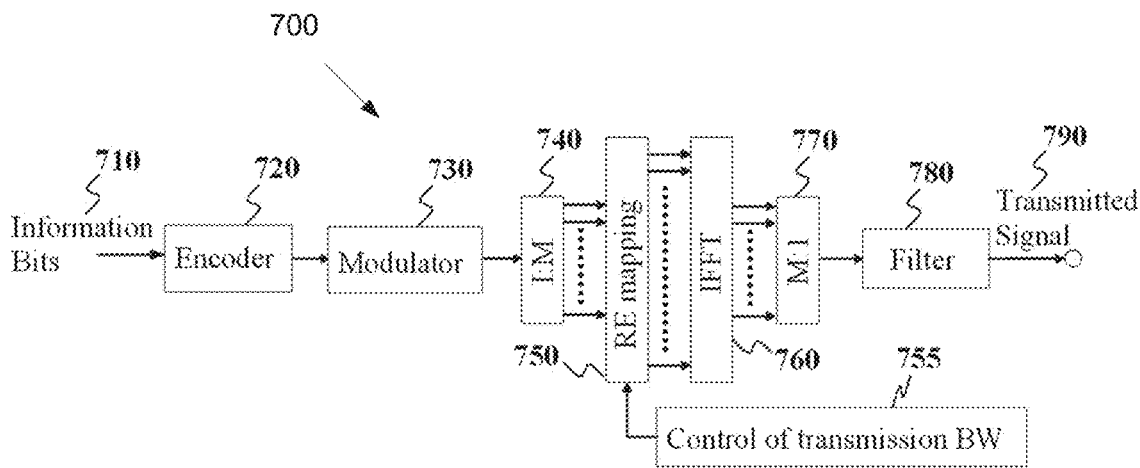
FIG. 7 illustrates an example transmitter block diagram for a physical downlink shared channel (PDSCH) subframe according to embodiments of the present disclosure.

FIG. 7 illustrates an example transmitter block diagram 700 for a physical downlink shared channel (PDSCH) subframe according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (S/P) converter 740 generates M modulation symbols that are subsequently provided to a mapper 750 to be mapped to REs selected by a transmission BW selection unit 755 for an assigned PDSCH transmission BW, unit 760 applies an inverse fast Fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
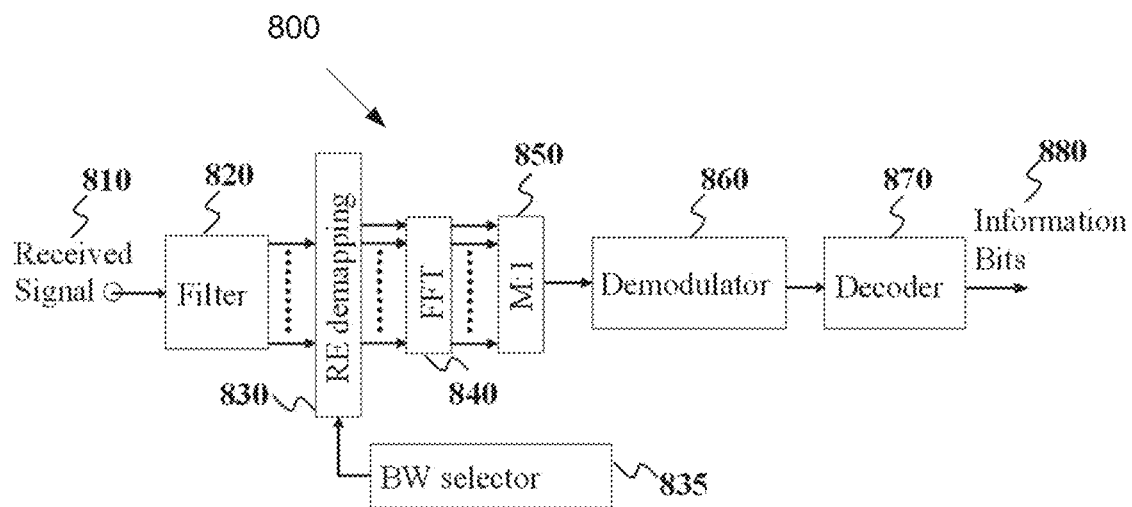
FIG. 8 illustrates an example receiver block diagram for a PDSCH subframe according to embodiments of the present disclosure.

FIG. 8 illustrates an example receiver block diagram 800 for a packet data shared channel (PDSCH) subframe according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to a resource element (RE) demapping block 830. The RE demapping block 830 assigns a reception bandwidth (BW) that is selected by a BW selector 835. The BW selector 835 is configured to control a transmission BW. A fast Fourier transform (FFT) circuit 840 applies a FFT. The output of the FFT circuit 840 is serialized by a parallel-to-serial converter 850. Subsequently, a demodulator 860 coherently demodulates data symbols by applying a channel estimate obtained from a demodulation reference signal (DMRS) or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a descrambling, channel estimation, and a de-interleaving are not shown for brevity.

Figure 9:
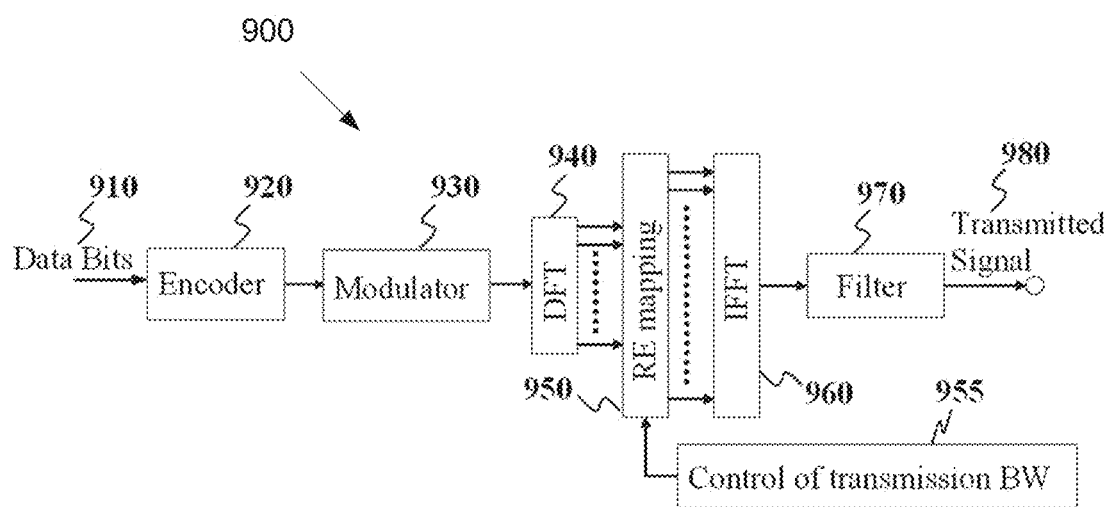
FIG. 9 illustrates an example transmitter block diagram for a physical uplink shared channel (PUSCH) subframe according to embodiments of the present disclosure.

FIG. 9 illustrates a transmitter block diagram 900 for a physical uplink shared channel (PUSCH) subframe according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete Fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
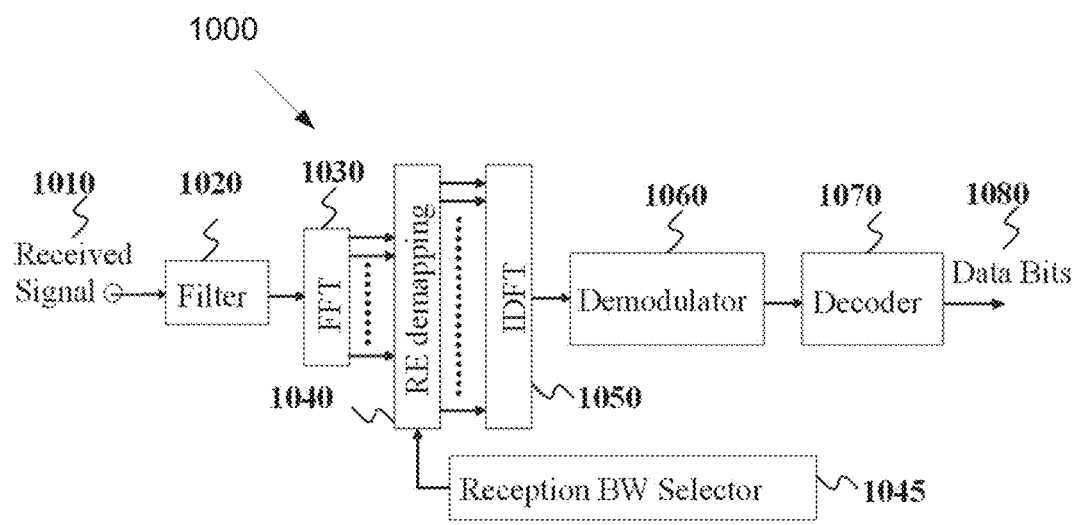
FIG. 10 illustrates an example receiver block diagram for a physical uplink shared channel (PUSCH) in a subframe according to embodiments of the present disclosure.

FIG. 10 illustrates an example receiver block diagram 1000 for a PUSCH subframe according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
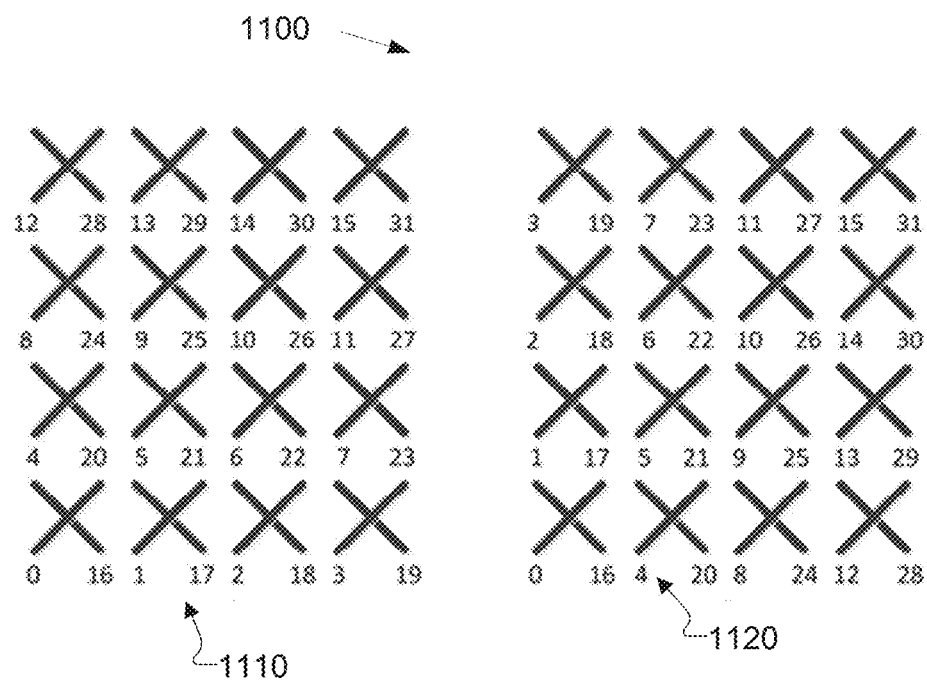
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel.12 of the LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In 3GPP LTE specification, MIMO precoding (for beamforming or spatial multiplexing) can be facilitated via precoding matrix index (PMI) reporting as a component of channel state information (CSI) reporting. The PMI report is derived from one of the following sets of standardized codebooks: two antenna ports (single-stage); four antenna ports (single-stage or dual-stage); eight antenna ports (dual-stage); configurable dual-stage eMIMO-Type of "CLASS A" codebook for eight, twelve, or sixteen antenna ports (also known as "nonPrecoded"); and single-stage eMIMO-Type of "CLASS B" codebook for two, four, or eight antenna ports (also known as "beamformed").

If an eNodeB follows a PMI recommendation from a UE, the eNB is expected to precode the eNB's transmitted signal according to a recommended precoding vector or matrix for a given subframe and RB. Regardless whether the eNB follows this recommendation, the UE is configured to report a PMI according to a configured precoding codebook. Here a PMI, which may consist of a single index or a pair of indices, is associated with a precoding matrix W in an associated codebook.

When dual-stage class A codebook is configured, a resulting precoding matrix can be described in equation (1). That is, the first stage precoder can be described as a Kronecker product of a first and a second precoding vector (or matrix), which can be associated with a first and a second dimension, respectively. This type is termed partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ can be described as a function of an index which serves as a PMI component. As a result, the precoding matrix W can be described as a function of 3 PMI components. The first stage pertains to a long-term component. Therefore it is associated with long-term channel statistics such as the aforementioned AoD profile and AoD spread. On the other hand, the second stage pertains to a short-term component which performs selection, co-phasing, or any linear operation to the first component precoder $W_{1,1}(i_{1,1}) \otimes W_{1,2}(i_{1,2})$. The precoder $W_2(i_2)$, therefore, performs a linear transformation of the long-term component such as a linear combination of a set of basic functions or vectors associated with the column vectors of $W_{1,1}(i_{1,1}) \otimes W_{1,2}(i_{1,2})$.

$$W(i_{1,1}, i_{1,2}, i_2) = \underbrace{(W_{1,1}(i_{1,1}) \otimes W_{1,2}(i_{1,2}))}_{W_1(i_{1,1}, i_{1,2})} W_2(i_2) \qquad \text{Equation (1)}$$

The above discussion assumes that the serving eNB transmits and a served UE measures non-precoded CSI-RS (NP CSI-RS). That is, a cell-specific one-to-one mapping between CSI-RS port and TXRU is utilized. Here, different CSI-RS ports have the same wide beam width and direction and hence generally cell wide coverage. This use case can be realized when the eNB configures the UE with "CLASS A" eMIMO-Type which corresponds to NP CSI-RS. Other than CQI and RI, CSI reports associated with "CLASS A" or "nonPrecoded" eMIMO-Type include a three-component PMI $(i_{1,1}, i_{1,2}, i_2)$.

Another type of CSI-RS applicable to FD-MIMO is beamformed CSI-RS (BF CSI-RS). In this case, beamforming operation, either cell-specific (with K>1 CSI-RS resources) or UE-specific (with K=1 CSI-RS resource), is applied on a non-zero-power (NZP) CSI-RS resource (consisting of multiple ports). Here, (at least at a given time/frequency) CSI-RS ports have narrow beam widths and hence not cell wide coverage, and (at least from the eNB perspective) at least some CSI-RS port-resource combinations have different beam directions. This beamforming operation is intended to increase CSI-RS coverage.

In addition, when UE-specific beamforming is applied to CSI-RS resource (termed the UE-specific or UE-specifically beamformed CSI-RS), CSI-RS overhead reduction is possible. UE complexity reduction is also evident since the configured number of ports tends to be much smaller than NP CSI-RS counterpart of the UE. When a UE is configured to receive BF CSI-RS from a serving eNB, the UE can be configured to report PMI parameter(s) associated with a second-stage precoder without the associated first-stage precoder or, in general, associated with a single-stage precoder/codebook. This use case can be realized when the eNB configures the UE with "CLASS B" eMIMO-Type which corresponds to BF CSI-RS. Other than CQI and RI, CSI reports associated with "CLASS B" or "beamformed" eMIMO-Type (with one CSI-RS resource and alternative codebook) include a one-component PMI n. Although a single PMI defined with respect to a distinct codebook, this PMI can be associated with the second-stage PMI component of "CLASS A"/"nonPrecoded" codebooks $i_2$.

Therefore, given a precoding codebook (a set of precoding matrices), a UE measures a CSI-RS in a subframe designated to carry CSI-RS, calculates/determines a CSI (including PMI, RI, and CQI where each of these three CSI parameters can consist of multiple components) based on the measurement, and reports the calculated CSI to a serving eNB. In particular, this PMI is an index of a recommended precoding matrix in the precoding codebook. Similar to that for the first type, different precoding codebooks can be used for different values of RI. The measured CSI-RS can be one of the two types: non-precoded (NP) CSI-RS and beamformed (BF) CSI-RS. As mentioned, in Rel.13, the support of these two types of CSI-RS is given in terms of two eMIMO-Types: "CLASS A" (with one CSI-RS resource) and "CLASS B" (with one or a plurality of CSI-RS resources), respectively.

In scenarios where DL long-term channel statistics can be measured through UL signals at a serving eNB, UE-specific BF CSI-RS can be readily used. This is typically feasible when UL-DL duplex distance is sufficiently small. When this condition does not hold, however, some UE feedback is necessary for the eNB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In LTE specification, the aforementioned precoding codebooks are utilized for CSI reporting. Two schemes of CSI reporting modes are supported (e.g., PUSCH-based aperiodic CSI (A-CSI) and PUCCH-based periodic CSI (P-CSI)). In each scheme, different modes are defined based on frequency selectivity of CQI and/or PMI, that is, whether wideband or subband reporting is performed. The supported CSI reporting modes are given in Table 1.

TABLE 1

CQI and PMI Feedback Types for PUSCH CSI reporting Modes

| | | PMI Feedback Type | | |
|---|---|---|---|---|
| | | No PMI | Single PMI | Multiple PMI |
| PUSCH CQI Feedback Type | Wideband (wideband CQI) | | | Mode 1-2 |
| | UE Selected (subband CQI) | | Mode 2-0 | Mode 2-2 |
| | Higher Layer-configured (subband CQI) | Mode 3-0 | Mode 3-1 | Mode 3-2 |

TABLE 2

CQI and PMI Feedback Types for PUCCH CSI reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

According to the WI, the hybrid CSI reporting based on non-precoded and beamformed CSI-RS associated with two eMIMO-Types may be supported in LTE specification.

In the present disclosure, for brevity, FDD is considered as the duplex method for both DL and UL signaling but the embodiments of the present disclosure are also directly applicable to TDD.

Throughout the present disclosure, 2D dual-polarized array is used solely for illustrative purposes, unless stated otherwise. Extensions to 2D single-polarized array are straightforward for those skilled in the art.

Terms such as "non-precoded" (or "NP") CSI-RS and "beamformed" (or "BF") CSI-RS are used throughout this present disclosure. The essence of this present disclosure does not change when different terms or names are used to refer to these two CSI-RS types. The same holds for CSI-RS resource. CSI-RS resources associated with these two types of CSI-RS can be referred to as "a first CSI-RS resource" and "a second CSI-RS resource," or "CSI-RS-A resource" and "CSI-RS-B resource." Subsequently, the labels "NP" and "BF" (or "np" and "bf") are exemplary and can be substituted with other labels such as "1" and "2." "A" or "B." Alternatively, instead of using categories such as CSI-RS type or CSI-RS resource type, a category of CSI reporting class can also be used. For instance, NP CSI-RS is associated with eMIMO-Type of "CLASS A" while UE-specific BF CSI-RS is associated with eMIMO-Type of "CLASS B" with one CSI-RS resource.

Figure 12:
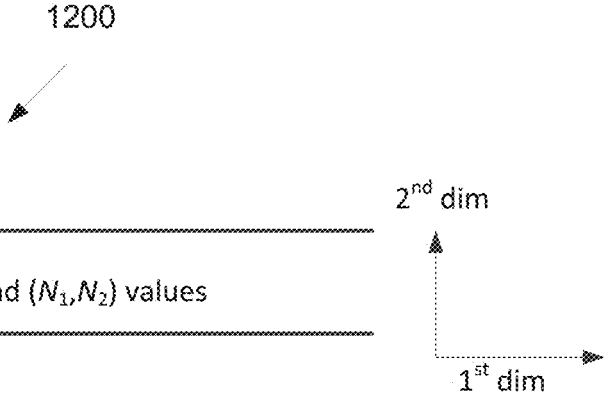
FIG. 12 illustrates an example dual-polarized antenna port layouts for {2, 4, 8, 12, 16} ports according to embodiments of the present disclosure.

FIG. 12 illustrates an example dual-polarized antenna port layouts for {2, 4, 8, 12, 16} ports 1200 according to embodiments of the present disclosure. An embodiment of the dual-polarized antenna port layouts for {2, 4, 8, 12, 16} ports 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

As shown in FIG. 12, 2D antenna arrays are constructed from $N_1 \times N_2$ dual-polarized antenna elements arranged in a $(N_1, N_2)$ rectangular format for 2, 4, 8, 12, 16 antenna ports. In FIG. 12, each antenna element is logically mapped onto a single antenna port. In general, one antenna port may correspond to multiple antenna elements (physical antennas) combined via a virtualization. This $N_1 \times N_2$ dual polarized array can then be viewed as $2N_1N_2$-element array of elements.

The first dimension consists of $N_1$ columns and facilitates azimuth beamforming. The second dimension similarly consists of $N_2$ rows and allows elevation beamforming. MIMO precoding in LTE specification was largely designed to offer precoding (beamforming) gain for one-dimensional (1D) antenna array using 2, 4, 8 antenna ports, which correspond to $(N_1, N_2)$ belonging to $\{(1, 1), (2, 1), (4, 1)\}$. While fixed beamforming (i.e. antenna virtualization) can be implemented across the elevation dimension, it is unable to reap the potential gain offered by the spatial and frequency selective nature of the channel. Therefore, MIMO precoding in LTE specification is designed to offer precoding gain for two-dimensional (2D) antenna array using 8, 12, 16 antenna ports, which correspond to $(N_1, N_2)$ belonging to $\{(2, 2), (2, 3), (3, 2), (8, 1), (4, 2), (2, 4)\}$.

Although $(N_1, N_2)=(6, 1)$ case has not been supported in LTE specification, it may be supported in future releases. The embodiments of the present disclosure are general and are applicable to any $(N_1, N_2)$ values including $(N_1, N_2)=(6, 1)$. The first and second dimensions as shown in FIG. 12 are for illustration only. The present disclosure is applicable to the case, in which the first and second dimensions are swapped, i.e., first and second dimensions respectively correspond to elevation and azimuth or any other pair of directions.

For 8 antenna ports {15,16,17,18,19,20,21,22}, 12 antenna ports {15,16,17,18,19,20,21,22,23,24,25,26}, 16 antenna ports {15,16,17,18,19,20,21,22,23,24,25,26,27,28,29,30}, and UE configured with higher layer parameter eMIMO-Type, and eMIMO-Type is set to "CLASS A," each PMI value corresponds to three codebook indices given in Table 4, where the quantities $\varphi_n$, $u_m$ and $v_{l,m}$ are given by equation (2):

$$\varphi_n = e^{j\pi n/2} \qquad (2)$$

$$u_m = \begin{bmatrix} 1 & e^{j\frac{2\pi m}{O_2 N_2}} & \ldots & e^{j\frac{2\pi m(N_2-1)}{O_2 N_2}} \end{bmatrix}$$

$$v_{l,m} = \begin{bmatrix} u_m & e^{j\frac{2\pi l}{O_1 N_1}} u_m & \ldots & e^{j\frac{2\pi l(N_1-1)}{O_1 N_1}} u_m \end{bmatrix}^T$$

The values of $N_1$, $N_2$, $O_1$, and $O_2$ are configured with the higher-layer parameters codebook-Config-N1, codebook-Config-N2, codebook-Over-Sampling-RateConfig-O1, and codebook-Over-Sampling-RateConfig-O2, respectively. The supported configurations of $(O_1, O_2)$ and $(N_1, N_2)$ for a given number of CSI-RS ports are given in Table 3. The number of CSI-RS ports, P, is $2N_1 N_2$.

A UE is not expected to be configured with value of Codebook-Config set to 2 or 3, if the value of codebook-Config-N2 is set to 1. A UE may use $i_{1,2}=0$ and shall not report $i_{1,2}$ if the value of codebook-Config-N2 is set to 1. A first PMI value $i_1$ corresponds to the codebook indices pair $\{i_{1,1}, i_{1,2}\}$, and a second PMI value $i_2$ corresponds to the codebook index $i_2$ given in Table 4. In some cases codebook subsampling is supported. The sub-sampled codebook for PUCCH mode 2-1 for value of parameter Codebook-Config set to 2, 3, or 4 is defined in LTE specification for PUCCH Reporting Type 1a.

TABLE 3

Supported configurations of $(O_1, O_2)$ and $(N_1, N_2)$

| Number of CSI-RS antenna ports, P | $(N_1, N_2)$ | $(O_1, O_2)$ |
|---|---|---|
| 8 | (2, 2) | (4, 4), (8, 8) |
| 12 | (2, 3) | (8, 4), (8, 8) |
|  | (3, 2) | (8, 4), (4, 4) |
| 16 | (2, 4) | (8, 4), (8, 8) |
|  | (4, 2) | (8, 4), (4, 4) |
|  | (8, 1) | (4, —), (8, —) |

TABLE 4

Codebook for 1-layer CSI reporting using antenna ports 15 to 14 + P

| Value of Codebook-Config. | $i_{1,1}$ | $i_{1,2}$ | $i_2$ | | | |
|---|---|---|---|---|---|---|
| 1 | | | 0 | | 1 | |
|  | $0, 1, \ldots, O_1 N_1 - 1$ | $0, 1, \ldots, O_2 N_2 - 1$ | $W_{i_{1,1}, i_{1,2}, 0}^{(1)}$ | | $W_{i_{1,1}, i_{1,2}, 1}^{(1)}$ | |
|  | | | 2 | | 3 | |
|  | $0, 1, \ldots, O_1 N_1 - 1$ | $0, 1, \ldots, O_2 N_2 - 1$ | $W_{i_{1,1}, i_{1,2}, 2}^{(1)}$ | | $W_{i_{1,1}, i_{1,2}, 3}^{(1)}$ | |

$$\text{where } W_{l,m,n}^{(1)} = \frac{1}{\sqrt{P}} \begin{bmatrix} v_{l,m} \\ \varphi_n v_{l,m} \end{bmatrix}$$

| Value of Codebook-Config. | $i_{1,1}$ | $i_{1,2}$ | $i_2$ | |
|---|---|---|---|---|
| 2 | | | 0 | 1 |
|  | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0}^{(1)}$ | $W_{2i_{1,1}, 2i_{1,2}, 1}^{(1)}$ |
|  |  |  | 2 | 3 |
|  | $0, 1, \ldots, \frac{N_1 O_1}{2} - 1$ | $0, 1, \ldots, \frac{N_2 O_2}{2} - 1$ | $W_{2i_{1,1}, 2i_{1,2}, 2}^{(1)}$ | $W_{2i_{1,1}, 2i_{1,2}, 3}^{(1)}$ |
|  |  |  | 4 | 5 |
|  | $0, 1, \ldots, \frac{N_1 O_1}{2} - 1$ | $0, 1, \ldots, \frac{N_2 O_2}{2} - 1$ | $W_{2i_{1,1}+1, 2i_{1,2}, 0}^{(1)}$ | $W_{2i_{1,1}+1, 2i_{1,2}, 1}^{(1)}$ |
|  |  |  | 6 | 7 |
|  | $0, 1, \ldots, \frac{N_1 O_1}{2} - 1$ | $0, 1, \ldots, \frac{N_2 O_2}{2} - 1$ | $W_{2i_{1,1}+1, 2i_{1,2}, 2}^{(1)}$ | $W_{2i_{1,1}+1, 2i_{1,2}, 3}^{(1)}$ |
|  |  |  | 8 | 9 |
|  | $0, 1, \ldots, \frac{N_1 O_1}{2} - 1$ | $0, 1, \ldots, \frac{N_2 O_2}{2} - 1$ | $W_{2i_{1,1}, 2i_{1,2}+1, 0}^{(1)}$ | $W_{2i_{1,1}, 2i_{1,2}+1, 1}^{(1)}$ |
|  |  |  | 10 | 11 |
|  | $0, 1, \ldots, \frac{N_1 O_1}{2} - 1$ | $0, 1, \ldots, \frac{N_2 O_2}{2} - 1$ | $W_{2i_{1,1}, 2i_{1,2}+1, 2}^{(1)}$ | $W_{2i_{1,1}, 2i_{1,2}+1, 3}^{(1)}$ |
|  |  |  | 12 | 13 |
|  | $0, 1, \ldots, \frac{N_1 O_1}{2} - 1$ | $0, 1, \ldots, \frac{N_2 O_2}{2} - 1$ | $W_{2i_{1,1}+1, 2i_{1,2}+1, 0}^{(1)}$ | $W_{2i_{1,1}+1, 2i_{1,2}+1, 1}^{(1)}$ |
|  |  |  | 14 | 15 |

TABLE 4-continued

Codebook for 1-layer CSI reporting using antenna ports 15 to 14 + P

| Value of Codebook-Config. | $i_{1,1}$ | $i_{1,2}$ | $i_2$ | |
|---|---|---|---|---|
| | $0, 1, \ldots, \frac{N_1 O_1}{2} - 1$ | $0, 1, \ldots, \frac{N_2 O_2}{2} - 1$ | $W^{(1)}_{2i_{1,1}+1, 2i_{1,2}+1, 2}$ | $W^{(1)}_{2i_{1,1}+1, 2i_{1,2}+1, 3}$ |

$$\text{where } W^{(1)}_{l,m,n} = \frac{1}{\sqrt{P}} \begin{bmatrix} v_{l,m} \\ \varphi_n v_{l,m} \end{bmatrix}$$

| | | | | |
|---|---|---|---|---|
| 3 | | | 0 | 1 |
| | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ |
| | | | 2 | 3 |
| | $0, 1, \ldots, \frac{N_1 O_1}{2} - 1$ | $0, 1, \ldots, \frac{N_2 O_2}{2} - 1$ | $W^{(1)}_{2x,2y,2}$ | $W^{(1)}_{2x,2y,3}$ |
| | | | 4 | 5 |
| | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ |
| | | | 6 | 7 |
| | $0, 1, \ldots, \frac{N_1 O_1}{2} - 1$ | $0, 1, \ldots, \frac{N_2 O_2}{2} - 1$ | $W^{(1)}_{2x+2,2y,2}$ | $W^{(1)}_{2x+2,2y,3}$ |
| | | | 8 | 9 |
| | $0, 1, \ldots, \frac{N_1 O_1}{2} - 1$ | $0, 1, \ldots, \frac{N_2 O_2}{2} - 1$ | $W^{(1)}_{2x+1,2y+1,0}$ | $W^{(1)}_{2x+1,2y+1,1}$ |
| | | | 10 | 11 |
| | $0, 1, \ldots, \frac{N_1 O_1}{2} - 1$ | $0, 1, \ldots, \frac{N_2 O_2}{2} - 1$ | $W^{(1)}_{2x+1,2y+1,2}$ | $W^{(1)}_{2x+1,2y+1,3}$ |
| | | | 12 | 13 |
| | $0, 1, \ldots, \frac{N_1 O_1}{2} - 1$ | $0, 1, \ldots, \frac{N_2 O_2}{2} - 1$ | $W^{(1)}_{2x+3,2y+1,0}$ | $W^{(1)}_{2x+3,2y+1,1}$ |
| | | | 14 | 15 |
| | $0, 1, \ldots, \frac{N_1 O_1}{2} - 1$ | $0, 1, \ldots, \frac{N_2 O_2}{2} - 1$ | $W^{(1)}_{2x+3,2y+1,2}$ | $W^{(1)}_{2x+3,2y+1,3}$ |

$$\text{where } x = i_{1,1}, \ y = i_{1,2}, \ W^{(1)}_{l,m,n} = \frac{1}{\sqrt{P}} \begin{bmatrix} v_{l,m} \\ \varphi_n v_{l,m} \end{bmatrix}, \text{ if } N_1 \geq N_2$$

$$x = i_{1,2}, \ y = i_{1,1}, \ W^{(1)}_{l,m,n} = \frac{1}{\sqrt{P}} \begin{bmatrix} v_{m,l} \\ \varphi_n v_{m,l} \end{bmatrix}, \text{ if } N_1 < N_2$$

| | | | | |
|---|---|---|---|---|
| 4 | | | 0 | 1 |
| | $0, 1, \ldots, \frac{N_1 O_1}{2} - 1$ | $0, 1, \ldots, \frac{N_2 O_2}{2} - 1$ | $W^{(1)}_{2x,2y,0}$ | $W^{(1)}_{2x,2y,1}$ |
| | | | 2 | 3 |
| | $0, 1, \ldots, \frac{N_1 O_1}{2} - 1$ | $0, 1, \ldots, \frac{N_2 O_2}{2} - 1$ | $W^{(1)}_{2x,2y,2}$ | $W^{(1)}_{2x,2y,3}$ |
| | | | 4 | 5 |
| | $0, 1, \ldots, \frac{N_1 O_1}{2} - 1$ | $0, 1, \ldots, \frac{N_2 O_2}{2} - 1$ | $W^{(1)}_{2x+1,2y,0}$ | $W^{(1)}_{2x+1,2y,1}$ |

TABLE 4-continued

Codebook for 1-layer CSI reporting using antenna ports 15 to 14 + P

| Value of Codebook-Config. | $i_{1,1}$ | $i_{1,2}$ | $i_2$ | |
|---|---|---|---|---|
| | | | 6 | 7 |
| | $0, 1, \ldots, \frac{N_1 O_1}{2} - 1$ | $0, 1, \ldots, \frac{N_2 O_2}{2} - 1$ | $W^{(1)}_{2x+1,2y,2}$ | $W^{(1)}_{2x+1,2y,3}$ |
| | | | 8 | 9 |
| | $0, 1, \ldots, \frac{N_1 O_1}{2} - 1$ | $0, 1, \ldots, \frac{N_2 O_2}{2} - 1$ | $W^{(1)}_{2x+2,2y,0}$ | $W^{(1)}_{2x+2,2y,1}$ |
| | | | 10 | 11 |
| | $0, 1, \ldots, \frac{N_1 O_1}{2} - 1$ | $0, 1, \ldots, \frac{N_2 O_2}{2} - 1$ | $W^{(1)}_{2x+2,2y,2}$ | $W^{(1)}_{2x+2,2y,3}$ |
| | | | 12 | 13 |
| | $0, 1, \ldots, \frac{N_1 O_1}{2} - 1$ | $0, 1, \ldots, \frac{N_2 O_2}{2} - 1$ | $W^{(1)}_{2x+3,2y,0}$ | $W^{(1)}_{2x+3,2y,1}$ |
| | | | 14 | 15 |
| | $0, 1, \ldots, \frac{N_1 O_1}{2} - 1$ | $0, 1, \ldots, \frac{N_2 O_2}{2} - 1$ | $W^{(1)}_{2x+3,2y,2}$ | $W^{(1)}_{2x+3,2y,3}$ | where $x = i_{1,1}$, $y = i_{1,2}$, $W^{(1)}_{l,m,n} = \frac{1}{\sqrt{P}} \begin{bmatrix} v_{l,m} \\ \varphi_n v_{l,m} \end{bmatrix}$, if $N_1 \geq N_2$ $x = i_{1,2}$, $y = i_{1,1}$, $W^{(1)}_{l,m,n} = \frac{1}{\sqrt{P}} \begin{bmatrix} v_{m,l} \\ \varphi_n v_{m,l} \end{bmatrix}$, if $N_1 < N_2$ The mapping between Codebook-Config parameter to rank 1 beam grouping indicated by ($i_{1,1}$, $i_{1,2}$) is illustrated in FIG. 29. As shown, Codebook-Config=1 corresponds to one beam (black square located at (0, 0)), and Codebook-Config=2, 3, 4 correspond to 4 beams (shown as black squares) which are located inside the (4, 2) beam grid depending on the Codebook-Config value.

FIG. 13 illustrates an example dual-polarized antenna port layouts for {20, 24, 28, 32} ports 1300 according to embodiments of the present disclosure. An embodiment of the dual-polarized antenna port layouts for {20, 24, 28, 32} ports 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

Note that Rel. 10 8-Tx and Rel. 12 4-Tx codebooks in LTE specification can be mapped to Codebook-Config=4 because Rel. 10 8-Tx and Rel. 12 4-Tx codebooks correspond to 1D antenna port layouts. An eFD-MIMO may support {20, 24, 28, 32} antenna ports in LTE Rel. 14 of LTE specification. Assuming rectangular (1D or 2D) port layouts, there are several possible ($N_1$, $N_2$) values for {20, 24, 28, 32} ports (as shown in Table 6). An illustration of 1D and 2D antenna port layouts for these ($N_1$,$N_2$) values are shown in FIG. 13.

TABLE 6

Supported configurations of ($O_1$, $O_2$) and ($N_1$, $N_2$)

| Number of CSI-RS antenna ports, P | ($N_1$, $N_2$) | ($O_1$, $O_2$) |
|---|---|---|
| 20 | (1, 10) | (—, 4), (—, 8) |
| | (2, 5) | (8, 4), (8, 8) |
| | (5, 2) | (8, 4), (4, 4) |
| | (10, 1) | (4, —), (8, —) |
| 24 | (1, 12) | (—, 4), (—, 8) |
| | (2, 6) | (8, 4), (8, 8) |
| | (3, 4) | (8, 4), (8, 8) |
| | (4, 3) | (8, 4), (4, 4) |
| | (6, 2) | (8, 4), (4, 4) |
| | (12, 1) | (4, —), (8, —) |
| 28 | (1, 14) | (—, 4), (—, 8) |
| | (2, 7) | (8, 4), (8, 8) |
| | (7, 2) | (8, 4), (4, 4) |
| | (14, 1) | (4, —), (8, —) |
| 32 | (1, 16) | (—, 4), (—, 8) |
| | (2, 8) | (8, 4), (8, 8) |
| | (4, 4) | (4, 4), (8, 8) |
| | (8, 2) | (8, 4), (4, 4) |
| | (16, 1) | (4, —), (8, —) |

Figure 14:
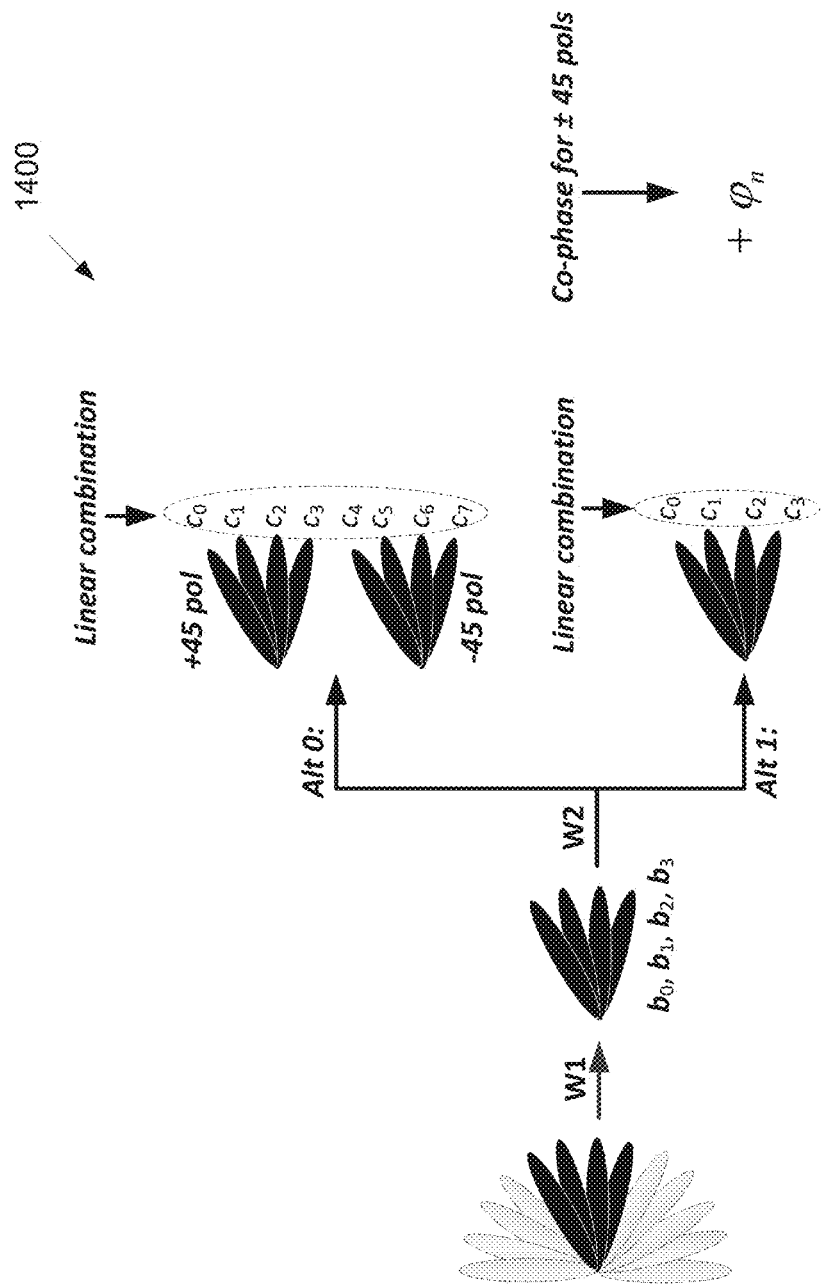
FIG. 14 illustrates an example linear combination pre-coding matrix indicator (PMI) pre-coder (L=4) according to embodiments of the present disclosure.

FIG. 14 illustrates an example linear combination pre-coding matrix indicator (PMI) 1400 pre-coder (L=4) according to embodiments of the present disclosure. An embodiment of the linear combination pre-coding matrix indicator (PMI) 1400 pre-coder (L=4) shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with a LC codebook: $W=W_1W_2$, where $W_1$ is for WB and long-term first PMI $i_1$ or PMI pair $(i_{1,1},i_{1,2})$ feedback, which indicates a $2N_1N_2 \times 2L$ basis matrix B whose columns correspond to 2L beams from a master basis set, and $W_2$ is for SB and short-term second PMI $i_2$ feedback, which indicates a coefficient vector for linear combination.

An illustration of the proposed LC codebook for L=4 is shown in FIG. 14. There are two alternatives for LC codebook depending on whether co-phase for the two polarizations is reported separately or jointly with the coefficients. In one example without co-phase, the co-phase for the two polarizations is not reported separately and is merged with coefficient reporting. In this alternative, the number of beams for linear combination is 2L (where 2 is for the two polarizations, for example, +45 and −45), and hence a coefficient vector c of length 2L is reported. The rank-1 LC pre-coder in this case is given by $W^{(1)}=Bc$. In another example with co-phase, the co-phase for the two polarizations is reported separately. In this alternative, a coefficient vector c of length L and a co-phase matrix $\phi$ for the two polarizations of dimension $2L \times L$ are reported. So, the rank-1 LC pre-coder is given by $W^{(1)}=B\phi c$.

In some embodiments, the master basis set is an oversampled DFT codebook (1D or 2D depending on the antenna port layouts), and the basis matrix B is one of the following types. In one example of Basis 0, the basis corresponds to L beams for each of the two polarizations, $b_0, b_1, \ldots b_{L-1}$ and $b'_0, b'_1, \ldots b'_{L-1}$, i.e. the basis matrix is given by $$B = \begin{bmatrix} b_0, b_1, \ldots b_{L-1} & 0\ 0\ \ldots 0 \\ 0\ 0\ \ldots 0 & b'_0, b'_1, \ldots b'_{L-1} \end{bmatrix}.$$

In the rest of the present disclosure, it is assumed that the bases for the two polarizations are the same, i.e., $b_0, b_1, \ldots b_{L-1}=b'_0, b'_1, \ldots b'_{L-1}$. The embodiments of the present disclosure, however, are applicable to the case in which the bases for the two polarizations are different, i.e., $b_0, b_1, \ldots b_{L-1} \neq b'_0, b'_1, \ldots b'_{L-1}$.

In another example of basis 1, the basis corresponds to L beams $b_0, b_1, \ldots b_{L-1}$ for each of the two polarizations and (WB component of) magnitude or power levels $m_0^{(1)}, m_1^{(1)}, \ldots m_{L-1}^{(1)}$ for L beams, i.e., the basis matrix is given by $$B = \begin{bmatrix} b_0, b_1, \ldots b_{L-1} & 0\ 0\ \ldots 0 \\ 0\ 0\ \ldots 0 & b_0, b_1, \ldots b_{L-1} \end{bmatrix}$$

$$\text{diag}(m_0^{(1)}, m_1^{(1)}, \ldots m_{L-1}^{(1)}, m_0^{(1)}, m_1^{(1)}, \ldots m_{L-1}^{(1)}) =$$

$$\begin{bmatrix} m_0^{(1)}b_0, m_1^{(1)}b_1, \ldots m_{L-1}^{(1)}b_{L-1} & 0\ 0\ \ldots 0 \\ 0\ 0\ \ldots 0 & m_0^{(1)}b_0, m_1^{(1)}b_1, \ldots m_{L-1}^{(1)}b_{L-1} \end{bmatrix}$$

where diag(., ., . . . , .) is a diagonal matrix.

In yet another example of basis 2, the basis corresponds to L beams $b_0, b_1, \ldots b_{L-1}$ for each of the two polarizations and (WB component of) co-phase values $\phi_0^{(1)}, \phi_1^{(1)}, \ldots \phi_{L-1}^{(1)}$ for the two polarizations and L beams, i.e., the basis matrix is given by $$B = \begin{bmatrix} b_0 b_1 \ldots b_{L-1} & 0\ 0\ \ldots 0 \\ 0\ 0\ \ldots 0 & b_0 b_1 \ldots b_{L-1} \end{bmatrix} \begin{bmatrix} e_0 & e_1 & \ldots & e_{L-1} \\ \phi_0^{(1)}e_0 & \phi_1^{(1)}e_1 & \ldots & \phi_{L-1}^{(1)}e_{L-1} \end{bmatrix} =$$

$$\begin{bmatrix} b_0 & b_1 & \ldots & b_{L-1} \\ \phi_0^{(1)}b_0 & \phi_1^{(1)}b_1 & \ldots & \phi_{L-1}^{(1)}b_{L-1} \end{bmatrix},$$

where $e_l$ is a length L beam selection vector whose (l+1)-th entry is 1 (to select the l-th beam) and the rest of the entries are all zero.

In yet another example of basis 3, the basis corresponds to L beams $b_0 b_1 \ldots b_{L-1}$ for each of the two polarizations (WB component of) co-phase values $\phi_0^{(1)}, \phi_1^{(1)}, \ldots \phi_{L-1}^{(1)}$ for the two polarizations and L beams, and (WB component of) magnitude or power levels $m_0^{(1)}, m_1^{(1)}, \ldots m_{L-1}^{(1)}$ for L beams, i.e., the basis matrix is given by $$B = \begin{bmatrix} b_0 b_1 \ldots b_{L-1} & 0\ 0\ \ldots 0 \\ 0\ 0\ \ldots 0 & b_0 b_1 \ldots b_{L-1} \end{bmatrix} \begin{bmatrix} e_0 & e_1 & \ldots & e_{L-1} \\ \phi_0^{(1)}e_0 & \phi_1^{(1)}e_1 & \ldots & \phi_{L-1}^{(1)}e_{L-1} \end{bmatrix}$$

$$\text{diag}(m_0^{(1)}, m_1^{(1)}, \ldots m_{L-1}^{(1)}) =$$

$$\begin{bmatrix} m_0^{(1)}b_0 & m_1^{(1)}b_1 & \ldots & m_{L-1}^{(1)}b_{L-1} \\ m_0^{(1)}\phi_0^{(1)}b_0 & m_1^{(1)}\phi_1^{(1)}b_1 & \ldots & m_{L-1}^{(1)}\phi_{L-1}^{(1)}b_{L-1} \end{bmatrix}.$$

In some embodiments, the master basis set is an oversampled DFT codebook (1D or 2D depending on the antenna port layouts), and the basis matrix B comprises of one of Basis 0-3 as mentioned above; and a WB B value, where $1 \leq B \leq L$, for SB selection of B out of L beams.

In the rest of the present disclosure, the notation $\phi_l^{(1)}$ and $\phi_l^{(2)}$, respectively, for WB and SB components of the co-phase $\phi_l$ will be used. In some embodiments, the co-phase matrix $$\phi = \begin{bmatrix} e_0 & e_1 & \ldots & e_{L-1} \\ \phi_0 e_0 & \phi_1 e_1 & \ldots & \phi_{L-1} e_{L-1} \end{bmatrix}$$

comprising of co-phase values $\phi_0, \phi_1, \ldots \phi_{L-1}$ for the two polarizations is according to one of the following types. In one example of Single, each co-phase value $\phi_l$ is selected from a single codebook. An example of the codebook is K-PSK codebook, where a few example values of K is 2 (BPSK), 4 (QPSK), and 8 (8-PSK). The reported co-phase value can either be WB, i.e., $\phi_l=\phi_l^{(1)}$, or SB, i.e., $\phi_l=\phi_l^{(2)}$. In another example of double, each co-phase value is decomposed as $\phi_l=\phi_l^{(1)}\phi_l^{(2)}$ and is selected from a double codebook $C_{coph}=C_{coph}^{(1)}C_{coph}^{(2)}$, where $C_{coph}^{(1)}$ and $C_{coph}^{(2)}$ respectively are codebooks for WB and SB components of the co-phase $\phi_l^{(1)}$ and $\phi_l^{(2)}$, respectively. An example of the double codebook is $$C_{coph}^{(1)}\{e^{j\frac{\pi}{4}}, e^{j\frac{3\pi}{4}}, e^{j\frac{5\pi}{4}}, e^{j\frac{7\pi}{4}}\} \text{ and } C_{coph}^{(2)} = \{e^{j\frac{\pi}{4}}, e^{-j\frac{\pi}{4}}\}.$$

In one embodiment, the co-phase for L beams are the same, i.e., $\phi_l=\phi_k$ for all l, k in $\{0, 1, \ldots, L-1\}$. In another embodiment, the co-phase for L beams are different, i.e., $\phi_l \neq \phi_k$ for all l, k in $\{0, 1, \ldots, L-1\}$. In this later method, when the co-phase codebook is a double codebook, then at least one of WB and SB co-phase codebook, $C_{coph}^{(1)}$ and $C_{coph}^{(2)}$, are such that at least $\phi_l^{(1)}\phi_k^{(1)}$ or $\phi_l^{(2)} \neq \phi_k^{(2)}$ for all l, k in {0, 1, ..., L−1}). For instance, $\phi_l^{(1)} = \phi_k^{(1)}$ and $\phi_l^{(2)} \neq \phi_k^{(2)}$ (i.e. same WB and different SB co-phase components for all beams) for all l, k in {0, 1, ..., L−1}.

In the rest of the present disclosure, the coefficient $c_l$ is represented as $m_l \alpha_l$, where $m_l$ and $\alpha_l$ respectively are magnitude and phase of coefficient $c_l$. Similar to the notation used earlier in the present disclosure, $m_l^{(1)}$ and $m_l^{(2)}$ are used for WB and SB components of the magnitude $m_l$ (double magnitude codebook) and $\alpha_l^{(1)}$ and $\alpha_l^{(2)}$ are used for WB and SB components of the phase $\alpha_l$ (double phase codebook).

In some embodiments, the coefficient vector $c = [c_0\ c_1\ \ldots\ c_{2L-1}]$ (Alt 0) or $[c_0\ c_1\ \ldots\ c_{L-1}]$ (Alt 1) comprises of at least one of the following components. In one embodiment, the coefficient vector comprises Magnitude $\{m_l: l=0, 1, \ldots, L-1\text{ or }2L-1\}$. In such embodiment, there are two alternatives for coefficient magnitudes: constant-modulus (CM): The magnitudes of all coefficients are the same, i.e., $m_l = m_k$ for all l, k, and hence not reported; and non-CM: The magnitudes of coefficients can be different, and the magnitude codebook can be a combination of the following. In one example of scalar or vector, the coefficient magnitudes are quantized jointly using a vector codebook. An example of the vector magnitude codebook is a unit-magnitude vector codebook in which codewords are such that the codewords are non-negative and their norm is one. Alternatively, coefficient magnitudes are quantized separately using a scalar codebook. An example of the scalar magnitude codebook is a uniform codebook in [0, U], for example U=1. In another example of single or double, the coefficient magnitude codebook is either a single codebook or a double codebook. In case of a single magnitude codebook, magnitude reporting can either be WB (i.e. $m_l = m_l^{(1)}$) or SB (i.e. $m_l = m_l^{(2)}$). So, non-CM coefficient reporting is either WB or SB. In case of a double magnitude codebook, $m_l = m_l^{(1)} m_l^{(2)}$ where at least one of $m_l^{(1)}$ and $m_l^{(2)}$ reporting is non-CM.

In one embodiment, the coefficient vector comprises phase $\{\alpha_0: l=0, 1, \ldots L-1\text{ or }2L-1\}$. In such embodiment, there are two alternatives for coefficient phases. In one example of Vector phase codebook, the phases of coefficients are quantized jointly using a vector codebook. An example of the vector phase codebook is an oversampled DFT codebook. Two alternatives in this case are as follows. In one example of single, the coefficient phase vector $a = [\alpha_0\ \alpha_1\ \ldots\ \alpha_{2L-1}]$ (Alt 0) or $[\alpha_0\ \alpha_1\ \ldots\ \alpha_{L-1}]$ (Alt 1) is selected from a single vector phase codebook, an example of which is a DFT codebook with appropriate oversampling factor O, in which a belongs to:

(Alt 0)
$$C_{coef,0} = \left\{\begin{bmatrix} 1 & e^{j\frac{2\pi k}{2OL}} & \ldots & e^{j\frac{2\pi k(2L-1)}{2OL}} \end{bmatrix}^T : k = 0, 1, \ldots, 2OL-1\right\}; \text{ or}$$

(Alt 1)
$$C_{coef,1} = \left\{\begin{bmatrix} 1 & e^{j\frac{2\pi k}{OL}} & \ldots & e^{j\frac{2\pi k(L-1)}{OL}} \end{bmatrix}^T : k = 0, 1, \ldots, OL-1\right\}.$$

In another example of double, the coefficient phase vector is decomposed as $a = a^{(1)} a^{(2)}$ and is selected from a double vector phase codebook, an example of which is double DFT codebook in which $a^{(1)}$ and $a^{(2)}$ are selected from a DFT codebook with appropriate oversampling factor O such that $a^{(1)}$ represents a group of K DFT vectors, and $a^{(2)}$ selects one DFT vector from the group. A few examples of K value are 4, 8, and 16. This is similar to the Rel. 10 8-Tx dual-stage codebook.

In another example of scalar phase codebook, the phases of coefficients are quantized separately using a scalar codebook. An example of the scalar phase codebook is K-PSK codebook, where a few example values of K is 2 (BPSK), 4 (QPSK), and 8 (8-PSK). Two alternatives in this case are as follows. In one alternative of single, each coefficient phase $\alpha_l$ is selected from a single codebook, e.g. $C_{coef} = \{1, -1, j, -j\}$. In another alternative of double, each coefficient phase is decomposed as $\alpha_l = \alpha_l^{(1)} \alpha_l^{(2)}$ and is selected from a double codebook, e.g. $C_{coef} = C_{coef}^{(1)} C_{coef}^{(2)}$, where $C_{coef}^{(1)}$ and $C_{coef}^{(2)}$ respectively are codebooks for WB and SB components of the phase. An example of the double phase codebook is $$C_{coef}^{(1)} \left\{e^{j\frac{\pi}{4}}, e^{j\frac{3\pi}{4}}, e^{j\frac{5\pi}{4}}, e^{j\frac{7\pi}{4}}\right\} \text{ and } C_{coef}^{(2)} = \left\{e^{j\frac{\pi}{4}}, e^{-j\frac{\pi}{4}}\right\}.$$

In one embodiment, the coefficient vector comprises beam selection: the third component of the coefficient vector is B out of L beam selection, where $1 \leq B \leq L$ and this selection is per SB. The coefficient vector with beam selection matrix $E_B$ can be expressed as $c = E_B c_B$, where the length-B coefficient vector after beam selection is $c_B = [c_0\ c_1\ \ldots\ c_{B-1}]$ and, for example, for 4 beams, i.e., L=4, 2L×B beam selection matrix $E_B$ is as given in Table 7.

TABLE 7

| | Beam selection matrix | |
|---|---|---|
| B | Number of candidate beam selection matrices ($_B^4$) | Beam selection matrix $E_B$ |
| 1 | 4 | $E_{1,0} = e_0$, $E_{1,1} = e_1$, $E_{1,2} = e_2$, $E_{1,3} = e_3$ |
| 2 | 6 | $E_{2,0} = [e_0\ e_1]$, $E_{2,1} = [e_0\ e_2]$, $E_{2,2} = [e_0\ e_3]$, $E_{2,3} = [e_1\ e_2]$, $E_{2,4} = [e_1\ e_3]$, $E_{2,5} = [e_2\ e_3]$ |
| 3 | 4 | $E_{3,0} = [e_0\ e_1\ e_2]$, $E_{3,1} = [e_0\ e_1\ e_3]$, $E_{3,2} = [e_0\ e_2\ e_3]$, $E_{3,3} = [e_1\ e_2\ e_3]$ |
| 4 | 1 | $E_{4,0} = [e_0\ e_1\ e_2\ e_3]$ |

A few alternatives for SB beam selection is as follows. In one alternative, the l value for SB beam selection is fixed in specification, for example l=1, 2, or 4. In another alternative, the UE is configured with a single l value for SB beam selection via RRC signaling, for example, l=1, 2, 3, or 4. In yet another alternative, the UE is configured with multiple l values for SB beam selection, for example, l={1, 2, 4}, {1, 2, 3, 4}, or {2, 4}. In this example, the UE selects and reports an l value for beam selection in the CSI report where this reporting is WB (hence l values do not change across SBs) or SB (hence l values can change across SBs).

In some embodiments, the UE is configured with an LC codebook which includes a uniform, unit-norm vector magnitude (or beam power) codebook assuming B out of L beam selection, where $1 \leq B \leq L$, and is constructed according to the following conditions: the minimum power level=1/2L, (ex: 1/8 for L=4); the maximum power level=1−(B−1)/2L; the power levels are uniform with spacing 1/2L, (ex: 1/8 for L=4); and the sum of beam power levels comprising a beam power vector is one.

An example of such vector magnitude or beam power codebook is shown in Table 8 assuming B=1, 2, 3, 4 out of L=4 beams for beam selection. Note that the number of beam power vectors is 1, 7, 21, and 35 for B=1, 2, 3, and 4, respectively. So, the total number of beam power vectors=64. If the UE is configured with or reports a WB B value for beam selection, then: for B=1, the number bits to indicate a beam power vector is $\lceil \log_2 1 \rceil=0$; for B=2, the number bits to indicate a beam power vector is $\lceil \log_2 7 \rceil=3$; for B=3, the number bits to indicate a beam power vector is $\lceil \log_2 21 \rceil=5$; and for B=4, the number bits to indicate a beam power vector is $\lceil \log_2 35 \rceil=6$.

And if the UE is configured with or reports a SB B value for beam selection, then the UE is configured with or reports a WB B value for beam selection, then the total number of possible beam power vectors=

$$\sum_{B=1}^{4} \binom{4}{B} \times N_B = 1 \times 4 + 6 \times 7 + 4 \times 21 + 1 \times 35 = 165,$$

which implies that the number of bits to indicated a beam power vector is $\lceil \log_2 165 \rceil=8$. The codebook for other L values such as L=8 can be constructed similarly.

TABLE 8

Vector magnitude codebook for L = 4 beams in total

| Number of selected beams (B value) | Power levels | Beam power vectors $m = [m_0 \, m_1 \ldots m_{B-1}]$ | Total number of beam power vectors ($N_B$) |
|---|---|---|---|
| 1 | 1 | 1 | 1 |
| 2 | [7 1] | [7/8 1/8], [1/8, 7/8] | 7 |
|   | [6 2] | [6/8 2/8], [2/8 6/8] | |
|   | [5 3] | [3/8 5/8], [5/8 3/8] | |
|   | [4 4] | [4/8 4/8] | |
| 3 | [6 1 1] | [6/8, 1/8, 1/8], [1/8, 6/8, 1/8], [1/8, 1/8, 6/8] | 21 |
|   | [5 2 1] | [5/8, 2/8, 1/8], [5/8, 1/8, 2/8], [2/8, 5/8, 1/8], [2/8, 1/8, 5/8], [1/8, 5/8, 2/8], [1/8, 2/8, 5/8] | |
|   | [4 2 2] | [4/8, 2/8, 2/8], [2/8, 4/8, 2/8], [2/8, 2/8, 4/8] | |
|   | [4 3 1] | [4/8, 3/8, 1/8], [4/8, 1/8, 3/8], [3/8, 4/8, 1/8], [1/8, 4/8, 3/8], [1/8, 4/8, 3/8], [1/8, 3/8, 4/8] | |
|   | [3 3 2] | [3/8, 3/8, 2/8], [3/8, 2/8, 3/8], [2/8, 3/8, 3/8] | |
| 4 | [5 1 1 1] | [5/8, 1/8, 1/8, 1/8], [1/8, 5/8, 1/8, 1/8], [1/8, 1/8, 5/8, 1/8], [1/8, 1/8, 1/8, 5/8] | 35 |
|   | [4 2 1 1] | [4/8, 2/8, 1/8, 1/8], [4/8, 1/8, 2/8, 1/8], [4/8, 1/8, 1/8, 2/8], [2/8, 4/8, 1/8, 1/8], [1/8, 4/8, 2/8, 1/8], [1/8, 4/8, 1/8, 2/8], [1/8, 2/8, 4/8, 1/8], [2/8, 1/8, 4/8, 1/8], [1/8, 1/8, 4/8, 2/8], [1/8, 2/8, 1/8, 4/8], [1/8, 1/8, 2/8, 4/8], [2/8, 1/8, 1/8, 4/8] | |
|   | [3 3 1 1] | [3/8, 3/8, 1/8, 1/8], [3/8, 1/8, 3/8, 1/8], [3/8, 1/8, 1/8, 3/8], [1/8, 3/8, 3/8, 1/8], [1/8, 3/8, 1/8, 3/8], [1/8, 1/8, 3/8, 3/8] | |
|   | [3 2 2 1] | [3/8, 2/8, 2/8, 1/8], [3/8, 2/8, 1/8, 2/8], [3/8, 1/8, 2/8, 2/8], [2/8, 3/8, 2/8, 1/8], [2/8, 3/8, 1/8, 2/8], [2/8, 2/8, 3/8, 1/8], [2/8, 2/8, 1/8, 3/8], [2/8, 1/8, 3/8, 2/8], [2/8, 1/8, 2/8, 3/8], [1/8, 3/8, 2/8, 2/8], [1/8, 2/8, 3/8, 2/8], [1/8, 2/8, 2/8, 3/8] | |
|   | [2 2 2 2] | [2/8, 2/8, 2/8, 2/8] | |

In some embodiments, a UE is configured with a multi-stage (at least two stages) LC codebook with at least one stage for WB components of the CSI, where WB components include at least one of the following: a beam group comprising of L beams; WB selection of B value for SB beam selection; WB component of co-phase values for L beams (for dual-polarized antenna arrays); WB component of LC coefficient vector (magnitude or/and phase); and at least one stage for SB components of the CSI, where SB components include at least one of the following: B out of L beam selection; SB component of co-phase values for L beams (for dual-polarized antenna arrays); and SB component of LC coefficient vector (magnitude or/and phase).

In one embodiment, WB components are reported jointly using a single PMI it or $(i_{1,1}, i_{1,2})$, where the codebook for WB components can be joint (so, one stage WB codebook) or separate (multi-stage WB codebook). In this sub-embodiment, no new CSI reporting type is needed and LTE Rel. 13 Class A $i_1$ or $(i_{1,1}, i_{1,2})$ can be reused.

In another embodiment, WB components are reported separately using multiple PMIs, where the codebook for WB components can be joint (so, one stage WB codebook) or separate (multi-stage WB codebook). In one example, 2 WB PMIs are reported which correspond to $i_0$ and $i_1$ or $(i_{1,1}, i_{1,2})$, where $i_1$ or $(i_{1,1}, i_{1,2})$ is used to indicate a beam group as in LTE Rel. 13 Class A codebook, and $i_0$ is used to indicate the rest of the WB CSI components such as WB beam power and B value for beam selection. In this sub-embodiment, a new CSI reporting type is needed to report $i_0$ indicating WB components other than beam groups.

In one embodiment, SB components are reported jointly using a single PMI, where the codebook for SB components can be joint (so, one stage SB codebook) or separate (multi-stage SB codebook). In one example, the $2^{nd}$ PMI $i_2$ of LTE Rel. 13 Class A codebook is used to report SB components of LC codebook. In this example, no new CSI reporting type is needed. In another example, a new PMI $i_3$ is used to indicate the SB components of the LC codebook, and hence a new CSI reporting type to report $i_3$ is needed.

In another embodiment, SB components are reported separately using multiple PMIs, where the codebook for SB components can be joint (so, one stage SB codebook) or separate (multi-stage SB codebook). In one example, 2 SB PMIs are reported which correspond to $i_2$ and $i_3$, where $i_2$ is used to select B beams and B co-phase values as in LTE LTE Rel. 13 Class A codebook, and $i_3$ is used to indicate the rest of the WB CSI components such as SB LC coefficients and B out L beam selection. In this sub-embodiment, a new CSI reporting type is needed to report $i_3$ indicating SB components other than beam and co-phase selection.

Figure 15:
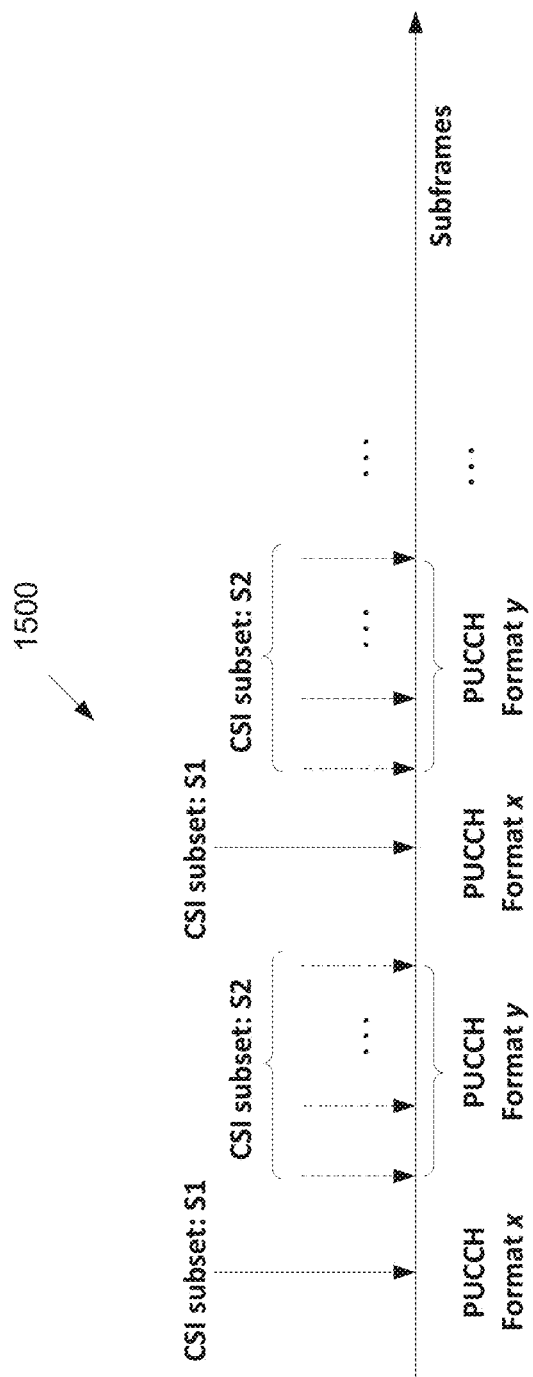
FIG. 15 illustrates an example periodic channel state information (CSI) reporting using a linear combination codebook according to embodiments of the present disclosure.

FIG. 15 illustrates example periodic channel state information (CSI) reporting 1500 using a linear combination codebook according to embodiments of the present disclosure. An embodiment of the periodic channel state information (CSI) reporting 1500 using a linear combination codebook shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured to report PUCCH based periodic CSI, which is derived using the proposed linear combination codebook. The CSI components is divided into two subsets S1 and S2 which are reported in two different PUCCH based periodic CSI reporting instances (or subframes), as illustrated in FIG. 15. A few examples of S1 and S2 are shown in Table 9.

TABLE 9

Examples of two subsets for PUCCH based periodic CSI reporting

| Examples | Alternative | CSI subset S1 | CSI subset S2 |
|---|---|---|---|
| 0 | 0, 1 | all WB CSI components | all SB CSI components |
| 1 | 0 | RI, WB beam group | SB coefficients, CQI |
| 2 | (without co-phase) | RI, WB beam group | SB beam selection, SB coefficients, CQI |
| 3 | | RI, WB beam group, WB beam power | SB coefficients, CQI |
| 4 | | RI, WB beam group, WB beam power | SB beam selection, SB coefficients, CQI |
| 5 | 1 (with co-phase) | RI, WB beam group | SB co-phase, SB coefficients, CQI |
| 6 | | RI, WB beam group | SB beam selection, SB co-phase, SB coefficients, CQI |
| 7 | | RI, WB beam group, WB co-phase | SB co-phase, SB coefficients, CQI |
| 8 | | RI, WB beam group, WB co-phase | SB beam selection, SB co-phase, SB coefficients, CQI |
| 9 | | RI, WB beam group, WB beam power | SB co-phase, SB coefficients, CQI |
| 10 | | RI, WB beam group, WB beam power | SB beam selection, SB co-phase, SB coefficients, CQI |
| 11 | | RI, WB beam group, WB co-phase, WB beam power | SB co-phase, SB coefficients, CQI |
| 12 | | RI, WB beam group, WB co-phase, WB beam power | SB beam selection, SB co-phase, SB coefficients, CQI |

The UE is further configured with PUCCH Format x and y to report S1 and S2, respectively, where x and y are determined based on the number of bits to report S1 and S2, where x and y may or may not be the same. In one example, x=y, and S1 and S2 are reported using the same PUCCH Format, e.g. 2 or 3. In another example, x and y can be different, belong to {2,3}), and are configured based on the associated number of CSI bits. For instance, the UE is configured with PUCCH Format 2 if the number of CSI bits (associated with S1 or S2) is at most 11, and PUCCH Format 3 if the number of CSI bits (associated with S1 or S2) is more than 11 and at most 21.

In another example, x and y are configured based on the configured parameters of the LC codebook. For example, if the UE is configured with B=2 (i.e., 2 beams for LC) in the LC codebook, then the UE reports S1 and S2 using PUCCH Format 2 or 3 or both and if using the UE is configured with B=4 (i.e., 4 beams for LC) then the UE reports S1 and S2 using PUCCH Format 3 only.

In yet another example, x and y are configured based on the CSI components comprising S1 and S2. For instance, for Examples 1, 2, 5, and 6 in Table 9, S1 is reported using PUCCH Format 2 and S2 is reported using PUCCH Format 3; and for Examples 3, 4, 7-12, S1 and S2 are reported using PUCCH Format 3.

In some embodiments, a UE reports the CSI derived using the proposed LC codebook aperiodically using PUSCH only. In some embodiments, a UE is configured to report CSI derived using the proposed LC codebook either periodically on PUCCH or aperiodically using PUSCH depending on LC codebook parameters or CSI components comprising S1 and S2.

In one example, if B=2, then the UE is configured with either PUCCH based periodic CSI reporting according to some embodiments of disclosure or PUSCH based aperiodic CSI reporting. However, if B=4, then only aperiodic CSI can be reported. In another example, if the number of CSI bits associated with S1 or S2 is within 21 bits, then the UE can be configured with both periodic and aperiodic CSI reporting, and if either one of them exceeds 21, then only aperiodic CSI reporting can be configured.

In some embodiments, a UE is configured to report the CSI subset S0 aperiodically using PUSCH, and the CSI subsets S1 and S2 periodically using PUCCH, where periodic reporting of S1 and S2 are according to some embodiments of disclosure. The UE shall derive the CSI subset S0 conditioned on the last reported S1 and S2, the CSI subset S1 conditioned on the last reported S0 and S2, and the CSI subset S2 conditioned on the last reported S0 and S1. In one example, S0 belongs to {WB co-phase, WB beam power, B value}, S1 belongs to {RI, WB beam group}, and S2 belongs to {SB, beam selection, SB coefficient, SB co-phase, CQI}.

In some embodiments, a UE is configured with either LTE Rel. 13 (or an extension in LTE Rel. 14) Class A codebook or proposed linear combination codebook to report CSI. If the UE is configured with LTE Rel. 13 (or an extension in LTE Rel. 14) Class A codebook, then the UE is further configured to report CSI either periodically using PUCCH Format 2 or 3 or both; or aperiodically on PUSCH. And if the UE is configured with the linear combination codebook, then the UE reports the corresponding CSI aperiodically using PUSCH only.

In some embodiments, a UE is configured with the LC codebook with L=4 whose $W_1$ component is constructed using the LTE Rel. 13 Class A $W_1$ codebook (corresponding beam groups are shown in FIG. 29), which are configured using a higher-layer RRC parameter Codebook-Config. The resultant rank 1 and rank 2 $W_1$ codebook in this case is shown in Table 10.

TABLE 10

$W_1$ Codebook for 1-layer and 2-layer CSI reporting using antenna ports 15 to 14 + P

| Value of Codebook-Config | $i_{1,1}$ | $i_{1,2}$ |
|---|---|---|
| 2 | $0, 1, \ldots, \frac{N_1 O_1}{2} - 1$ | $0, 1, \ldots, \frac{N_2 O_2}{2} - 1$ |

$$x_{2i_{1,1}, 2i_{1,2}}$$

$$x_{2i_{1,1}, 2i_{1,2}} = \frac{1}{\sqrt{N_1 N_2}} [\, v_{2i_{1,1}, 2i_{1,2}} \quad v_{2i_{1,1}+1, 2i_{1,2}} \quad v_{2i_{1,1}, 2i_{1,2}+1} \quad v_{2i_{1,1}+1, 2i_{1,2}+1} \,]$$

| 3 | $0, 1, \ldots, \frac{N_1 O_1}{2} - 1$ | $0, 1, \ldots, \frac{N_2 O_2}{2} - 1$ |
|---|---|---|

$$x_{2i_{1,1}, 2i_{1,2}}$$

$$x_{2i_{1,1}, 2i_{1,2}} = \frac{1}{\sqrt{N_1 N_2}} [\, v_{2i_{1,1}, 2i_{1,2}} \quad v_{2i_{1,1}+2, 2i_{1,2}} \quad v_{2i_{1,1}+1, 2i_{1,2}+1} \quad v_{2i_{1,1}+3, 2i_{1,2}+1} \,]; \text{ if } N_1 \geq N_2$$

$$x_{2i_{1,1}, 2i_{1,2}} = \frac{1}{\sqrt{N_1 N_2}} [\, v_{2i_{1,1}, 2i_{1,2}} \quad v_{2i_{1,1}, 2i_{1,2}+2} \quad v_{2i_{1,1}+1, 2i_{1,2}+1} \quad v_{2i_{1,1}+1, 2i_{1,2}+3} \,]; \text{ if } N_1 < N_2$$

| 4 | $0, 1, \ldots, \frac{N_1 O_1}{2} - 1$ | $0, 1, \ldots, \frac{N_2 O_2}{2} - 1$ |
|---|---|---|

$$x_{2i_{1,1}, 2i_{1,2}}$$

$$x_{2i_{1,1}, 2i_{1,2}} = \frac{1}{\sqrt{N_1 N_2}} [\, v_{2i_{1,1}, 2i_{1,2}} \quad v_{2i_{1,1}+1, 2i_{1,2}} \quad v_{2i_{1,1}+2, 2i_{1,2}} \quad v_{2i_{1,1}+3, 2i_{1,2}} \,]; \text{ if } N_1 \geq N_2$$

$$x_{2i_{1,1}, 2i_{1,2}} = \frac{1}{\sqrt{N_1 N_2}} [\, v_{2i_{1,1}, 2i_{1,2}} \quad v_{2i_{1,1}, 2i_{1,2}+1} \quad v_{2i_{1,1}, 2i_{1,2}+2} \quad v_{2i_{1,1}+1, 2i_{1,2}+3} \,]; \text{ if } N_1 < N_2$$

In some embodiments, the norm of a length-N vector $v = [v_0 \ v_1 \ \ldots \ v_{N-1}]^T$ is defined as $$\|v\| = \sqrt{\sum_{i=0}^{N-1} |v_i|^2},$$

where $|v_i|$ is the absolute value or magnitude of the i-th component of vector v.

In one embodiment 0, the UE is configured with an LC codebook with Basis 0 where rank 1 and rank 2 pre-coders are given according to at least one of the following sub-embodiments (Sub-embodiment 0-0 to 0-5).

In sub-embodiment 0-0, the rank 1 and rank 2 LC pre-coders without beam selection are given by:

$$W_{l,m,k}^{(1)} = \frac{1}{\sqrt{2}} \begin{bmatrix} w_{l,m,k}^{(+)} \\ w_{l,m,k}^{(-)} \end{bmatrix}, \quad W_{l,m,k}^{(2)} = \frac{1}{2} \begin{bmatrix} w_{l,m,k}^{(+)} & w_{l,m,k}^{(+)} \\ w_{l,m,k}^{(-)} & -w_{l,m,k}^{(-)} \end{bmatrix}$$

Where $$w_{l,m,k}^{(+)} = \frac{x_{l,m} c_k^{(+)}}{\|x_{l,m} c_k^{(+)}\|}; \quad w_{l,m,k}^{(-)} = \frac{x_{l,m} c_k^{(-)}}{\|x_{l,m} c_k^{(-)}\|};$$

$x_{l,m}$ is a beam group (comprising of L beams) selected from a codebook, an example of which is Table 10 for L=4; $c_k = [c_{k,0} \ c_{k,1} \ \ldots \ c_{k,2L-1}]^T$ is a length-2L coefficient vector, selected from a coefficient codebook proposed earlier in the present disclosure, which is decomposed into two parts $c_k^{(+)} = [c_{k,0} \ c_{k,1} \ \ldots \ c_{k,L-1}]^T$ and $c_k^{(-)} = [c_{k,L} \ c_{k,L+1} \ \ldots \ c_{k,2L-1}]^T$ for the two polarizations (+45 and −45) of antenna ports.

In Sub-embodiment 0-1, the rank 1 and rank 2 LC pre-coders with B out of L beam selection, where $1 \leq B \leq L$, are given by:

$$W_{l,m,b,k}^{(1)} = \frac{1}{\sqrt{2}} \begin{bmatrix} w_{l,m,b,k}^{(+)} \\ w_{l,m,b,k}^{(-)} \end{bmatrix}, \quad W_{l,m,b,k}^{(2)} = \frac{1}{2} \begin{bmatrix} w_{l,m,b,k}^{(+)} & w_{l,m,b,k}^{(+)} \\ w_{l,m,b,k}^{(-)} & -w_{l,m,b,k}^{(-)} \end{bmatrix}$$

Where $$w_{l,m,b,k}^{(+)} = \frac{x_{l,m} E_{B,b} c_k^{(+)}}{\|x_{l,m} E_{B,b} c_k^{(+)}\|}; \quad w_{l,m,b,k}^{(-)} = \frac{x_{l,m} E_{B,b} c_k^{(-)}}{\|x_{l,m} E_{B,b} c_k^{(-)}\|};$$

$x_{l,m}$ is a beam group (comprising of L beams), selected from a codebook, an example of which is Table 10 for L=4; $E_{B,b}$ is the beam selection matrix, an example of which is Table 7 for L=4; $c_k = [c_{k,0} \ c_{k,1} \ \ldots \ c_{k,2B-1}]^T$ is a length-2B coefficient vector, selected from a coefficient codebook proposed earlier in the present disclosure, which is decomposed into two parts $c_k^{(+)} = [c_{k,0} \ c_{k,1} \ \ldots \ c_{k,B-1}]^T$ and $c_k^{(-)} = [c_{k,B} \ c_{k,B+1} \ \ldots \ c_{k,2B-1}]^T$, for the two polarizations (+45 and −45) of antenna ports.

In Sub-embodiment 0-2, the rank 1 and rank 2 LC pre-coders are derived without beam selection and with a common co-phase for all beams, and are given by:

$$W_{l,m,n,k}^{(1)} = \frac{1}{\sqrt{2}} \begin{bmatrix} w_{l,m,k} \\ \varphi_n w_{l,m,k} \end{bmatrix}$$

$$W_{l,m,n,k}^{(2)} = \frac{1}{2} \begin{bmatrix} w_{l,m,k} & w_{l,m,k} \\ \varphi_n w_{l,m,k} & -\varphi_n w_{l,m,k} \end{bmatrix}$$

where $$w_{l,m,k} = \frac{x_{l,m} c_k}{\|x_{l,m} c_k\|};$$

$x_{l,m}$ is a beam group (comprising of L beams), selected from a codebook, an example of which is Table 10 for L=4; $\varphi_n$ is a co-phase value that is selected from a co-phase codebook proposed earlier in the present disclosure; and $c_k = [c_{k,0}\ c_{k,1} \ldots c_{k,L-1}]^T$ is a length-L coefficient vector, selected from a coefficient codebook proposed earlier in the present disclosure.

In Sub-embodiment 0-3, the rank 1 and rank 2 LC pre-coders are derived with B out of L beam selection, where 1≤B≤L, and with a common co-phase for all beams, and are given by:

$$W_{l,m,b,n,k}^{(1)} = \frac{1}{\sqrt{2}} \begin{bmatrix} w_{l,m,b,k} \\ \varphi_n w_{l,m,b,k} \end{bmatrix}$$

$$W_{l,m,b,n,k}^{(2)} = \frac{1}{2} \begin{bmatrix} w_{l,m,b,k} & w_{l,m,b,k} \\ \varphi_n w_{l,m,b,k} & -\varphi_n w_{l,m,b,k} \end{bmatrix}$$

where $$w_{l,m,b,k} = \frac{x_{l,m} E_{B,b} c_k}{\|x_{l,m} E_{B,b} c_k\|};$$

$x_{l,m}$ is a beam group (comprising of L beams), selected from a codebook, an example of which is Table 10 for L=4; $E_{B,b}$ is the beam selection matrix, an example of which is Table 7 for L=4; $\varphi_n$ is a co-phase value that is selected from a co-phase codebook proposed earlier in the present disclosure; and $c_k = [c_{k,0}\ c_{k,1} \ldots c_{k,L-1}]^T$ is a length-L coefficient vector, selected from a coefficient codebook proposed earlier in the present disclosure.

In Sub-embodiment 0-4, the rank 1 and rank 2 LC pre-coders are derived without beam selection and with different co-phase for all beams, and are given by:

$$W_{l,m,n,k}^{(1)} = \frac{1}{\sqrt{2}} \begin{bmatrix} w_{l,m,k}^{(+)} \\ w_{l,m,n,k}^{(-)} \end{bmatrix},$$

$$W_{l,m,n,k}^{(2)} = \frac{1}{2} \begin{bmatrix} w_{l,m,k}^{(+)} & w_{l,m,k}^{(+)} \\ w_{l,m,n,k}^{(-)} & -w_{l,m,n,k}^{(-)} \end{bmatrix}$$

where $$w_{l,m,k}^{(+)} = \frac{x_{l,m} c_k}{\|x_{l,m} c_k\|}; w_{l,m,n,k}^{(-)} = \frac{x_{l,m} \phi_n c_k}{\|x_{l,m} \phi_n c_k\|};$$

$x_{l,m}$ is a beam group (comprising of L beams), selected from a codebook, an example of which is Table 7 for L=4; $\phi_n = \text{diag}(\varphi_{n,0}\ \varphi_{n,1} \ldots \varphi_{n,L-1})$ is a diagonal matrix with co-phase values $\varphi_{n,0}, \varphi_{n,1}, \ldots, \varphi_{n,L-1}$ at the diagonal entries that are selected from a co-phase codebook proposed earlier in the aforementioned embodiments. $c_k = [c_{k,0}\ c_{k,1} \ldots c_{k,L-1}]^T$ is a length-L coefficient vector, selected from a coefficient codebook proposed earlier in the present disclosure.

In Sub-embodiment 0-5, the rank 1 and rank 2 LC pre-coders are derived with B out of L beam selection, where 1≤B≤L, and with different co-phase for all beams, and are given by:

$$W_{l,m,b,n,k}^{(1)} = \frac{1}{\sqrt{2}} \begin{bmatrix} w_{l,m,b,k}^{(+)} \\ w_{l,m,b,n,k}^{(-)} \end{bmatrix},$$

$$W_{l,m,b,n,k}^{(2)} = \frac{1}{2} \begin{bmatrix} w_{l,m,b,k}^{(+)} & w_{l,m,b,k}^{(+)} \\ w_{l,m,b,n,k}^{(-)} & -w_{l,m,b,n,k}^{(-)} \end{bmatrix}$$

where $$w_{l,m,b,k}^{(+)} = \frac{x_{l,m} E_{B,b} c_k}{\|x_{l,m} E_{B,b} c_k\|}; w_{l,m,b,n,k}^{(-)} = \frac{x_{l,m} E_{B,b} \phi_n c_k}{\|x_{l,m} E_{B,b} \phi_n c_k\|};$$

$x_{l,m}$ is a beam group (comprising of L beams), selected from a codebook, an example of which is Table 10 for L=4; $E_{B,b}$ is the beam selection matrix, an example of which is Table 7 for L=4; $\phi_n = \text{diag}(\varphi_{n,0}\ \varphi_{n,1} \ldots \varphi_{n,B-1})$ is a diagonal matrix with co-phase values $\varphi_{n,0}, \varphi_{n,1}, \ldots, \varphi_{n,B-1}$ at the diagonal entries that are selected from a co-phase codebook proposed earlier in the present disclosure. $c_k = [c_{k,0}\ c_{k,1} \ldots c_{k,B-1}]^T$ is a length-B coefficient vector, selected from a coefficient codebook proposed earlier in the present disclosure.

In one embodiment 1, the UE is configured with an LC codebook with Basis 1 where rank 1 and rank 2 pre-coders are given according to at least one of Sub-embodiments 1-0 to 1-5, which are similar to Sub-embodiments 0-0 to 0-5 with replacing $x_{l,m}$ with $y_{l,m,p} = x_{l,m} M_p$, and replacing subscripts (l, m, ...) in rank 1 and rank 2 pre-coders $W_{l,m,\ldots}^{(1)}$ and $W_{l,m,\ldots}^{(2)}$ with (l, m, p, ...) to obtain $W_{l,m,p,\ldots}^{(1)}$ and $W_{l,m,p,\ldots}^{(2)}$ where $M_p = \text{diag}(m_{n,0}^{(1)}\ m_{n,1}^{(1)} \ldots m_{n,L-1}^{(1)})$ is WB magnitude or power levels of L beams. Note that, in this case, WB beam magnitude or power level (p index) is explicitly reported, for example, using a new WB PMI $i_0$ for beam power.

In an alternative Embodiment 1, the WB beam magnitude or power level (p index) is implicitly merged with (l, m) or l or m and is reported with ($i_{1,1}, i_{1,2}$) or $i_{1,1}$ or $i_{1,2}$. In this alternative, the pre-coder expressions remain the same as in Sub-embodiments 0-0 to 0-5.

In one embodiment 2, the UE is configured with an LC codebook with Basis 2 where rank 1 and rank 2 pre-coders are given according to at least one of Sub-embodiments 2-2 to 2-5, which are similar to Sub-embodiments 0-2 to 0-5 with replacing $x_{l,m}$ with $y_{l,m,n} = x_{l,m} \phi_n$, and replacing subscripts (l, m, ...) in rank 1 and rank 2 pre-coders $W_{l,m,\ldots}^{(1)}$ and $W_{l,m,\ldots}^{(2)}$ with (l, m, p, ...) to obtain $W_{l,m,p,\ldots}^{(1)}$ and $W_{l,m,p,\ldots}^{(2)}$ where $\phi_n = \text{diag}(1\ 1 \ldots 1)$ is WB co-phase values for +45 polarizations, and $\phi_n = \text{diag}(\varphi_{n,0}\ \varphi_{n,1} \ldots \varphi_{n,L-1})$ is WB co-phase for -45 polarizations. Note that, in this case, WB co-phase values are explicitly reported, for example, using a new WB PMI $i_0$ for WB co-phase values.

In an alternative Embodiment 2, the WB co-phase values are implicitly merged with (l, m) or l or m and are reported with ($i_{1,1}, i_{1,2}$) or $i_{1,1}$ or $i_{1,2}$. In this alternative, the pre-coder expressions remain the same as in Sub-embodiments 0-2 to 0-5.

In one embodiment 3, the UE is configured with an LC codebook with Basis 3 where rank 1 and rank 2 pre-coders are given according to at least one of Sub-embodiments 3-2 to 3-5, which are similar to Sub-embodiments 0-2 to 0-5 with replacing $x_{l,m}$ with $y_{l,m,p,n} = x_{l,m} M_p \phi_n$, and replacing subscripts (l, m, . . . ) in rank 1 and rank 2 pre-coders $W_{l,m,...}^{(1)}$ and $W_{l,m,...}^{(2)}$ with (l, m, p, n, . . . ) to obtain $W_{l,m,p,n,...}^{(1)}$ and $W_{l,m,p,n,...}^{(2)}$ where $M_n = \text{diag}(m_{n,0}^{(1)} m_{n,1}^{(1)} \ldots m_{n,L-1}^{(1)})$ is WB magnitude or power levels of L beams, and $\phi_n = \text{diag}(1\ 1\ \ldots\ 1)$ is WB co-phase values for +45 polarizations, and $\phi_n = \text{diag}(\varphi_{n,0}\ \varphi_{n,1}\ \ldots\ \varphi_{n,L-1})$ is WB co-phase for −45 polarizations.

In some embodiments, a UE is configured with either Class A codebook based CSI feedback (for low spatial resolution feedback) or LC codebook based CSI feedback (for high spatial resolution feedback) (via RRC signaling using parameter LCCodebookEnabled) based on a dual-stage codebook structure $W=W_1W_2$. In such embodiments, $W_1$ codebook for the two types of CSI feedback is according to one of the following alternatives: In one example of common $W_1$, the $W_1$ codebook is common between Class A and LC codebooks. In another example of different $W_1$, the $W_1$ codebook for Class A codebook is different from that for LC codebook. In yet another example of subset $W_1$, the $W_1$ codebook for Class A codebook is a subset of that for LC codebook.

Figure 16:
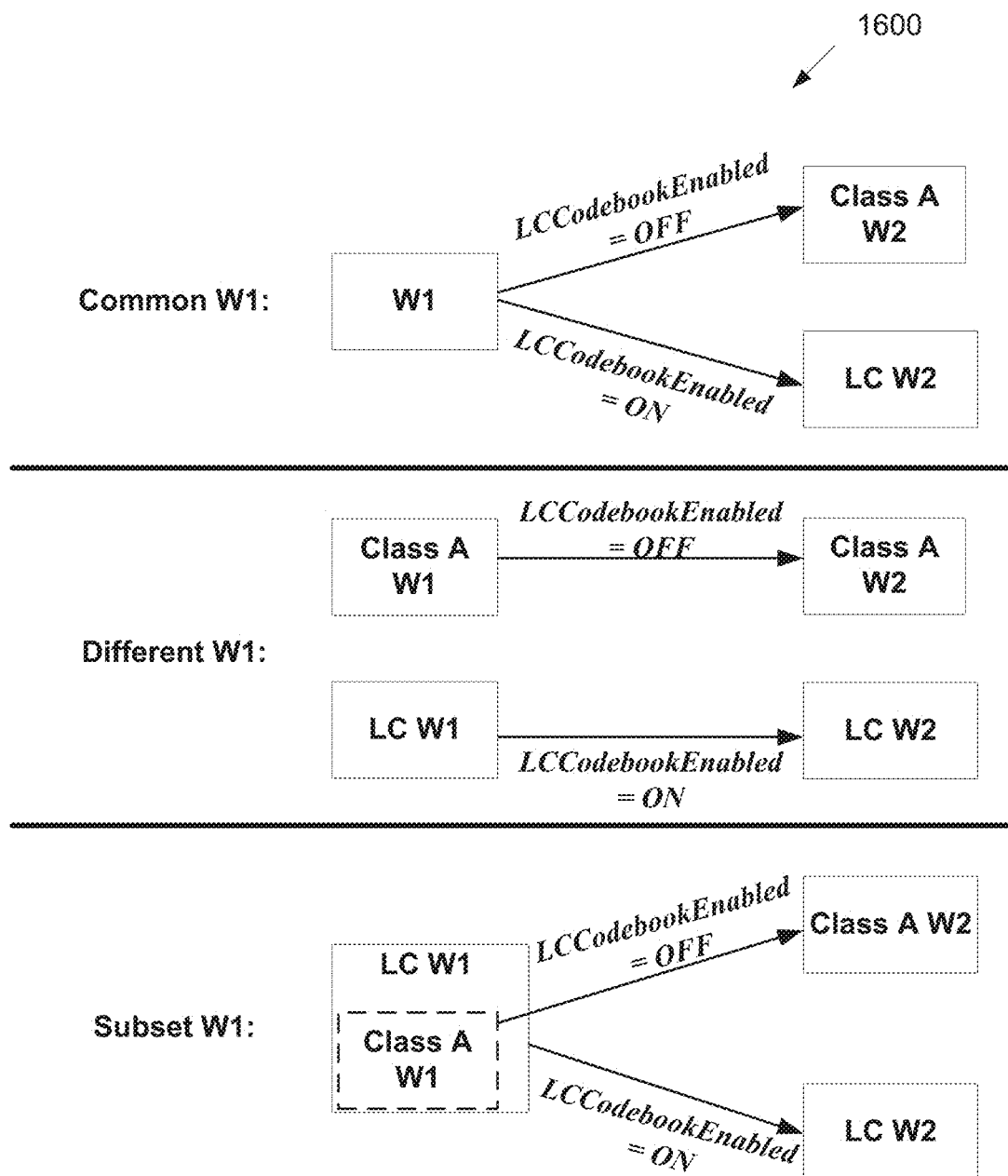
FIG. 16 illustrates an example W1 codebook according to embodiments of the present disclosure.

FIG. 16 illustrates an example W1 codebook 1600 according to embodiments of the present disclosure. An embodiment of the W1 codebook 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An illustration of the three $W_1$ codebook alternatives is shown in FIG. 12, where the $W_1$ codebook is according to some embodiments of disclosure, for example, LTE Rel. 13 Class A $W_1$ codebook (e.g, Table 10) or a new $W_1$ codebook proposed in the present disclosure.

The $W_2$ codebook for Class A codebook is according to LTE Rel. 13 (or an extension in LTE Rel. 14) Class A $W_2$ codebook. Alternatively, a new $W_2$ codebook is considered. The $W_2$ codebook for LC codebook is according to some embodiments of disclosure. In addition, a new $W_2$ codebook may or may not include the $W_2$ codebook of Class A codebook.

In one embodiment, the LTE Rel. 13 Class A codebook parameter Codebook-Config is used to configure Class A or LC codebook. For example, when Codebook-Config=1, then the UE is configured with Class A codebook, and Codebook-Config=2, 3, 4, then the UE is configured with LC codebook. This is an example of different $W_1$ codebook for Class A and LC codebooks. In another embodiment, a new RRC parameter such as LCCodebookEnabled is used to configure Class A or LC codebook according to the previous embodiment.

In such embodiments, all three alternatives of $W_1$ codebook are possible. In one example of common $W_1$, LTE Rel. 13 Class A $W_1$ codebook for Codebook-Config=2, 3, or 4 is used regardless of the configured CSI type (e.g., LCCodebookEnabled is turned ON or OFF). In another example of different $W_1$, LTE Rel. 13 Class A $W_1$ codebook for Codebook-Config=2, 3, or 4 is used if Class A codebook is configured (e.g., LCCodebookEnabled is turned OFF), and a new $W_1$ codebook is used if LC codebook is configured (e.g., LCCodebookEnabled is turned ON). In yet another example of subset $W_1$, LTE Rel. 13 Class A $W_1$ codebook for Codebook-Config=2, 3, or 4 is used if Class A codebook is configured (e.g., LCCodebookEnabled is turned OFF), and a new $W_1$ codebook which includes LTE Rel. 13 Class A $W_1$ codebook is used if LC codebook is configured (e.g., LCCodebookEnabled is turned ON).

Figure 17:
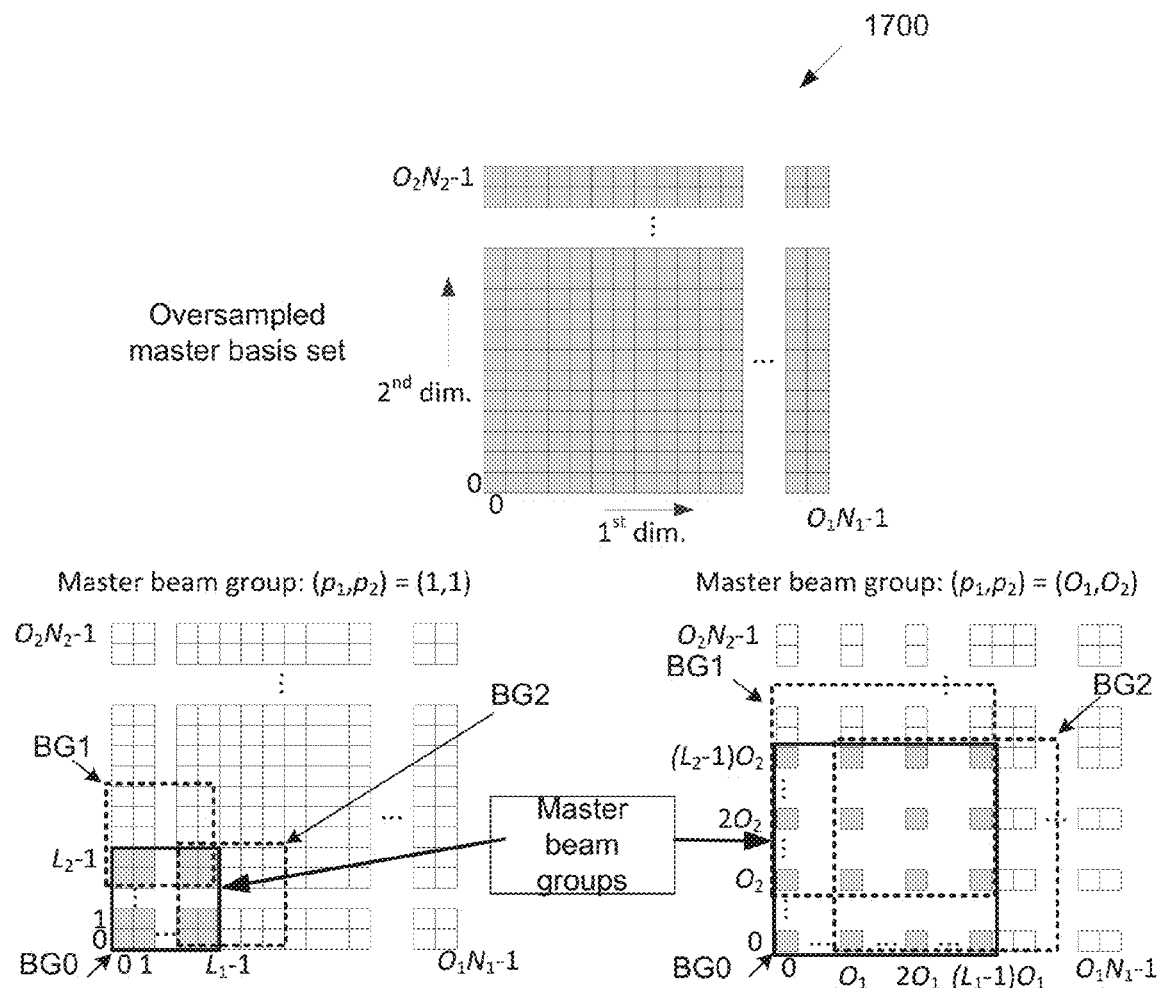
FIG. 17 illustrates example master beam groups according to embodiments of the present disclosure.

FIG. 17 illustrates example master beam groups 1700 according to embodiments of the present disclosure. An embodiment of the master beam groups 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with an over-sampled DFT codebook as the master basis set comprising of $O_1N_1 \times O_2N_2$ DFT beams and $(L_1, L_2)$ parameters representing the number of beams in the two dimensions of the master beam group.

Figure 22:
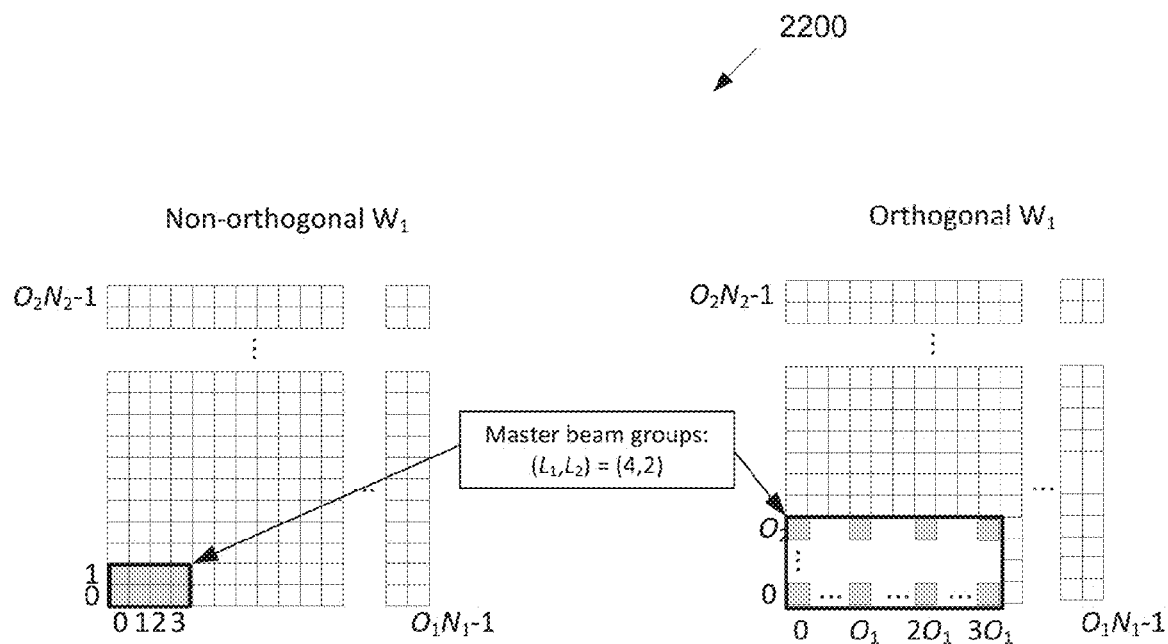
FIG. 22 illustrates example non-orthogonal and orthogonal master beam groups with $(L_1, L_2)=(4, 2)$ for $N_1 \geq N_2$ according to embodiments of the present disclosure.

The UE is further configured with multiple types of master beam groups based on the spacing $(p_1, p_2)$ between two adjacent beams in two dimensions of the master beam group. The UE reports one of multiple types of master beam groups in the UE's CSI report where this reporting can be explicit as a new WB CSI feedback component or it is implicit with either $i_1$ or $(i_{1,1}, i_{1,2})$. An illustration of two types of master beam groups is shown in FIG. 22, where each small square represents a 2D DFT beam. When $(p_1, p_2)=(1, 1)$, the master beam group corresponds to $L_1L_2$ closely spaced beams, and when $(p_1, p_2)=(O_1, O_2)$, the master beam group corresponds to $L_1L_2$ orthogonal beams. Three examples of master beam groups for each type are also shown as BG0, BG1, and BG2.

Alternatively, eNB configures one of multiple types of master beam groups via RRC signaling. For example, eNB configures one of the two master beam groups shown in FIG. 17 via 1-bit RRC parameter MasteBeamGroupType.

The components of the LC codebook (assuming Basis 0) are constructed as follows. In one example, a master beam group of configured or reported type is reported as the 1st PMI $i_1$ or $(i_{1,1}, i_{1,2})$. This reporting is WB. The range of values of $i_{1,1}$ and $i_{1,2}$ is given by $i_{1,1}=0, 1, 2, \ldots O_1N1/s_1$ and $i_{1,2}=0, 1, 2, \ldots O_2N2/s_2$, where $(s_1, s_2)$ are spacing between two adjacent master beam groups in two dimensions. The example values of $s_1$ (or $s_2$) are 1, 2, $O_1/4$ (or $O_2/4$), $O_1/2$ (or $O_2/2$), and $O_1$ (or $O_2$). So, the number of bits to report $i_{1,1}$ and $i_{1,2}$ is $$\log_2\left\lceil\frac{O_1N_1}{s_1}\right\rceil \text{ and } \log_2\left\lceil\frac{O_2N_2}{s_2}\right\rceil,$$

respectively. In another example, for each SB in which the UE is configured to report PMI/CQI, the UE reports at least one of the following.

Figure 18:
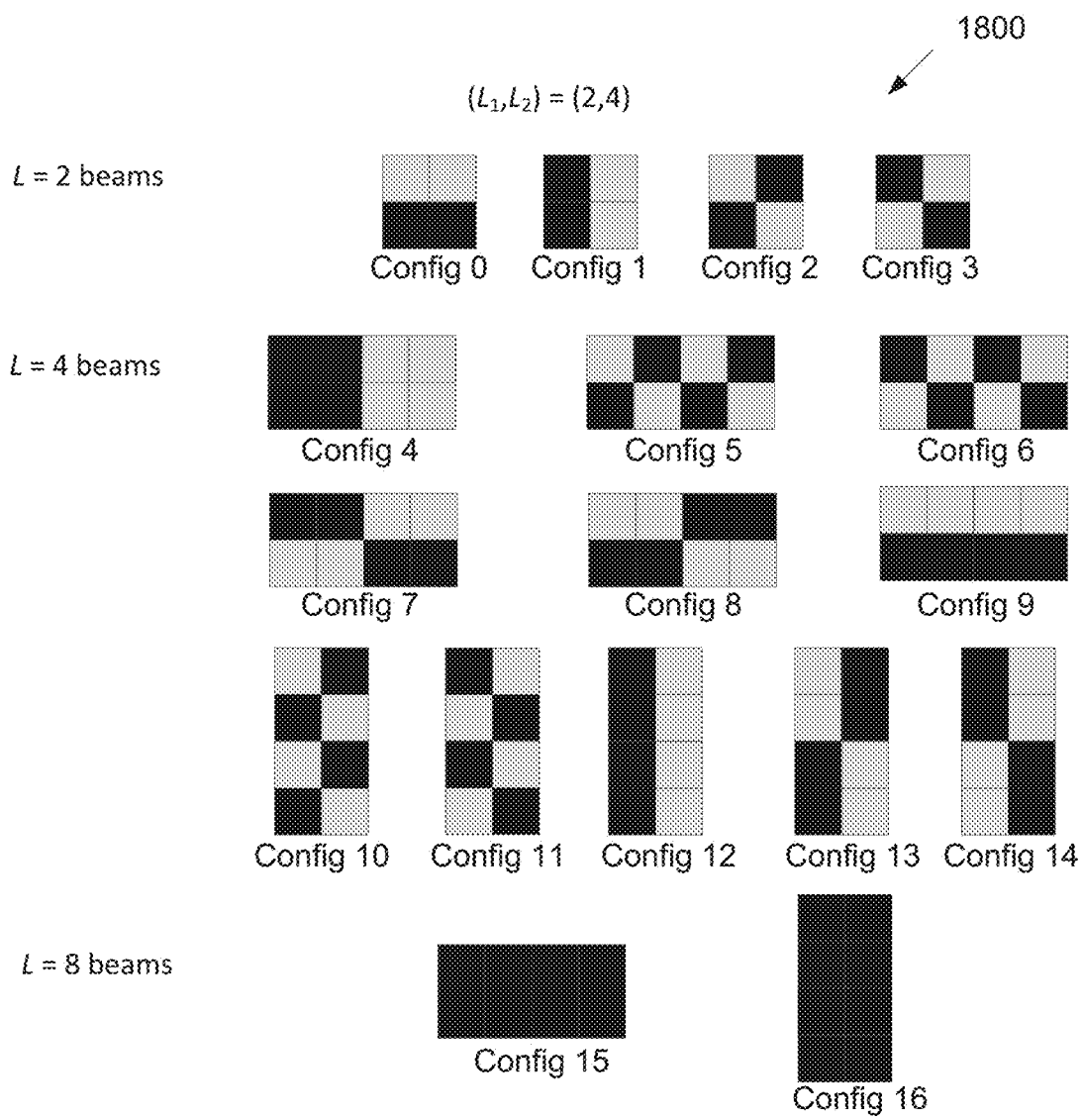
FIG. 18 illustrates an example beam selection according to embodiments of the present disclosure.

In one embodiment of beam selection, L out of $L_1L_2$ beams are selected from the reported master beam group. Examples of L values are 1, 2, 4, and 8. The L value can be reported in the CSI report or The L value is configured via higher layer RRC signaling. In the case of the former, the reported L value is either WB or SB. Two alternatives for this selection are as follows. In one alternative of parameterized, the selection of L beams is based on Config parameter. Examples of a few beam selections are shown in FIG. 18. In one example, the UE reports a preferred Config value in per SB CSI report where the set of possible Config values is fixed, for example Config 0-16 in FIG. 18. In another example, the UE reports a WB L value and a Config value per SB corresponding to the reported L. For example, the UE reports L=2 in the WB CSI report (2-bit WB reporting of an L value) and reports one of Config 0-Config 3 in per SB CSI report (2-bit SB reporting on Config). Alternatively, an L value is configured via RRC signaling and the UE reports a Config value corresponding to the reported L. In yet another method, the set of Config values for per SB beam selection is configured via RRC signaling. For example, a length 17 bitmap is used to configure the set of Config values (e.g., FIG. 18).

FIG. 18 illustrates an example beam selection 1800 according to embodiments of the present disclosure. An embodiment of the beam selection 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions. Other embodiments are used without departing from the scope of the present disclosure.

In another embodiment of unconstrained, the selected L beams is unconstrained and any L out of $L_1L_2$ beams can be reported. In this case, the reporting can be based on a bitmap of length $L_1L2$. In one example of co-phase, co-phase values (for two polarizations) for L selected beams are selected using a co-phase codebook proposed in some embodiments of the present disclosure. In another example of coefficients, coefficients to linearly combine L selected beams are selected using a coefficient codebook proposed in some embodiments of disclosure. As alternative coefficient codebooks, other codebooks such as Householder and Grassmanian codebooks can also be considered.

In another embodiment, the UE is configured with a DFT codebook without oversampling (e.g. oversampling factor=1). As in the previous embodiment, the UE reports a master beam group comprises of $L_1L_2$ beams (WB) and for each SB, reports L out of $L_1L_2$ reported beams. In addition, the UE also reports the rotation matrix (M) for either each of L beams (L rotation matrices) or the whole beam group (one rotation matrix), where the rotation can be WB or SB, and the rotation can be only in one dimension or in both dimensions. An example of rotation matrix is a diagonal matrix whose diagonal entries form a DFT vector.

In some embodiments, the UE is configured with an LC codebook whose $W_1$ beam groups depend on the configured or reported L value. For example, if L=1, then $W_1$ beam groups are the same as that in LTE Rel. 13 (or an extension in LTE Rel. 14) Class A codebook. And if L>1 (e.g. L=2, 4, 8), then $W_1$ beam groups are different from that in LTE Rel. 13 (or an extension in LTE Rel. 14) Class A codebook.

In some embodiments, the UE is configured with a beam spacing parameter pair $(p_1, p_2)$ whose value depends on the RRC parameter LCCodebookEnabled to configure LC codebook according to some embodiments of disclosure. If LCCodebookEnabled is turned OFF (i.e. Class A codebook is configured), then $p_d$, where d=1, 2 can take values from $\{1, 2\}$, and if LCCodebookEnabled is turned ON (i.e. LC codebook is configured), then $p_d$, where d=1, 2 can take values from $\{1, O_d\}$.

In some embodiments, the UE is configured with a beam spacing parameter pair $(p_1, p_2)$ for Class A or LC codebook that is applicable up to a fixed rank r, e.g. r=2. For rank >r, beam spacing is fixed (hence does not need to be configured), for example to that for rank >r Class A codebook.

In some embodiments, the UE is configured with a beam spacing parameter pair $(p_1, p_2)$ for Class A or LC codebook depending on rank r. In one example, the beam spacing is as follows: for r=1-2, $p_d$, where d=1,2 can take values from $\{1,2\}$; for r=3-4, $p_d$, where d=1,2 can take values from $\{O_d/4, O_d/2\}$; and for r=5-8, $p_d$, where d=1,2 can take values from $\{O_d\}$. In another example, the beam spacing is as follows: for r=1-2, $p_d$, where d=1, 2 can take values from $\{1,2\}$; and for r=3-8, $p_d$, where d=1,2 can take values from $\{O_d\}$.

Figure 19:
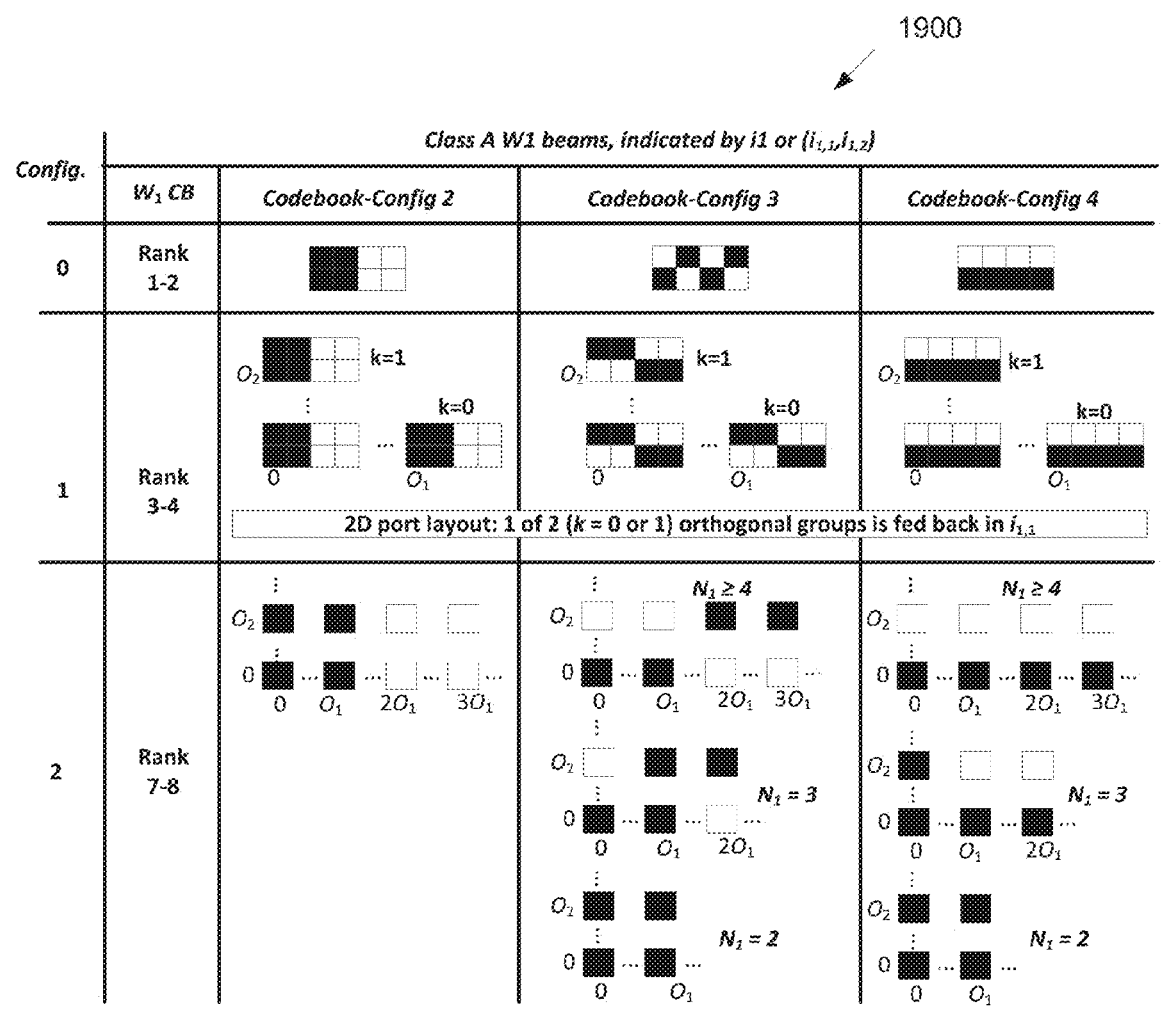

In some embodiments, the UE is configured with LTE Rel. 13 Class A W1 codebook (that represents beam groups) for Codebook-Config 2, 3, 4 as the W1 codebook for the linear combination codebook proposed in disclosure. The W1 beam groups in LTE Rel. 13 Class A codebook for rank 1-8 and Codebook-Config 2, 3, 4 are shown in FIG. 19. There are three possible beam group configurations for LC codebook. In one example of configuration 0, this configuration corresponds to rank 1-2 Class A W1 codebook. There are four beams shown in black squares that form a beam group depending on the Codebook-Config parameter. In another example of configuration 1, this configuration corresponds to rank 3-4 Class A W1 codebook. There are eight beams (4 orthogonal beam pairs) shown in black squares that form a beam group depending on the Codebook-Config parameter. Also, there are two possible orthogonal beam direction for 2D port layouts (3 for 1D port layouts) that are shown as k=0 and 1. If k=0, 4 beams are location at (0, 0) and 4 beams are location at $(O_1, 0)$, and if k=1, 4 beams are location at (0, 0) and 4 beams are location at $(0, O_2)$. One k value is reported by the UE jointly with $i_{1,1}$. In yet another example of configuration 2, this configuration corresponds to rank 7-8 Class A W1 codebook. There are four (orthogonal) beams shown in black squares that form a beam group depending on the Codebook-Config parameter.

Note that orthogonal beam group for rank 5-6 Class A W1 codebook (which has 3 orthogonal beams included in rank 7-8 Class A W1 beam group) is not shown here. The embodiment, however, is applicable to rank 5-6 Class A W1 codebook also.

FIG. 19 illustrates an example class A W1 beam groups 1900 for rank 1-8 and codebook-configuration 2, 3, and 4 according to embodiments of the present disclosure. An embodiment of the class A W1 beam groups 1900 for rank 1-8 and codebook-configuration 2, 3, and 4 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions. Other embodiments are used without departing from the scope of the present disclosure. A few example of W1 codebook configuration for LC codebook is as follows. In one example, the rank r W1 codebook for LC codebook is the same as rank r W1 codebook for Class A codebook, where r can be 1-8 for example. In another example, the rank 1-2 W1 codebook for LC codebook is the same as rank 1-2 W1 codebook for Class A codebook, and the rank r>2 W1 codebook for LC codebook is the same as rank 7-8 W1 codebook for Class A codebook. In yet another example, the rank r W1 codebook for LC codebook, where r can be 1-8 for example, is the same as rank 7-8 W1 codebook for Class A codebook.

In some embodiments, a UE is configured with three separate rank 1 and rank 2 LC codebook tables for Codebook-Config=2, 3, and 4, an example of rank 1 codebook table is sown in Table 11.

TABLE 11

Codebook for 1-layer CSI reporting using antenna ports 15 to 14 + P

| Value of Codebook-Config | $i_{1,1}$ | $i_{1,2}$ | $i_2$ | |
|---|---|---|---|---|
| 2 | | | 0 | 1 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ |
| | | | 2 | 3 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 2}^{(1)}$ | $W_{2i_{1,1}, 2i_{1,2}, 0, 3}^{(1)}$ |
| | Pre-coders for $i_2 \geq 4$ are contructed similarly. | | | |
| 3 | | | 0 | 1 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ |
| | | | 2 | 3 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 2}^{(1)}$ | $W_{2i_{1,1}, 2i_{1,2}, 0, 3}^{(1)}$ |
| | Pre-coders for $i_2 \geq 4$ are contructed similarly. | | | |
| 4 | | | 0 | 1 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ |
| | | | 2 | 3 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 2}^{(1)}$ | $W_{2i_{1,1}, 2i_{1,2}, 0, 3}^{(1)}$ |
| | Pre-coders for $i_2 \geq 4$ are contructed similarly. | | | |

In some embodiments, a UE is configured with a single rank 1 and rank 2 LC codebook tables for Codebook-Config=2, 3, and 4 in which W1 (for $i_{1,1}$, $i_{1,2}$) and W2 (for $i_2$) components of the codebook are in the same table, an example of rank 1 codebook table is shown in Table 12.

TABLE 12

Codebook for 1-layer CSI reporting using antenna ports 15 to 14 + P

| Value of Codebook-Config | $i_{1,1}$ | $i_{1,2}$ | $i_2$ | |
|---|---|---|---|---|
| 2,3,4 | | | 0 | 1 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 0}^{(1)}$ | $W_{2i_{1,1}, 2i_{1,2}, 0, 1}^{(1)}$ |
| | | | 2 | 3 |
| | $0, 1, \ldots, \frac{N_1 O_1}{2} - 1$ | $0, 1, \ldots, \frac{N_2 O_2}{2} - 1$ | $W_{2i_{1,1}, 2i_{1,2}, 0, 2}^{(1)}$ | $W_{2i_{1,1}, 2i_{1,2}, 0, 3}^{(1)}$ |
| | Pre-coders for $i_2 \geq 4$ are contructed similarly. | | | |

In some embodiments, a UE is configured with a single rank 1 and rank 2 LC codebook tables for Codebook-Config=2, 3, and 4 in which W1 (for $i_{1,1}$, $i_{1,2}$) and W2 (for $i_2$) components of the codebooks are separated into two codebook tables (one for beam group and the other for LC coefficients with or without co-phase or/and magnitude), an example of such rank 1 codebook table is Table 10 for W1 (corresponding PMI is LTE Rel. 13 Class A PMI $i_{1,1}$, $i_{1,2}$) and Table 13 for W2 (corresponding PMI is LTE Rel. 13 Class PMI $i_2$ indicating LC coefficients) or W3 (corresponding PMI is a new PMI $i_3$ for LC coefficients).

In some embodiments, a UE is configured with a single rank 1 and rank 2 LC codebook tables for Codebook-Config=2, 3, and 4 in which there are three codebook (three-stage) tables: W1 codebook table for beam groups comprising of L (or B) beams; W2 or W21 codebook table for co-phase values for the two polarizations and L (or B) beams; and W3 or W22 codebook table for LC coefficients. An example of W1 codebook table is Table 10 and the LTE Rel. 13 Class A PMI $i_{1,1}$, $i_{1,2}$ is used to indicate a beam group in W1 codebook.

TABLE 13

W2 or W3 Codebook for 1-layer CSI reporting using antenna ports 15 to 14 + P

| $i_2$ or $i_3$ | | | |
|---|---|---|---|
| 0 | 1 | 2 | 3 |
| $W_{2i_{1,1},2i_{1,2},0,0}^{(1)}$ | $W_{2i_{1,1},2i_{1,2},0,1}^{(1)}$ | $W_{2i_{1,1},2i_{1,2},0,2}^{(1)}$ | $W_{2i_{1,1},2i_{1,2},0,3}^{(1)}$ |

Pre-coders for $i_2 \geq 4$ are contructed similarly.

In some embodiments, a UE is configured with rank 1 and rank 2 W2 LC codebook tables in which the second PMI $i_2$ has two components ($i_{2,1}$, $i_{2,2}$). The 1st component $i_{2,1}$ indicates LC coefficient vector and 2nd component $i_{2,2}$ indicates co-phase for the two polarizations. Alternatively, the 1st component $i_{2,1}$ indicates co-phase for the two polarizations and 2nd component $i_{2,2}$ indicates LC coefficient vector. An example of such rank 1 W2 codebook table is shown in Table 14.

In one embodiment, $i_{2,1}$ and $i_{2,2}$ are reported separately as two components of the 2nd PMI. In another embodiment, $i_{2,1}$ and $i_{2,2}$ are reported jointly as a single second PMI. In this later case, the least significant bits (LSB) (e.g. 2 bits for rank 1 and 1 bit for rank 2 from right)) of $i_2$ correspond to $i_{2,2}$(co-phase), and the most significant bits (MSB) (e.g. 6 bits of from left) of $i_2$ correspond to $i_{2,1}$ (coefficients). Alternatively, the LSB (e.g. 6 bits of from left) of $i_2$ correspond to $i_{2,1}$(coefficients) and the MSB (e.g. 2 bits for rank 1 and 1 bit for rank 2 from right)) of $i_2$ correspond to $i_{2,2}$(co-phase).

An example of W2 or W21 co-phase codebook and B out of L=4 beam selection assuming QPSK co-phase is shown in Table 15. There are two alternatives for B value for SB beam selection. In one embodiment of Alt 0 (WB): a single B value is selected WB and hence does not change across SBs. For example, if B=2, then the B value remains the same in all SBs (i.e., the number of beams for LC is 2 in all SBs). In another embodiment of Alt 1 (SB): a single B value is selected per SB and hence can change across SBs. For example, in one SB, B can be 2 (i.e., the number of beams for LC is 2 in one SB), and in another SB, B can be 4 (i.e., the number of beams for LC is 4 in another SB). The other co-phase codebooks (for example double co-phase codebook) mentioned in disclosure can be constructed similarly.

An example of W3 or W22 coefficient codebook and B out of L=4 beam selection assuming QPSK coefficients is shown in Table 16. Similar to co-phase, there are two alternatives for B value for SB beam selection. The other

TABLE 14

W2 Codebook for 1-layer CSI reporting using antenna ports 15 to 14 + P

| | $i_{2,2}$ | | | |
|---|---|---|---|---|
| $i_{2,1}$ | 0 | 1 | 2 | 3 |
| 0,1 . . . , 63 | $W_{2i_{1,1},2i_{1,2},2i_{2,1},0}^{(1)}$ | $W_{2i_{1,1},2i_{1,2},2i_{2,1},1}^{(1)}$ | $W_{2i_{1,1},2i_{1,2},2i_{2,1},2}^{(1)}$ | $W_{2i_{1,1},2i_{1,2},2i_{2,1},3}^{(1)}$ |

Pre-coders for $i_{2,2} \geq 4$ are contructed similarly.

In some embodiments, $i_{2,1}$ and $i_{2,2}$ respectively are represented as $i_2$ and $i_3$, where $i_2$ is LTE Rel. 13 Class A $2^{nd}$ PMI and $i_3$ is a new PMI for LC codebook.

coefficient codebooks (for example double coefficient codebook and DFT coefficient codebook) mentioned in disclosure can be constructed similarly.

TABLE 15

W2 or W21 co-phase codebook (QPSK co-phase)

| B | B value type | Co-phase vector PMI ($i_2$ or $i_{21}$) | Offset (y) | $n_b$, b = 0, . . . , B − 1 | Co-phase vector |
|---|---|---|---|---|---|
| 1 | Alt 0: WB<br>Alt 1: SB | 0-3<br>0-3 | 0<br>0 | $\left\lfloor \frac{i_2 - y}{4^{B-b}} \mod 4 \right\rfloor$ | $e^{\frac{j2\pi n_0}{4}}$ |

TABLE 15-continued

W2 or W21 co-phase codebook (QPSK co-phase)

| B | B value type | Co-phase vector PMI ($i_2$ or $i_{21}$) | Offset (y) | $n_b$, b = 0, ..., B − 1 | Co-phase vector |
|---|---|---|---|---|---|
| 2 | Alt 0: WB<br>Alt 1: SB | 0-15<br>4-19 | 0<br>4 | | $\left[e^{\frac{j2\pi n_0}{4}}, e^{\frac{j2\pi n_1}{4}}\right]$ |
| 3 | Alt 0: WB<br>Alt 1: SB | 0-63<br>20-83 | 0<br>20 | | $\left[e^{\frac{j2\pi n_0}{4}}, e^{\frac{j2\pi n_1}{4}}, e^{\frac{j2\pi n_2}{4}}\right]$ |
| 4 | Alt 0: WB<br>Alt 1: SB | 0-255<br>84-339 | 0<br>84 | | $\left[e^{\frac{j2\pi n_0}{4}}, e^{\frac{j2\pi n_1}{4}}, e^{\frac{j2\pi n_2}{4}}, e^{\frac{j2\pi n_3}{4}}\right]$ |

TABLE 16

W3 or W22 coefficient codebook (QPSK coefficients)

| B | B value type | Coefficient vector PMI ($i_3$ or $i_{22}$) | Offset (z) | $k_b$, b = 1, ..., B − 1 | Coefficient vector |
|---|---|---|---|---|---|
| 2 | Alt 0: WB<br>Alt 1: SB | 0-3<br>0-3 | 0<br>0 | $\left\lfloor \frac{i_3 - z}{4^{B-b-1}} \bmod 4 \right\rfloor$ | $\left[1, e^{\frac{j2\pi k_1}{4}}\right]$ |
| 3 | Alt 0: WB<br>Alt 1: SB | 0-15<br>4-19 | 0<br>4 | | $\left[1, e^{\frac{j2\pi k_1}{4}}, e^{\frac{j2\pi k_2}{4}}\right]$ |
| 4 | Alt 0: WB<br>Alt 1: SB | 0-63<br>20-83 | 0<br>20 | | $\left[1, e^{\frac{j2\pi k_1}{4}}, e^{\frac{j2\pi k_2}{4}}, e^{\frac{j2\pi k_3}{4}}\right]$ |

In some embodiments, the UE is configured with an LC codebook for rank 1 and rank 2 in which LTE Rel. 13 Class A codebook table for rank 1 is used to select L=4 beams with co-phase values depending in Codebook-Config=2, 3, 4. An example of such a codebook (W2 or W21 codebook) for rank 1 is shown in Table 17. The corresponding PMI is $i_2$ or $i_{2,1}$. The selected L=4 beams with co-phase are then combined using another codebook (W3 or W22 codebook) Table 18. The corresponding PMI is $i_3$ or $i_{2,2}$, which is reported as a new CSI reporting type.

The LC codebook for SB beam selection of B out of L=4 beams can be constructed similarly.

TABLE 17

W2 or W21 Codebook for 1-layer CSI reporting using antenna ports 15 to 14 + P

| $i_2$ or $i_{2,1}$ | | | |
|---|---|---|---|
| 0 | 1 | 2 | 3 |
| $y^{(1)}_{2i_{1,1}, 2i_{1,2}, 0}$ | $y^{(1)}_{2i_{1,1}, 2i_{1,2}, 1}$ | $y^{(1)}_{2i_{1,1}, 2i_{1,2}, 2}$ | $y^{(1)}_{2i_{1,1}, 2i_{1,2}, 3}$ |
| 4 | 5 | 6 | 7 |
| $y^{(1)}_{2i_{1,1}, 2i_{1,2}, 4}$ | $y^{(1)}_{2i_{1,1}, 2i_{1,2}, 5}$ | $y^{(1)}_{2i_{1,1}, 2i_{1,2}, 6}$ | $y^{(1)}_{2i_{1,1}, 2i_{1,2}, 7}$ |
| 8 | 9 | 10 | 11 |
| $y^{(1)}_{2i_{1,1}, 2i_{1,2}, 8}$ | $y^{(1)}_{2i_{1,1}, 2i_{1,2}, 9}$ | $y^{(1)}_{2i_{1,1}, 2i_{1,2}, 10}$ | $y^{(1)}_{2i_{1,1}, 2i_{1,2}, 11}$ |
| 12 | 13 | 14 | 15 |
| $y^{(1)}_{2i_{1,1}, 2i_{1,2}, 12}$ | $y^{(1)}_{2i_{1,1}, 2i_{1,2}, 13}$ | $y^{(1)}_{2i_{1,1}, 2i_{1,2}, 14}$ | $y^{(1)}_{2i_{1,1}, 2i_{1,2}, 15}$ |

16-23
Indices 16-23 are constructed by replacing the 3rd subscript in indices 0-7 with indices 16-23
24-31
Indices 24-31 are constructed by replacing the 3rd subscript in indices 0-7 with indices 24-31
.
.
.
248-255
Indices 248-255 are constructed by replacing the 3rd subscript in indices 0-7 with indices 248-255 where $y^{(1)}_{2i_{1,1}, 2i_{1,2}, n} = \begin{bmatrix} x_{2i_{1,1}, 2i_{1,2}} \\ x_{2i_{1,1}, 2i_{1,2}} \phi_n \end{bmatrix}$ $x_{2i_{1,1}, 2i_{1,2}}$ is as in Table 10;

$\phi_n = \mathrm{diag}\left(e^{\frac{j2\pi n_0}{4}}, e^{\frac{j2\pi n_1}{4}}, e^{\frac{j2\pi n_2}{4}}, e^{\frac{j2\pi n_3}{4}}\right)$

TABLE 17-continued

W2 or W21 Codebook for 1-layer CSI reporting using antenna ports 15 to 14 + P $i_2$ or $i_{2,1}$ with $n_b = \left\lfloor \dfrac{n}{4^{4-b-1}} \bmod 4 \right\rfloor$ for $b = 0, 1, 2, 3$ as in Table 15

TABLE 18

W3 or W22 Codebook for 1-layer CSI reporting using antenna ports 15 to 14 + P $i_3$ or $i_{2,2}$

| 0 | 1 | 2 | 3 |
|---|---|---|---|
| $W^{(1)}_{2i_{1,1},2i_{1,2},i_{2,1},0}$ | $W^{(1)}_{2i_{1,1},2i_{1,2},i_{2,1},1}$ | $W^{(1)}_{2i_{1,1},2i_{1,2},i_{2,1},2}$ | $W^{(1)}_{2i_{1,1},2i_{1,2},i_{2,1},3}$ |
| 4 | 5 | 6 | 7 |
| $W^{(1)}_{2i_{1,1},2i_{1,2},i_{2,1},4}$ | $W^{(1)}_{2i_{1,1},2i_{1,2},i_{2,1},5}$ | $W^{(1)}_{2i_{1,1},2i_{1,2},i_{2,1},6}$ | $W^{(1)}_{2i_{1,1},2i_{1,2},i_{2,1},7}$ |
| 8 | 9 | 10 | 11 |
| $W^{(1)}_{2i_{1,1},2i_{1,2},i_{2,1},8}$ | $W^{(1)}_{2i_{1,1},2i_{1,2},i_{2,1},9}$ | $W^{(1)}_{2i_{1,1},2i_{1,2},i_{2,1},10}$ | $W^{(1)}_{2i_{1,1},2i_{1,2},i_{2,1},11}$ |
| 12 | 13 | 14 | 15 |
| $W^{(1)}_{2i_{1,1},2i_{1,2},i_{2,1},12}$ | $W^{(1)}_{2i_{1,1},2i_{1,2},i_{2,1},13}$ | $W^{(1)}_{2i_{1,1},2i_{1,2},i_{2,1},14}$ | $W^{(1)}_{2i_{1,1},2i_{1,2},i_{2,1},15}$ |

16-23
Indices 16-23 are constructed by replacing the 3rd subscript in indices 0-7 with indices 16-23
24-31
Indices 24-31 are constructed by replacing the 3rd subscript in indices 0-7 with indices 24-31
⋮
56-63
Indices 56-63 are constructed by replacing the 3rd subscript in indices 0-7 with indices 56-63 where $W^{(1)}_{2i_{1,1},2i_{1,2},n,k} = \dfrac{y^{(1)}_{2i_{1,1},2i_{1,2},n}c_k}{\left\| y^{(1)}_{2i_{1,1},2i_{1,2},n}c_k \right\|}$ $y^{(1)}_{2i_{1,1},2i_{1,2},n}$ is as in Table 17;

$c_k = \mathrm{diag}\left(1, e^{\frac{j2\pi k_1}{4}}, e^{\frac{j2\pi k_2}{4}}, e^{\frac{j2\pi k_3}{4}}\right)$ with $k_b = \left\lfloor \dfrac{k}{4^{4-b-1}} \bmod 4 \right\rfloor$ for $b = 1, 2, 3$ as in Table 16

In some embodiments, CSI feedback enhancement with the following advanced CSI feedback framework may be considered. In one example, reduced space (eigenvectors)/W1 is constructed based on one of the following alternatives: (1) orthogonal basis (e.g. orthogonal DFT matrix); and (2) non-orthogonal basis (e.g. Rel. 13 Class A W1 for rank-1 and/or 2). In another example, reduced space representation/W2 is to further combine selected beams. In yet another example, granularity of weighting (phase and/or amplitude) can be either wideband only or wideband/subband, and is constructed based on one of the following alternatives: (1) phase and amplitude and (2) phase-only weighting.

In the aforementioned embodiments, a linear combination (LC) codebook based CSI reporting is proposed, in which a UE is configured with a LC codebook: $W = W_1 W_2$, where $W_1$ is for WB and long-term first PMI $i_1$ or PMI pair $(i_{1,1}, i_{1,2})$ feedback, which indicates a $2N_1 N_2 \times 2L$ basis matrix B whose columns correspond to 2L beams from a master basis set, and $W_2$ is for SB and short-term second PMI $i_2$ feedback, which indicates a coefficient vector for linear combination of columns of B.

An illustration of the proposed LC codebook for L=4 is shown in FIG. 14. There are two alternatives for LC codebook depending on whether co-phase for the two polarizations is reported separately or jointly with the coefficients. In one embodiment of Alt 0 (without co-phase), the co-phase for the two polarizations is not reported separately and is merged with coefficient reporting. In this alternative, the number of beams for linear combination is 2L (where 2 is for the two polarizations, for example, +45 and −45), and hence a coefficient vector c of length 2L is reported for each layer. The rank-1 LC pre-coder in this case is given by $W^{(1)} = Bc$, where B corresponds to L beams for each of the two polarizations, $b_0, b_1, \ldots b_{L-1}$ and $b'_0, b'_1, \ldots b'_{L-1}$, i.e. the basis matrix is given by: B=

$$B = \begin{bmatrix} b_0, b_1, \ldots b_{L-1} & 0\ 0\ \ldots\ 0 \\ 0\ 0\ \ldots\ 0 & b'_0, b'_1, \ldots b'_{L-1} \end{bmatrix}.$$

In the rest of the present disclosure, it is assumed that the bases for the two polarizations are the same, i.e., $b_0, b_1, \ldots b_{L-1} = b'_0, b'_1, \ldots b'_{L-1}$. The embodiments of present disclosure, however, are applicable to the case in which the bases for the two polarizations are different, i.e., $b_0, b_1, \ldots b_{L-1} \ne b'_0, b'_1, \ldots b'_{L-1}$.

In another embodiment of Alt 1 (with co-phase), the co-phase for the two polarizations is reported separately. In this alternative, for each layer, a coefficient vector c of length L and a co-phase matrix φ for the two polarizations of dimension 2L×L are reported. So, the rank-1 LC pre-coder is given by $W^{(1)}=B\phi c$, where $\phi$ corresponds to co-phase values $\phi_0, \phi_1, \ldots \phi_{L-1}$ for the two polarizations and L beams, i.e.

$$B\phi = \begin{bmatrix} b_0, b_1, \ldots b_{L-1} & 0\ 0\ \ldots\ 0 \\ 0\ 0\ \ldots\ 0 & b_0, b_1, \ldots b_{L-1} \end{bmatrix}$$

$$\begin{bmatrix} e_0 & e_1 & \ldots & e_{L-1} \\ \phi_0 e_0 & \phi_1 e_1 & \ldots & \phi_{L-1} e_{L-1} \end{bmatrix} = \begin{bmatrix} b_0 & b_1 & \ldots & b_{L-1} \\ \phi_0 b_0 & \phi_1 b_1 & \ldots & \phi_{L-1} b_{L-1} \end{bmatrix}.$$

In the aforementioned embodiments, the details about LC codebook based on non-orthogonal $W_1$ basis, such LTE Rel. 13 Class A rank 1-2 $W_1$ codebook, are proposed. In the next part of this disclosure, LC codebook details based on both non-orthogonal and orthogonal $W_1$ basis are proposed.

Figure 20:
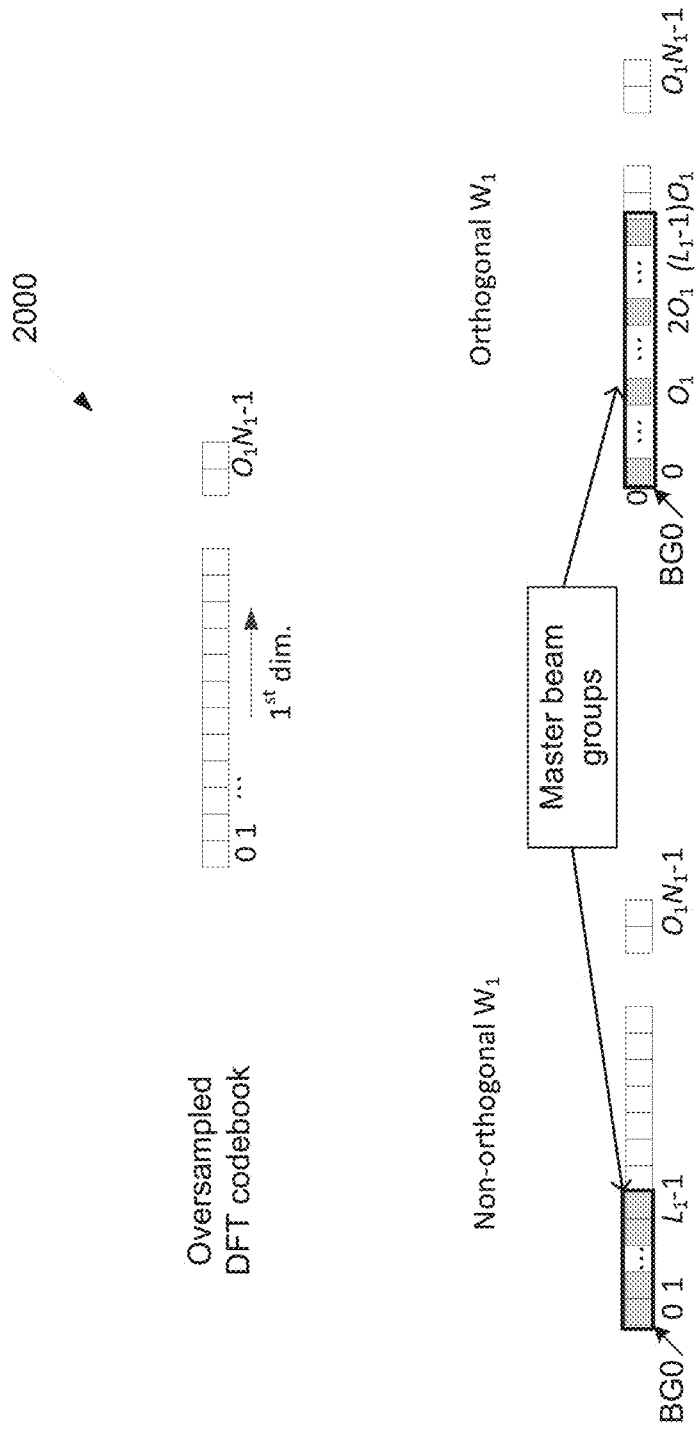
FIG. 20 illustrates an example non-orthogonal and orthogonal master beam groups 1D port layouts ($N_1>1$, $N_2=1$) according to embodiments of the present disclosure.

FIG. 20 illustrates an example non-orthogonal and orthogonal master beam groups 1D port layouts ($N_1>1$, $N_2=1$) 2000 according to embodiments of the present disclosure. An embodiment of the non-orthogonal and orthogonal master beam groups 1D port layouts ($N_1>1$, $N_2=1$) 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions. Other embodiments are used without departing from the scope of the present disclosure.

Figure 21:
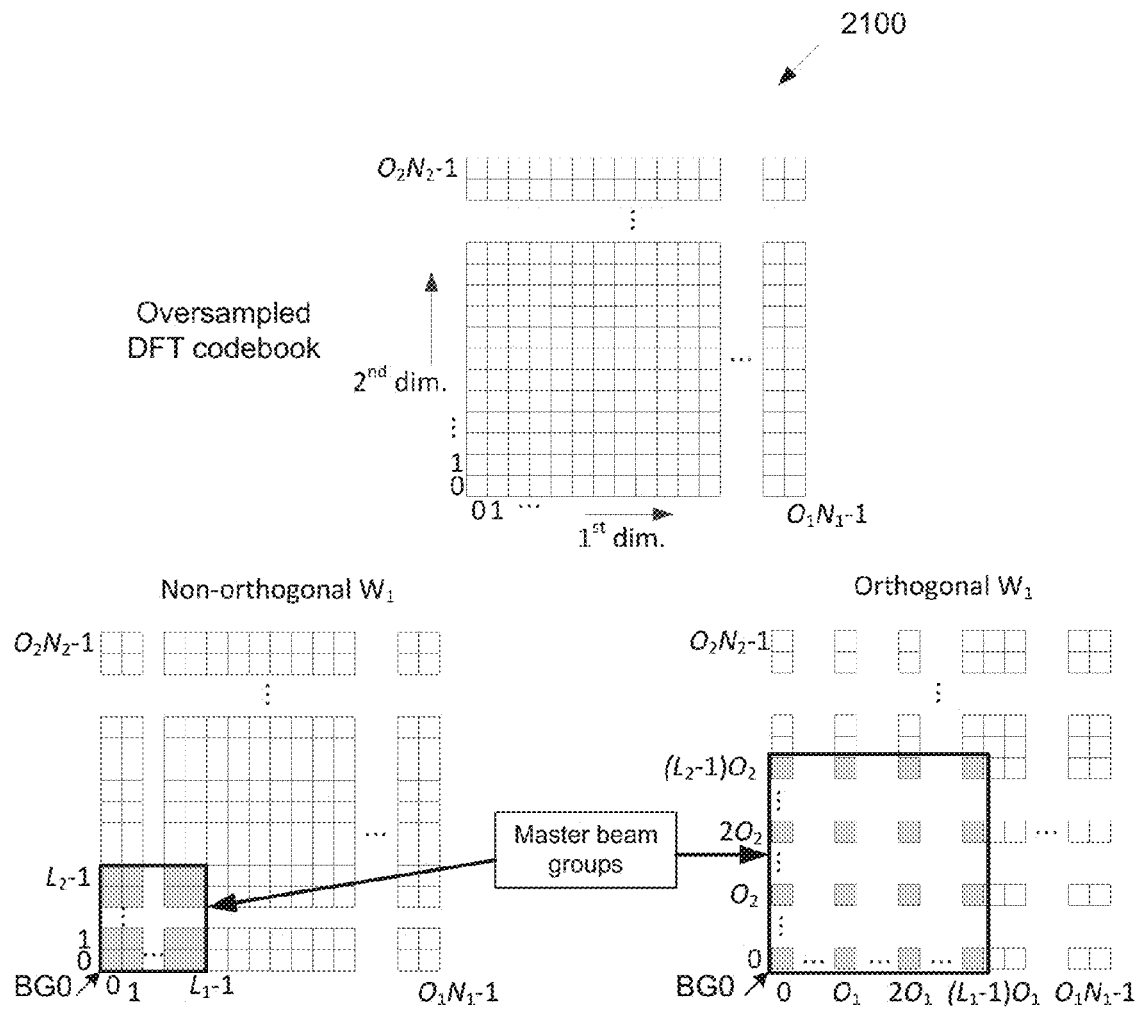
FIG. 21 illustrates example non-orthogonal and orthogonal master beam groups of 2D port layouts (N1>1, N2>1) according to embodiments of the present disclosure.

FIG. 21 illustrates example non-orthogonal and orthogonal master beam groups of 2D port layouts (N1>1, N2>1) 2100 according to embodiments of the present disclosure. An embodiment of the non-orthogonal and orthogonal master beam groups of 2D port layouts (N1>1, N2>1) 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with an oversampled DFT codebook as the master basis set for the LC codebook via higher-layer RRC parameters: $N_1$ and $O_1$ for 1D antenna port layouts (i.e. $N_1>1$, $N_2=1$), as shown in FIG. 20, which comprises of $O_1 N_1$ DFT beams; and $N_1$, $N_2$, $O_1$, and $O_2$ for 2D antenna port layouts (i.e. $N_1>1$, $N_2>1$), as shown in FIG. 21, which comprises of $O_1 N_1 \times O_2 N_2$ two-dimensional DFT beams, each of which is obtained by the Kronecker product of a DFT beam in the first dimension and a DFT beam in the second dimension.

A 1D or 2D beam is illustrated as a square in FIG. 20 and FIG. 21. This is for illustration only. The beams can be of arbitrary shape in practice. Using this oversampled DFT codebook, master beam groups are constructed by selecting: for 1D layouts, $L_1$ beams from the oversampled DFT codebook such that the beams are uniformly-spaced, i.e., the difference between the indices of two consecutive beams is constant; and for 2D layouts, $L_1 \times L_2$ beams from the oversampled DFT codebook, where $L_1$ and $L_2$ are the number of beams in first and second dimensions, respectively such that the beams are uniformly-spaced, i.e., the difference between the indices of two consecutive beams in first (or second) dimension of the beam group is constant.

In particular, two types of master beam groups are constructed as shown in FIG. 20 and FIG. 21. In one example of non-orthogonal, the difference between two consecutive (or adjacent) beam indices in first (or second) dimension of the beam group is one. In another example of orthogonal, the difference between two consecutive (or adjacent) beam indices in first (or second) dimension of the beam group is $O_1$ (or $O_2$).

An example of the master beam group with the leading beam at (0, 0) is also shown in FIG. 21 and FIG. 22 as BG0. Two alternatives for ($L_1$, $L_2$) value are as follows: non-orthogonal with ($L_1$, $L_2$)=(8, 1) for 1D port layouts, and ($L_1$, $L_2$)=(4, 2) if $N_1 \geq N_2$ and ($L_1$, $L_2$)=(2, 4) if $N_1 < N_2$ for 2D port layouts; and orthogonal with ($L_1$, $L_2$)=($N_1$, 1) for 1D port layouts, and ($L_1$, $L_2$)=($N_1$, $N_2$) for 2D port layouts.

FIG. 22 illustrates example non-orthogonal and orthogonal master beam groups with ($L_1$, $L_2$)=(4, 2) 2200 for $N_1 \geq N_2$ according to embodiments of the present disclosure. An embodiment of the example non-orthogonal and orthogonal master beam groups with ($L_1$, $L_2$)=(4, 2) 2200 for $N_1 \geq N_2$ shown in FIG. 22 is for illustration only. One or more of the components illustrated in FIG. 22 can be implemented in specialized circuitry configured to perform the noted functions or one or more of the components can be implemented by one or more processors executing instructions to perform the noted functions. Other embodiments are used without departing from the scope of the present disclosure. An illustration of master beam group for ($L_1$, $L_2$)=(4, 2) and $N_1 \geq N_2$ is shown in FIG. 22.

In the explanation below and in the rest of the present disclosure ($L_1$, $L_2$)=(4, 2) for $N_1 \geq N_2$ is considered for illustration, unless otherwise mentioned. It is straightforward to extend the explanations and embodiments of the present disclosure to ($L_1$, $L_2$)=(2, 4) for $N_1 < N_2$ layouts.

Note that ($L_1$, $L_2$)=(4, 2) for non-orthogonal master beam group corresponds to master beam group in LTE Rel. 13 Class A rank 1-2 codebook. Note also that ($L_1$, $L_2$)=($N_1$, $N_2$) for orthogonal master beam group implies that the master beam group is full orthogonal DFT basis.

In one example, ($L_1$, $L_2$) value or/and master beam group type (non-orthogonal or orthogonal) are fixed in the specification, for example ($L_1$, $L_2$) is fixed to be (8, 1) for 1D port layouts, and (4, 2) or (2, 4) for 2D port layouts, and master beam group type is fixed to be non-orthogonal master beam group.

In another example, the UE is configured with an ($L_1$, $L_2$) value and one of the two types of master beam groups. This configuration is via higher layer RRC signaling. For example, eNB configures one of the two master beam groups shown in FIG. 20 and FIG. 21 via 1-bit RRC parameter MasteBeamGroupType or OrthogonalBasisEnabled. When MasteBeamGroupType or OrthogonalBasisEnabled is turned "ON," the UE uses orthogonal master beam group in the LC codebook. Otherwise the UE uses non-orthogonal master beam group.

In another example, the UE reports a preferred ($L_1$, $L_2$) value or/and a preferred master beam group type. This reporting is WB, and is either explicit as a new WB CSI type or implicit with either RI or $i_1$ or $i_{1,1}$ or $i_{1,2}$, for example. Using the following configured or determined parameters: $N_1$, $N_2$, $O_1$, and $O_2$; (L1, $L_2$); and Master beam group type with non-orthogonal or orthogonal. The dual-stage LC codebook $W=W_1 W_2$ is constructed as follows.

The $W_1$ codebook is for WB CSI reporting and comprises of the following three components. In one example of Master beam group, the master beam group of size ($L_1$, $L_2$) and non-orthogonal or orthogonal type is selected from the oversampled DFT codebook. In another example of WB beam selection, L out of $L_1$ beams for 1D layouts and L out of $L_1 \times L_2$ beams for 2D layouts are selected from the master beam group. In yet another example of WB beam power selection, WB beam power levels for L selected beams are selected from a codebook.

The first WB component (i.e. master beam group) is always reported using the first PMI $i_1$ or $(i_{1,1}, i_{1,2})$.

The second WB component (i.e. L beams) is always reported and L beams are selected from the reported master beam group. A few examples of L values include 2, 4, and 8. The L value can either be fixed (e.g. L=4) or the second WB component is reported in the CSI report or the second WB component is configured via higher layer RRC signaling. In case L is reported in the CSI report, the second WB is reported either explicitly as a new CSI reporting type or implicitly with RI or $i_1$ or $i_1,i$ or $i_{1,2}$.

In the rest of the present disclosure, L is assumed to be either fixed or RRC configured to L=4.

Figure 23:
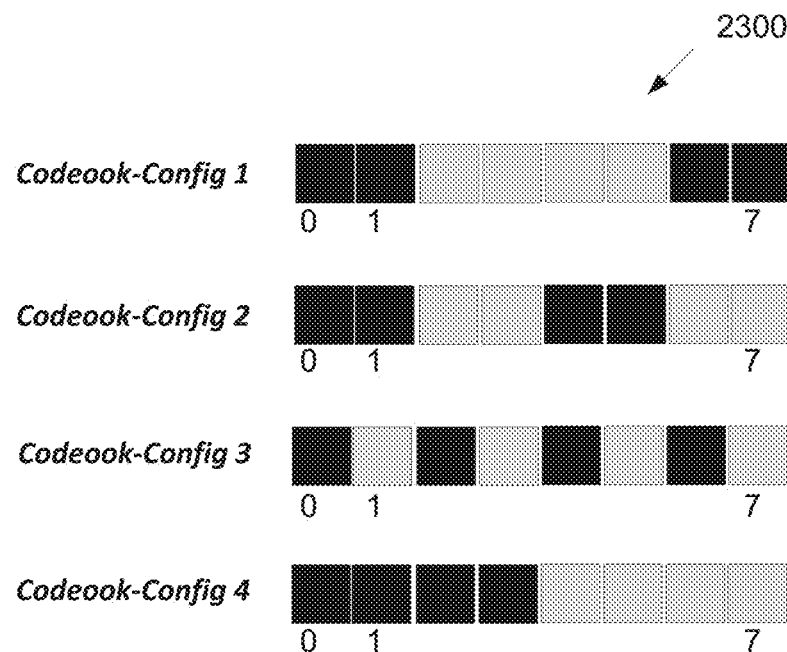
FIG. 23 illustrates an example beam selection from a non-orthogonal master beam group with (L1, L2)=(8, 1) for 1D layouts according to embodiments of the present disclosure.

FIG. 23 illustrates an example beam selection from a non-orthogonal master beam group with (L1, L2)=(8, 1) 2300 for 1D layouts according to embodiments of the present disclosure. An embodiment of the beam selection from a non-orthogonal master beam group with (L1, L2)=(8, 1) 2300 shown in FIG. 23 is for illustration only. One or more of the components illustrated in FIG. 23 can be implemented in specialized circuitry configured to perform the noted functions or one or more of the components can be implemented by one or more processors executing instructions to perform the noted functions. Other embodiments are used without departing from the scope of the present disclosure.

Figure 24:
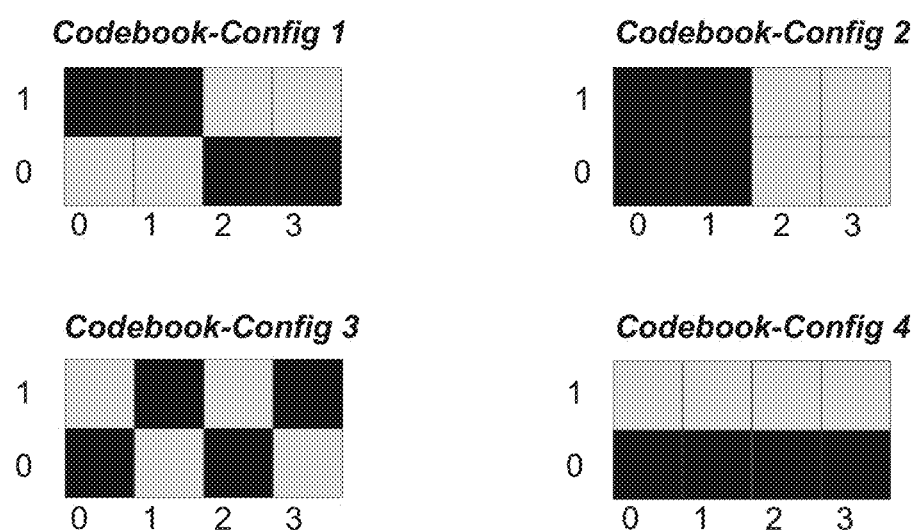
FIG. 24 illustrates an example beam selection from a non-orthogonal master beam group with (L1, L2)=(4, 2) for 2D layouts according to embodiments of the present disclosure.

FIG. 24 illustrates an example beam selection from a non-orthogonal master beam group with (L1, L2)=(4, 2) 2400 for 2D layouts according to embodiments of the present disclosure. An embodiment of the beam selection from a non-orthogonal master beam group with (L, L2)=(4, 2) 2400 shown in FIG. 24 is for illustration only. One or more of the components illustrated in FIG. 24 can be implemented in specialized circuitry configured to perform the noted functions or one or more of the components can be implemented by one or more processors executing instructions to perform the noted functions. Other embodiments are used without departing from the scope of the present disclosure.

Figure 25:
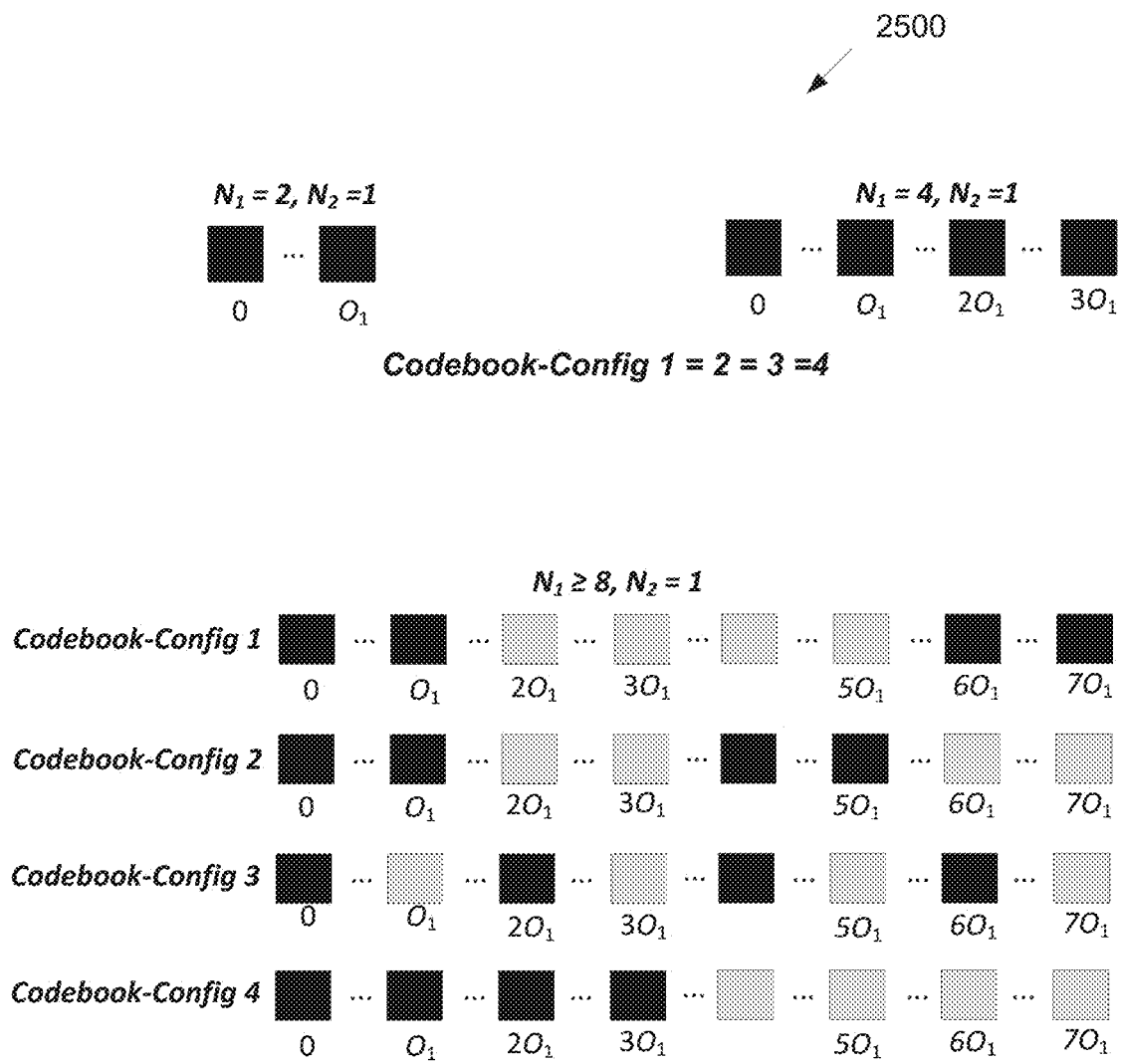
FIG. 25 illustrates an example beam selection from an orthogonal master beam group with (L1, L2)=(8, 1) for 1D layouts according to embodiments of the present disclosure.

FIG. 25 illustrates an example beam selection from an orthogonal master beam group with (L1, L2)=(8, 1) 2500 for 1D layouts according to embodiments of the present disclosure. An embodiment of the beam selection from an orthogonal master beam group with (L, L2)=(8, 1) 2500 shown in FIG. 25 is for illustration only. One or more of the components illustrated in FIG. 25 can be implemented in specialized circuitry configured to perform the noted functions or one or more of the components can be implemented by one or more processors executing instructions to perform the noted functions. Other embodiments are used without departing from the scope of the present disclosure.

Figure 26:
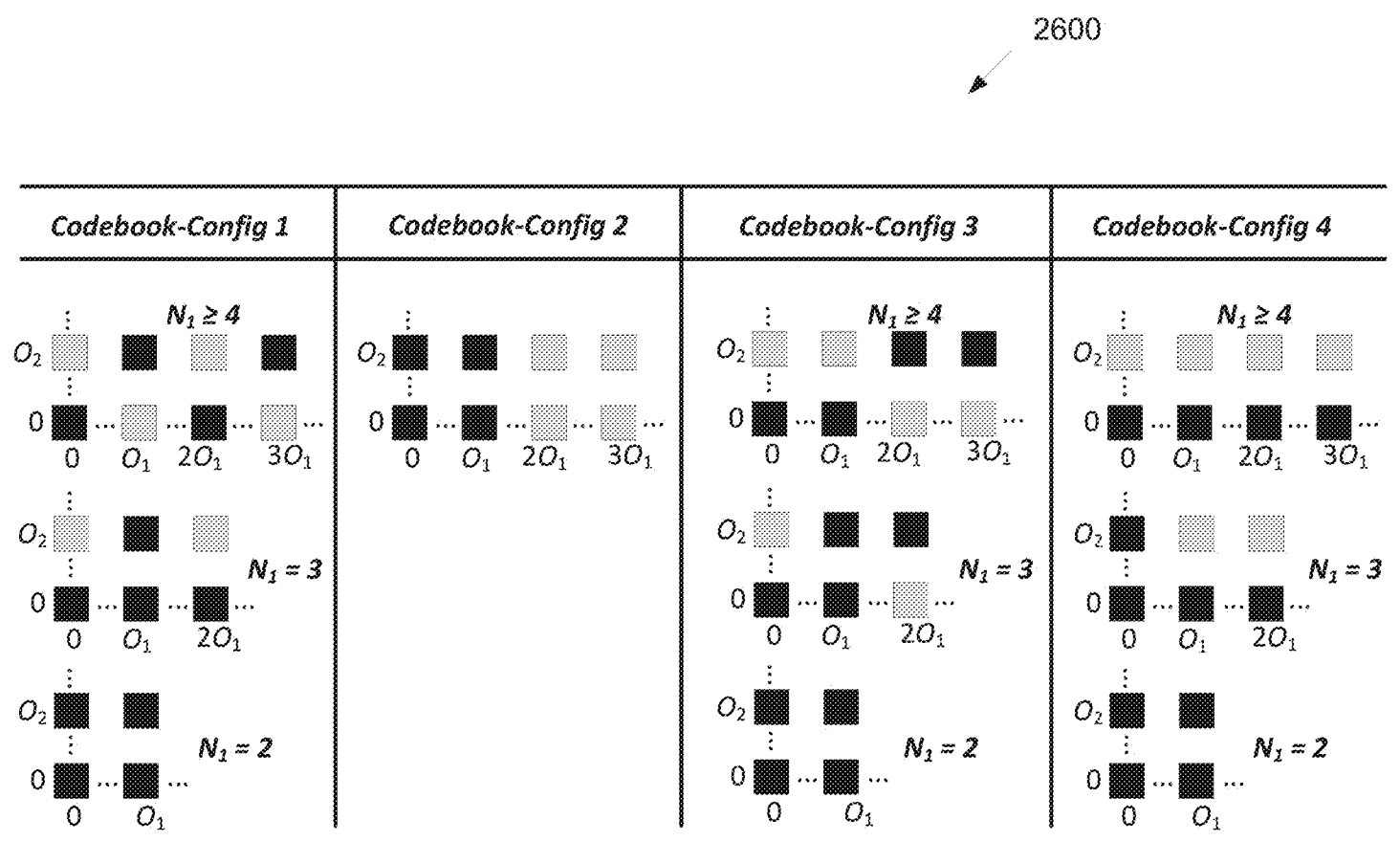

FIG. 26 illustrates an example beam selection from an orthogonal master beam group with $(L_1, L_2)$=(4, 2) 2600 for 2D layouts according to embodiments of the present disclosure. An embodiment of the beam selection from an orthogonal master beam group with $(L_1, L_2)$=(4, 2) 2600 for 2D layouts shown in FIG. 26 is for illustration only. One or more of the components illustrated in FIG. 26 can be implemented in specialized circuitry configured to perform the noted functions or one or more of the components can be implemented by one or more processors executing instructions to perform the noted functions. Other embodiments are used without departing from the scope of the present disclosure.

In some embodiments of L beam selection (e.g., Parameterized beam selection), the selection of L beams is based on Codebook-Config parameter. Examples of a few beam selections are shown in FIG. 23 and FIG. 24 for non-orthogonal master beam group type, and in FIG. 25 and FIG. 26 for orthogonal master beam group type assuming L=4, and $(L_1, L_2)$=(8, 1) for 1D layouts and (4, 2) for 2D layouts.

The selected beams are shown in black color squares. Note that beam groups for Codebook-Config 2, 3, and 4 in FIG. 24 correspond to LTE Rel. 13 Class A rank 1-2 $W_1$ codebook, and beam groups for Codebook-Config 2, 3, and 4 in FIG. 26 correspond to LTE Rel. 13 Class A rank 7-8 $W_1$ codebook. Similarly, beam group for Codebook-Config 4 in FIG. 23 corresponds to LTE Rel. 13 Class A rank 1-2 $W_1$ codebook, and beam group for Codebook-Config 4 in FIG. 25 corresponds to LTE Rel. 13 Class A rank 7-8 $W_1$ codebook.

There are the following alternatives for 1D port layouts. In one alternative, only Codebook-Config=4 is supported for LC codebook if the UE is configured with a 1D port layout. In another alternative, for LC codebook, the supported Codebook-Config values for 1D port layouts are 1 and 4 (same values as in LTE Rel. 13 Class A codebook for 1D layouts) with one of the following options for beam grouping: Codebook-Config 1 and 4 corresponds to the same beam group (similar to LTE Rel. 13 Class A codebook for rank 7-8), for example, the beam group for Codebook-Config 4 in FIG. 23 (non-orthogonal) and FIG. 25 (orthogonal); and Codebook-Config 1 and 4 corresponds to the two different beam groups, for example, the beam groups for Codebook-Config 1 and 4 in FIG. 25 (non-orthogonal) and FIG. 25 (orthogonal). In yet another alternative, for LC codebook, the supported Codebook-Config values for 1D port layouts are 1, 2, 3, and 4, for example, the beam groups for Codebook-Config 1, 2, 3, and 4 in FIG. 23 (non-orthogonal) and FIG. 25 (orthogonal). This last alternative is assumed in the rest of the present disclosure.

Similarly, there are the following alternatives for 2D port layouts. In one alternative, only Codebook-Config=2, 3, and 4 are supported for LC codebook if the UE is configured with a 2D port layout. In another alternative, for LC codebook, the supported Codebook-Config values for 2 port layouts are 1, 2, 3, and 4 (same values as in LTE Rel. 13 Class A codebook for 1D layouts) with one of the following options for beam grouping: Codebook-Config 1 and 2 corresponds to the same beam group (similar to LTE Rel. 13 Class A codebook for rank 7-8), for example, the beam group for Codebook-Config 2 in FIG. 24 (non-orthogonal) and FIG. 26 (orthogonal) and Codebook-Config 1 and 2 corresponds to the two different beam groups, for example, the beam groups for Codebook-Config 1 and 2 in FIG. 24 (non-orthogonal) and FIG. 26 (orthogonal). This alternative is assumed in the rest of the present disclosure.

There are the following methods to configure or report Codebook-Config. In one embodiment, the Codebook-Config value is always fixed in the specification. Hence, no configuration or reporting is needed. For example, Codebook-Config can be fixed to Codebook-Config=4 for 1D port layouts and Codebook-Config=2 or 3 for 2D port layouts. In another embodiment, the UE reports a preferred Codebook-Config value in the CSI report where this reporting is WB. For example, a 2-bit WB indication of a preferred Codebook-Config value (one of FIG. 23-FIG. 26) is reported in the CSI. This reporting can be explicit as a new CSI reporting type or implicit together with RI or $i_1$ or $i_{1,1}$ or $i_{1,2}$.

In another embodiment, Codebook-Config is configured via RRC signaling, similar to configuration of LTE Rel. 13 Class A codebook.

In some embodiments of unconstrained beam selection: The selected L beams is unconstrained and any L out of $L_1L_2$ beams can be reported. In this case, the reporting can be based on a bitmap of length $L_1L_2$. For example, a length-8 bitmap can be reported to indicate selection of L beams out of $(L_1, L_2)=(8, 1)$ or $(4, 2)$ master beam group. This reporting can be explicit as a new CSI reporting type or implicit together with RI or $i_1$ or $i_{1,1}$ or $i_{1,2}$.

The third WB component (i.e. beam power) is reported according to one of the following alternatives. In one alternative, WB beam power levels are not reported. In this case, equal beam power levels (i.e. constant-modulus LC coefficients) are assumed while deriving the LC pre-coder. In another alternative, WB beam power levels are always reported using a beam power codebook. In yet another alternative, beam power reporting is configurable using a RRC parameter BeamPowerEnabled. If BeamPowerEnabled is turned ON, then WB beam power levels are reported. If BeamPowerEnabled is turned OFF, then WB beam power levels are not reported and equal beam power levels (i.e. constant-modulus LC coefficients) are assumed while deriving the LC pre-coder. In one example, BeamPowerEnabled is turned ON for Class A eMIMO-Type, and BeamPowerEnabled is turned OFF for Class B eMIMO-Type. In the latter case, the $W_2$ component of the proposed LC codebook is used as the LC codebook for Class B eMIMO-Type.

Two examples of beam power codebook are as follows. In one example of Scalar beam power codebook: power level for each beam is selected using a $N_p$-bit uniform scalar codebook in $(0, 1)$. For example, for $N_p=2$, the scalar codebook is $\{1/8, 3/8, 5/8, 7/8\}$. In another example of Vector beam power codebook, power level for all L beams are selected using a unit-norm vector codebook. An example of such a codebook is shown in Table 19.

TABLE 19

Vector beam power codebook

| Number of selected beams (L value) | Power levels | Beam power | Total number vectors of beam power vectors |
|---|---|---|---|
| 1 | 1 | 1 | 1 |
| 2 | [7 1] | [7/8 1/8], [1/8, 7/8] | 7 |
|   | [6 2] | [6/8 2/8], [2/8 6/8] |   |
|   | [5 3] | [3/8 5/8], [5/8 3/8] |   |
|   | [4 4] | [4/8 4/8] |   |
| 3 | [6 1 1] | [6/8, 1/8, 1/8], [1/8, 6/8, 1/8], [1/8, 1/8, 6/8] | 21 |
|   | [5 2 1] | [5/8, 2/8, 1/8], [5/8, 1/8, 2/8], [2/8, 5/8, 1/8], [2/8, 1/8, 5/8], [1/8, 5/8, 2/8], [1/8, 2/8, 5/8] |   |
|   | [4 2 2] | [4/8, 2/8, 2/8], [2/8, 4/8, 2/8], [2/8, 2/8, 4/8] |   |
|   | [4 3 1] | [4/8, 3/8, 1/8], [4/8, 1/8, 3/8], [3/8, 4/8, 1/8], [1/8, 4/8, 3/8], [1/8, 4/8, 3/8], [1/8, 3/8, 4/8] |   |
|   | [3 3 2] | [3/8, 3/8, 2/8], [3/8, 2/8, 3/8], [2/8, 3/8, 3/8] |   |

TABLE 19-continued

Vector beam power codebook

| Number of selected beams (L value) | Power levels | Beam power | Total number vectors of beam power vectors |
|---|---|---|---|
| 4 | [5 1 1 1] | [5/8, 1/8, 1/8, 1/8], [1/8, 5/8, 1/8, 1/8], [1/8, 1/8, 5/8, 1/8], [1/8, 1/8, 1/8, 5/8] | 35 |
|   | [4 2 1 1] | [4/8, 2/8, 1/8, 1/8], [4/8, 1/8, 2/8, 1/8], [4/8, 1/8, 1/8, 2/8], [2/8, 4/8, 1/8, 1/8], [1/8, 4/8, 2/8, 1/8], [1/8, 4/8, 1/8, 2/8], [1/8, 2/8, 4/8, 1/8], [2/8, 1/8, 4/8, 1/8], [1/8, 1/8, 4/8, 2/8], [1/8, 2/8, 1/8, 4/8], [1/8, 1/8, 2/8, 4/8], [2/8, 1/8, 1/8, 4/8] |   |
|   | [3 3 1 1] | [3/8, 3/8, 1/8, 1/8], [3/8, 1/8, 3/8, 1/8], [3/8, 1/8, 1/8, 3/8], [1/8, 3/8, 3/8, 1/8], [1/8, 1/8, 3/8, 3/8], [1/8, 3/8, 1/8, 3/8] |   |
|   | [3 2 2 1] | [3/8, 2/8, 2/8, 1/8], [3/8, 2/8, 1/8, 2/8], [3/8, 1/8, 2/8, 2/8], [2/8, 3/8, 2/8, 1/8], [2/8, 3/8, 1/8, 2/8], [2/8, 2/8, 3/8, 1/8], [2/8, 2/8, 1/8, 3/8], [2/8, 1/8, 2/8, 3/8], [2/8, 1/8, 3/8, 2/8], [1/8, 3/8, 2/8, 2/8], [1/8, 2/8, 3/8, 2/8], [1/8, 2/8, 2/8, 3/8] |   |
|   | [2 2 2 2] | [2/8, 2/8, 2/8, 2/8] |   |

The breakdown of the number of WB bits for the three components is as follows. In one example for master beam group, the range of values of $i_{1,1}$ and $i_{1,2}$ is given by $i_{1,1}=0, 1, 2, \ldots O_1N_1/s_1$ and $i_{1,2}=0, 1, 2, \ldots O_2N_2/s_2$, where $(s_1,s_2)$ are spacing between two adjacent master beam groups in two dimensions. The example values of $s_1$ (or $s_2$) are 1, 2, $O_1/4$ (or $O_2/4$), $O_1/2$ (or $O_2/2$), and $O_1$ (or $O_2$). So, the number of bits to report $i_{1,1}$ and $i_{1,2}$ is $$\log_2\left\lceil\frac{O_1N_1}{s_1}\right\rceil \text{ and } \log_2\left\lceil\frac{O_2N_2}{s_2}\right\rceil,$$

respectively. In another example for WB beam selection, $N_b$ bits are reported, where $N_b=2$ (parameterized) or $L_1L_2$ (unconstrained). In yet another example for WB beam power, $N_p=(L-1)P$ bits are reported, where $1^{st}$ beam is assumed to be unit-power, and power levels for $(L-1)$ beams are selected from a codebook assuming P bit for each beam. So the total number of WB CSI bits is $$\log_2\left\lceil\frac{O_1N_1}{s_1}\right\rceil + \log_2\left\lceil\frac{O_2N_2}{s_2}\right\rceil + N_b + N_p.$$

If these WB bits are reported jointly, then these WB bits can be reported in $i_{1,1}$. Alternatively, if these WB bits are reported separately, then the master beam group can be reported using $i_{1,1}$ and $i_{1,2}$, and beam selection and beam power selection can be reported either jointly using BGI (Beam Group Index) of $N_b+N_p$ bits; or separately using BGI of $N_b$ bits and BPI (Beam Power Index) of $N_p$ bits, respectively. In this later alternative, a new CSI reporting type for BSI and BPI are defined in the specification.

The $W_2$ codebook is for per SB CSI reporting and comprises of the following three components. In one embodiment, the $W_2$ codebook comprises SB beam selection. In this example, the first component is B out of L beam selection, where 1≤B≤L and this selection is per SB. The LC coefficient vector with beam selection matrix $E_B$ can be expressed as $c=E_B C_B$, where the length-B coefficient vector after beam selection is $c_B=[c_0\ c_1\ \ldots\ C_{B-1}]$ and, for example, for 4 beams, i.e., L=4, 2L×B beam selection matrix $E_B$ is as given in Table 20.

TABLE 20

| B | Number of candidate beam selection matrices $\binom{4}{B}$ | Beam selection matrix $E_B$ |
|---|---|---|
| 1 | 4 | $E_{1,0} = e_0$, $E_{1,1} = e_1$, $E_{1,2} = e_2$, $E_{1,3} = e_3$ |
| 2 | 6 | $E_{2,0} = [e_0\ e_1]$, $E_{2,1} = [e_0\ e_2]$, $E_{2,2} = [e_0\ e_3]$, $E_{2,3} = [e_1\ e_2]$, $E_{2,4} = [e_1\ e_3]$, $E_{2,5} = [e_2\ e_3]$ |
| 3 | 4 | $E_{3,0} = [e_0\ e_1\ e_2]$, $E_{3,1} = [e_0\ e_1\ e_3]$, $E_{3,2} = [e_0\ e_2\ e_3]$, $E_{3,3} = [e_1\ e_2\ e_3]$ |
| 4 | 1 | $E_{4,0} = [e_0\ e_1\ e_2\ e_3]$ |

In another embodiment, the $W_2$ codebook comprises co-phase. In this example, if the configured LC codebook is according to Alt 1 in FIG. 14, then the co-phase values (for two polarizations) for B selected beams are selected using a co-phase codebook, where co-phase values $\phi_0, \phi_1, \ldots \phi_{B-1}$ for the two polarizations are selected according to one of the following types. In one example of single type, each co-phase value $\phi_l$ is selected from a single codebook. An example of the codebook is K-PSK codebook, where a few example values of K is 2 (BPSK), 4 (QPSK), and 8 (8-PSK). In another example of double type, each co-phase value is decomposed as $\phi_l=\phi_l^{(1)}\phi_l^{(2)}$ and is selected from a double codebook, $C_{coph}=C_{coph}^{(1)}C_{coph}^{(2)}$, where $C_{coph}^{(1)}$ and $C_{coph}^{(2)}$ respectively are codebooks for WB and SB components of the co-phase $\phi_l^{(1)}$ and $\phi_l^{(2)}$, respectively. An example of the double codebook is $$C_{coph}^{(1)} = \left\{e^{j\frac{\pi}{4}}, e^{j\frac{3\pi}{4}}, e^{j\frac{5\pi}{4}}, e^{j\frac{7\pi}{4}}\right\} \text{ and }$$

$$C_{coph}^{(2)} = \left\{e^{j\frac{\pi}{4}}, e^{-j\frac{\pi}{4}}\right\}.$$

In one example of co-phase codebook, $\phi_l^{(1)}=\phi_k^{(1)}$ and $\phi_l^{(2)}\neq\phi_k^{(2)}$ (i.e. common WB and different SB co-phase components for all beams) for all l, k in $\{0, 1, \ldots, B-1\}$.

In yet another embodiment, the $W_2$ codebook comprises coefficients. In this example, coefficients to linearly combine B selected beams are selected using a coefficient codebook, which is constant-modulus (i.e. phase only). There are two alternatives for coefficient phases. In one alternative of Vector phase codebook, the phases of coefficients are quantized jointly using a vector codebook. An example of the vector phase codebook is an oversampled DFT codebook. Two alternatives in this case are as follows. In one example of single type, the coefficient phase vector $c=[\alpha_0\ \alpha_1\ \ldots\ \alpha_{2B-1}]$ (Alt 0) or $[\alpha_0\ \alpha_1\ \ldots\ \alpha_{B-1}]$ (Alt 1) is selected from a single vector phase codebook, an example of which is a DFT codebook with appropriate oversampling factor O, in which c belongs to (Alt 0)

$$C_{Coef,0} = \left\{\left[1\ e^{j\frac{2\pi k}{2OB}}\ \ldots\ e^{j\frac{2\pi k(2B-1)}{2OB}}\right]^T : k = 0, 1, \ldots, 2OB-1\right\}; \text{ or}$$

(Alt 1)

$$C_{Coef,1} = \left\{\left[1\ e^{j\frac{2\pi k}{OB}}\ \ldots\ e^{j\frac{2\pi k(B-1)}{OB}}\right]^T : k = 0, 1, \ldots, OB-1\right\}.$$

In another example of double type, the coefficient phase vector is decomposed as $c=c^{(1)}c^{(2)}$ and is selected from a double vector phase codebook, an example of which is double DFT codebook in which $c^{(1)}$ and $c^{(2)}$ are selected from a DFT codebook with appropriate oversampling factor O such that $c^{(1)}$ represents a group of K DFT vectors, and $c^{(2)}$ selects one DFT vector from the group. A few examples of K value are 4, 8, and 16. This is similar to the Rel. 10 8-Tx dual-stage codebook.

In another alternative of scalar phase codebook, the phases of coefficients are quantized separately using a scalar codebook. An example of the scalar phase codebook is K-PSK codebook, where a few example values of K is 2 (BPSK), 4 (QPSK), and 8 (8-PSK). Two alternatives in this case are as follows. In one example of single type, each coefficient phase ca is selected from a single codebook, e.g. $C_{coef}=\{1,-1, j,-j\}$. In another example of double type, each coefficient phase is decomposed as $\alpha_l=\alpha_l^{(1)}\alpha_l^{(2)}$ and is selected from a double codebook, e.g. $C_{coef}=C_{coef}^{(1)}C_{coef}^{(2)}$, where $C_{coef}^{(1)}$ and $C_{coef}^{(2)}$ respectively are codebooks for WB and SB components of the phase. An example of the double phase codebook is $$C_{coef}^{(1)} = \left\{e^{j\frac{\pi}{4}}, e^{j\frac{3\pi}{4}}, e^{j\frac{5\pi}{4}}, e^{j\frac{7\pi}{4}}\right\} \text{ and } C_{coef}^{(2)} = \left\{e^{j\frac{\pi}{4}}, e^{-j\frac{\pi}{4}}\right\}.$$

Figure 30:
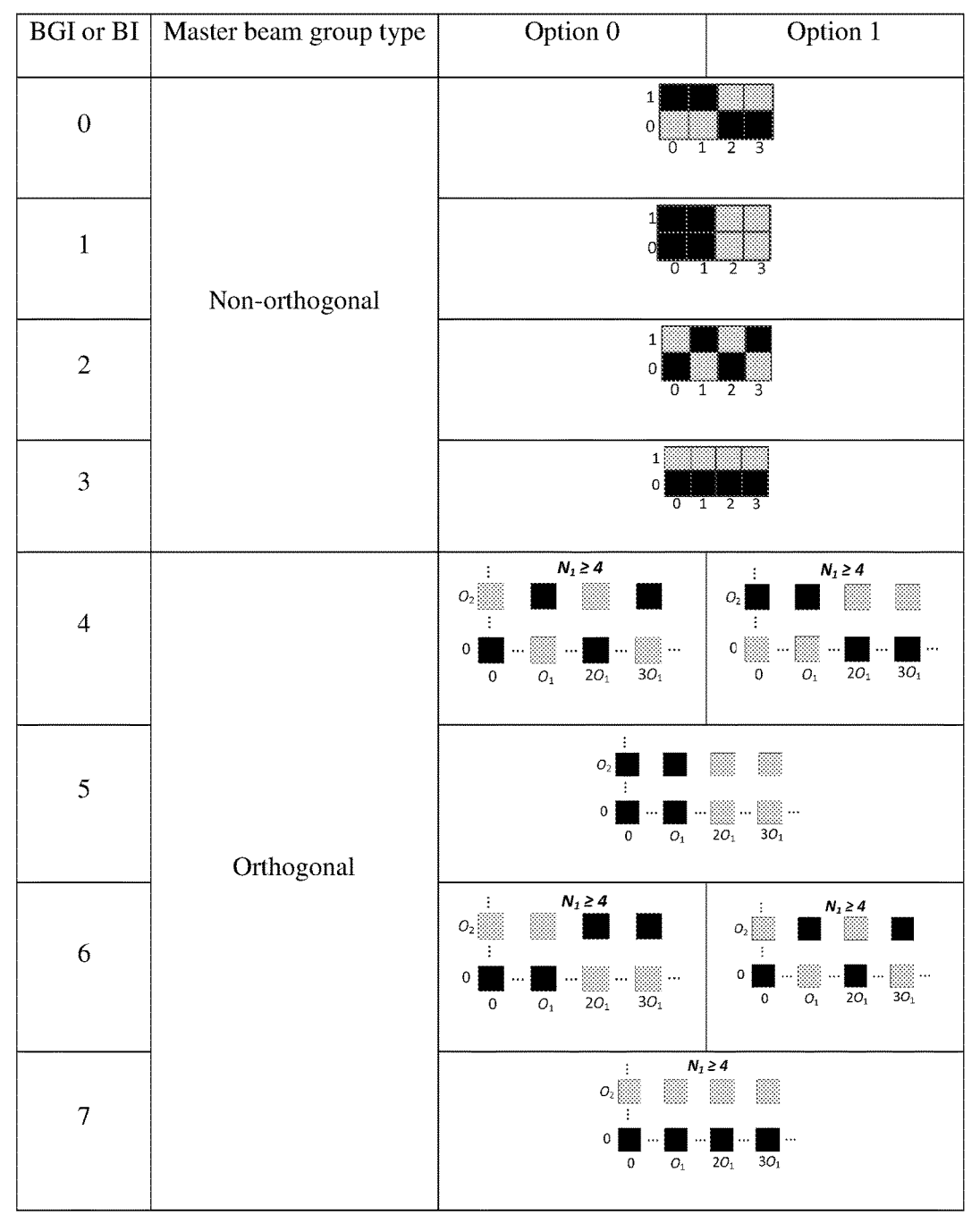

In some embodiments, a new CSI parameter Beam Group Index (BGI) or Basis Index (BI) is defined for LC codebook to indicate L beams in the $W_1$ codebook. An example of BGI or BI to beam group mapping is shown in FIG. 30 with the following two options. In one example of Option 0, BGI or BI=0-3 are mapped to Codebook-Config 1-4 in FIG. 24, and BGI or BI=4-7 are mapped to Codebook-Config 1-4 in FIG. 26. In another example of Option 1, BI=0-3 are mapped to Codebook-Config 1-4 in FIG. 24, and BGI or BI=4-7 are mapped to Codebook-Config 1-4 in FIG. 23 with inter-beam spacing $(O_1,O_2)$ instead of $(1,1)$ in FIG. 26. The UE is either configured with one of BGI or BI value for the LC codebook or reports a preferred BGI or BI in the CSI report, where this reporting is 3-bit WB (joint with $i_{1,1}$ or as a separate CSI component).

In some embodiments, a UE is configured with the LC codebook for rank ≤r, and Class A or legacy codebooks for rank >r, where r=1, 2, 4, or 8, for example. In one example, the LC codebook is supported for up to a fixed rank, for example r=2. In one example, the rank of the LC codebook for CSI reporting is configured. For example r=2 is configured. In this case, the UE uses LC codebook for rank ≤r and uses legacy or Class A codebooks for rank >r for CSI reporting.

In sub-embodiment 0, the UE is configured with the LC codebook for rank 1 only, and legacy (up to LTE Rel. 13) codebook for higher ranks, for example, rank 2-8. There are two alternatives for the configured rank 1 LC codebook. In one example of Alt 0-0, the rank 1 LC codebook has non-orthogonal $W_1$ basis. For example, LTE Rel. 13 Class A rank 1-2 for Codebook-Config 2, 3, and 4. In another example of Alt 0-1, the rank 1 LC codebook has orthogonal $W_1$ basis. For example, LTE Rel. 13 Class A rank 7-8 Codebook-Config 2, 3, and 4.

In sub-embodiment 1, the UE is configured with the LC codebook for rank 1-2 only, and legacy (up to LTE Rel. 13) codebook for higher ranks, for example, rank 3-8. There are three alternatives for the configured rank 1-2 LC codebook. In one example of Alt 1-0, the rank 1-2 LC codebook has non-orthogonal $W_1$ basis. For example, LTE Rel. 13 Class A rank 1-2 for Codebook-Config 2, 3, and 4. In another example of Alt 1-1, the rank 1-2 LC codebook has orthogonal $W_1$ basis. For example, LTE Rel. 13 Class A rank 7-8 Codebook-Config 2, 3, and 4. In yet another example of Alt 1-2, the rank 1 LC codebook has non-orthogonal $W_1$ basis. For example, LTE Rel. 13 Class A rank 1-2 for Codebook-Config 2, 3, and 4. The rank 2 LC codebook has orthogonal $W_1$ basis. For example, LTE Rel. 13 Class A rank 7-8 Codebook-Config 2, 3, and 4.

In sub-embodiment 2, the UE is configured with the LC codebook for rank 1-4 only, and legacy (up to LTE Rel. 13) codebook for higher ranks, for example, rank 5-8. There are four alternatives for the configured rank 1-4 LC codebook. In one example of Alt 2-0, the rank 1-4 LC codebook has non-orthogonal $W_1$ basis. For example, LTE Rel. 13 Class A rank 1-4 for Codebook-Config 2, 3, and 4. In another example of Alt 2-1, the rank 1-4 LC codebook has orthogonal $W_1$ basis. For example, LTE Rel. 13 Class A rank 7-8 Codebook-Config 2, 3, and 4. In yet another example of Alt 2-2, the rank 1 LC codebook has non-orthogonal $W_1$ basis. For example, LTE Rel. 13 Class A rank 1-2 for Codebook-Config 2, 3, and 4. The rank 2-4 LC codebook has orthogonal $W_1$ basis. For example, LTE Rel. 13 Class A rank 7-8 Codebook-Config 2, 3, and 4. In yet another example of Alt 2-3, the rank 1-2 LC codebook has non-orthogonal $W_1$ basis. For example, LTE Rel. 13 Class A rank 1-2 for Codebook-Config 2, 3, and 4. the rank 3-4 LC codebook has orthogonal $W_1$ basis. For example, LTE Rel. 13 Class A rank 7-8 Codebook-Config 2, 3, and 4.

In sub-embodiment 3, the UE is configured with the LC codebook for all rank, for example, rank 1-8. There are four alternatives for the configured LC codebook. In one example of Alt 2-2, the rank 1 LC codebook has non-orthogonal $W_1$ basis. For example, LTE Rel. 13 Class A rank 1-2 for Codebook-Config 2, 3, and 4. The rank 2-8 LC codebook has orthogonal $W_1$ basis. For example, LTE Rel. 13 Class A rank 7-8 Codebook-Config 2, 3, and 4. In another example of Alt 2-3, the rank 1-2 LC codebook has non-orthogonal $W_1$ basis. For example, LTE Rel. 13 Class A rank 1-2 for Codebook-Config 2, 3, and 4. The rank 3-8 LC codebook has orthogonal $W_1$ basis. For example, LTE Rel. 13 Class A rank 7-8 Codebook-Config 2, 3, and 4.

In some embodiments, a UE is configured with one of non-orthogonal or orthogonal $W_1$ basis for LC codebook based on the LTE Rel. 13 Codebook-Config parameter. In one example, orthogonal basis is configured using Codebook-Config 1 and 4, and non-orthogonal basis is configured using Codebook-Config 2 and 3. In another example, orthogonal basis is configured using Codebook-Config 1 and 2, and non-orthogonal basis is configured using Codebook-Config 3 and 4.

In some embodiments, for 4/8/12/16/20/24/28/32 antenna ports as shown in FIG. 12 and FIG. 13, a UE is configured with the LC codebook depending on the RRC parameter LCCodebookEnabled. If LCCodebookEnabled is turned OFF, then the UE is configured with legacy (up to LTE Rel. 13 and their extensions in LTE Rel. 14) codebooks. If LCCodebookEnabled is turned ON, then the UE is configured with the proposed LC codebook.

In some embodiments, for 4/8 antenna ports with legacy (up to Rel. 12) port layouts as shown in FIG. 12, the Class A codebook parameters $(N_1, N_2)$, $(O_1, O_2)$, and Codebook-Config are defined as follows: 4 ports: $(N_1, N_2)=(2, 1)$, $(O_1, O_2)=(16,-)$, and Codebook-Config=4; and 8 ports: $(N_1, N_2)=(4, 1)$, $(O_1, O_2)=(8,-)$, and Codebook-Config=4.

In some embodiments, for 4/8/12/16/20/24/20/32 antenna ports, if LCCodebookEnabled is turned ON, then: for Codebook-Config=2, 3, 4, the proposed LC codebook is used to derive CSI report; and for Codebook-Config=1, there are two alternatives for the codebook to derive CSI report. In one example, legacy (up to LTE Rel. 13 and their extensions in LTE Rel. 14) codebooks. In another example, LC codebook with a new or LTE Rel. 13 $W_1$, for example, $W_1$ beam group can be LTE Rel. 13 Class A rank 7-8 $W_1$. If LCCodebookEnabled is turned OFF, then non-LC codebook such as legacy (up to LTE Rel. 13 and their extensions in LTE Rel. 14) is used.

In some embodiments, a UE is configured with the LC codebook with L=4 whose $W_1$ component is constructed using non-orthogonal master beam group (corresponding beam groups are shown in FIG. 23 and FIG. 24), which are configured using a higher-layer RRC parameter Codebook-Config. The resultant rank 1 and rank 2 $W_1$ codebook in this case is shown in Table 22.

TABLE 22

$W_1$ Codebook for 1-layer and 2-layer CSI reporting using antenna ports 15 to 14 + P

| Value of Codebook-Config | Configuration | | |
|---|---|---|---|
| 1 | $N_2 = 1$ | $i_{1,1}$ | $i_{1,2}$ |
| | | $0, 1, \ldots, \frac{N_1 O_1}{2} - 1$ | 0 |
| | | $x_{i_{1,1}, i_{1,2}}$ | |
| | | $x_{i_{1,1}, i_{1,2}} = \frac{1}{\sqrt{N_1 N_2}} [ v_{2i_{1,1}, 2i_{1,2}} \quad v_{2i_{1,1}+1, 2i_{1,2}} \quad v_{2i_{1,1}+6, 2i_{1,2}} \quad v_{2i_{1,1}+7, 2i_{1,2}} ]$ | |
| | $N_1 \geq N_2 > 1$ | $i_{1,1}$ | $i_{1,2}$ |
| | | $0, 1, \ldots, \frac{N_1 O_1}{2} - 1$ | $0, 1, \ldots, \frac{N_2 O_2}{2} - 1$ |

TABLE 22-continued

W₁ Codebook for 1-layer and 2-layer CSI reporting using antenna ports 15 to 14 + P

| | | $x_{i_{1,1},i_{1,2}}$ | |
|---|---|---|---|
| | | $x_{i_{1,1},i_{1,2}} = \frac{1}{\sqrt{N_1N_2}}[\, v_{2i_{1,1},2i_{1,2}+1} \quad v_{2i_{1,1}+1,2i_{1,2}+1} \quad v_{2i_{1,1}+2,2i_{1,2}} \quad v_{2i_{1,1}+3,2i_{1,2}} \,]$ | |
| | $N_1 < N_2$ | $i_{1,1}$ | $i_{1,2}$ |
| | | $0, 1, \ldots, \frac{N_1O_1}{2} - 1$ | $0, 1, \ldots, \frac{N_2O_2}{2} - 1$ |
| | | $x_{i_{1,1},i_{1,2}}$ | |
| | | $x_{i_{1,1},i_{1,2}} = \frac{1}{\sqrt{N_1N_2}}[\, v_{2i_{1,1}+1,2i_{1,2}} \quad v_{2i_{1,1}+1,2i_{1,2}+1} \quad v_{2i_{1,1},2i_{1,2}+2} \quad v_{2i_{1,1},2i_{1,2}+3} \,]$ | |
| 2 | $N_2 = 1$ | $i_{1,1}$ | $i_{1,2}$ |
| | | $0, 1, \ldots, \frac{N_1O_1}{2} - 1$ | $0$ |
| | | $x_{i_{1,1},i_{1,2}}$ | |
| | | $x_{i_{1,1},i_{1,2}} = \frac{1}{\sqrt{N_1N_2}}[\, v_{2i_{1,1},2i_{1,2}} \quad v_{2i_{1,1}+1,2i_{1,2}} \quad v_{2i_{1,1}+4,2i_{1,2}} \quad v_{2i_{1,1}+5,2i_{1,2}} \,]$ | |
| | $N_1 > 1, N_2 > 1$ | $i_{1,1}$ | $i_{1,2}$ |
| | | $0, 1, \ldots, \frac{N_1O_1}{2} - 1$ | $0, 1, \ldots, \frac{N_2O_2}{2} - 1$ |
| | | $x_{i_{1,1},i_{1,2}}$ | |
| | | $x_{i_{1,1},i_{1,2}} = \frac{1}{\sqrt{N_1N_2}}[\, v_{2i_{1,1},2i_{1,2}} \quad v_{2i_{1,1}+1,2i_{1,2}} \quad v_{2i_{1,1},2i_{1,2}+1} \quad v_{2i_{1,1}+1,2i_{1,2}+1} \,]$ | |
| 3 | $N_2 = 1$ | $i_{1,1}$ | $i_{1,2}$ |
| | | $0, 1, \ldots, \frac{N_1O_1}{2} - 1$ | $0$ |
| | | $x_{i_{1,1},i_{1,2}} = \frac{1}{\sqrt{N_1N_2}}[\, v_{2i_{1,1},2i_{1,2}} \quad v_{2i_{1,1}+3,2i_{1,2}} \quad v_{2i_{1,1}+5,2i_{1,2}} \quad v_{2i_{1,1}+7,2i_{1,2}} \,]$ | |
| | $N_1 \geq N_2 > 1$ | $i_{1,1}$ | $i_{1,2}$ |
| | | $0, 1, \ldots, \frac{N_1O_1}{2} - 1$ | $0, 1, \ldots, \frac{N_2O_2}{2} - 1$ |
| | | $x_{i_{1,1},i_{1,2}}$ | |
| | | $x_{i_{1,1},i_{1,2}} = \frac{1}{\sqrt{N_1N_2}}[\, v_{2i_{1,1},2i_{1,2}} \quad v_{2i_{1,1}+2,2i_{1,2}} \quad v_{2i_{1,1}+1,2i_{1,2}+1} \quad v_{2i_{1,1}+3,2i_{1,2}+1} \,]$ | |
| | $N_1 < N_2$ | $i_{1,1}$ | $i_{1,2}$ |
| | | $0, 1, \ldots, \frac{N_1O_1}{2} - 1$ | $0, 1, \ldots, \frac{N_2O_2}{2} - 1$ |
| | | $x_{i_{1,1},i_{1,2}}$ | |
| | | $x_{i_{1,1},i_{1,2}} = \frac{1}{\sqrt{N_1N_2}}[\, v_{2i_{1,1},2i_{1,2}} \quad v_{2i_{1,1},2i_{1,2}+2} \quad v_{2i_{1,1}+1,2i_{1,2}+1} \quad v_{2i_{1,1}+1,2i_{1,2}+3} \,]$ | |
| 4 | $N_2 = 1$ | $i_{1,1}$ | $i_{1,2}$ |
| | | $0, 1, \ldots, \frac{N_1O_1}{2} - 1$ | $0$ |

TABLE 22-continued

W$_1$ Codebook for 1-layer and 2-layer CSI reporting using antenna ports 15 to 14 + P

| | | $i_{1,1}$ | $i_{1,2}$ |
|---|---|---|---|
| $N_1 \geq N_2 > 1$ | $x_{i_{1,1},i_{1,2}} = \frac{1}{\sqrt{N_1 N_2}} [ v_{2i_{1,1},2i_{1,2}} \quad v_{2i_{1,1}+1,2i_{1,2}} \quad v_{2i_{1,1}+2,2i_{1,2}} \quad v_{2i_{1,1}+3,2i_{1,2}} ]$ | $0, 1, \ldots, \frac{N_1 O_1}{2} - 1$ | $0, 1, \ldots, \frac{N_2 O_2}{2} - 1$ |
| $N_1 < N_2$ | $x_{i_{1,1},i_{1,2}} = \frac{1}{\sqrt{N_1 N_2}} [ v_{2i_{1,1},2i_{1,2}} \quad v_{2i_{1,1}+1,2i_{1,2}} \quad v_{2i_{1,1}+2,2i_{1,2}} \quad v_{2i_{1,1}+3,2i_{1,2}} ]$ | $0, 1, \ldots, \frac{N_1 O_1}{2} - 1$ | $0, 1, \ldots, \frac{N_2 O_2}{2} - 1$ |
| | $x_{i_{1,1},i_{1,2}} = \frac{1}{\sqrt{N_1 N_2}} [ v_{2i_{1,1},2i_{1,2}} \quad v_{2i_{1,1},2i_{1,2}+1} \quad v_{2i_{1,1},2i_{1,2}+2} \quad v_{2i_{1,1},2i_{1,2}+3} ]$ | | |

In some embodiments, a UE is configured with the LC codebook with L=4 whose W$_1$ component is constructed using orthogonal master beam group (corresponding beam groups are shown in FIG. 25 and FIG. 26), which are configured using a higher-layer RRC parameter Codebook-Config. The resultant rank 1 and rank 2 W$_1$ codebook in this case is shown in Table 23.

TABLE 23

W$_1$ Codebook for 1-layer and 2-layer CSI reporting using antenna ports 15 to 14 + P

| Value of Codebook-Config | Configuration | $i_{1,1}$ | $i_{1,2}$ |
|---|---|---|---|
| | P = 4 | | |
| 1-4 | $N_2 = 1$ | $0, 1, \ldots, 4N_1$ | 0 |

$$x_{i_{1,1},i_{1,2}} = \frac{1}{\sqrt{N_1 N_2}} [ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} ]$$

| Value of Codebook-Config | Configuration | | |
|---|---|---|---|
| | P = 8 | | |
| 1-4 | $N_2 = 1$ | | |
| | $i_{1,1}$ | | $i_{1,2}$ |
| | $0, 1, \ldots, 4N_1$ | | 0 |

$$x_{i_{1,1},i_{1,2}} = \frac{1}{\sqrt{N_1 N_2}} [ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+2O_1, \frac{O_2}{4} i_{1,2}} \quad v_{\frac{O_1}{4} i_{1,1}+3O_1, \frac{O_2}{4} i_{1,2}} ]$$

TABLE 23-continued

W$_1$ Codebook for 1-layer and 2-layer CSI reporting using antenna ports 15 to 14 + P

| $N_1 = N_2$ | |
|---|---|
| $i_{1,1}$ | $i_{1,2}$ |
| 0, 1, ..., 4N$_1$ | 0, 1, ..., 4N$_2$ |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}} \quad v_{\frac{O_1}{4}i_{1,1}+O_1, \frac{O_2}{4}i_{1,2}+O_2} \quad v_{\frac{O_1}{4}i_{1,1}, \frac{O_2}{4}i_{1,2}+O_2} \right]$$

P = 12

| Value of Codebook-Config | Configuration |
|---|---|
| 1 | $N_2 = 1$ |

| $i_{1,1}$ | $i_{1,2}$ |
|---|---|
| 0, 1, ..., 4N$_1$ | 0 |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}} \quad v_{\frac{O_1}{4}i_{1,1}+3O_1, \frac{O_2}{4}i_{1,2}} \quad v_{\frac{O_1}{4}i_{1,1}+5O_1, \frac{O_2}{4}i_{1,2}} \right]$$

$N_1 \geq N_2 > 1$

| $i_{1,1}$ | $i_{1,2}$ |
|---|---|
| 0, 1, ..., 4N$_1$ | 0, 1, ..., 4N$_2$ |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}+O_2} \quad v_{\frac{O_1}{4}i_{1,1}+2O_1, \frac{O_2}{4}i_{1,2}} \quad v_{\frac{O_1}{4}i_{1,1}+3O_1, \frac{O_2}{4}i_{1,2}+O_2} \right]$$

$N_1 < N_2$

| $i_{1,1}$ | $i_{1,2}$ |
|---|---|
| 0, 1, ..., 4N$_1$ | 0, 1, ..., 4N$_2$ |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}+O_2} \quad v_{\frac{O_1}{4}i_{1,1}, \frac{O_2}{4}i_{1,2}+2O_2} \quad v_{\frac{O_1}{4}i_{1,1}+O_2, \frac{O_2}{4}i_{1,2}+3O_2} \right]$$

| 2 | $N_2 = 1$ |
|---|---|

| $i_{1,1}$ | $i_{1,2}$ |
|---|---|
| 0, 1, ..., 4N$_1$ | 0 |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}} \quad v_{\frac{O_1}{4}i_{1,1}+4O_1, \frac{O_2}{4}i_{1,2}} \quad v_{\frac{O_1}{4}i_{1,1}+5O_2, \frac{O_2}{4}i_{1,2}} \right]$$

$N_1 > 1, N_2 > 1$

| $i_{1,1}$ | $i_{1,2}$ |
|---|---|
| 0, 1, ..., 4N$_1$ | 0, 1, ..., 4N$_2$ |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+O_1, \frac{O_2}{4}i_{1,2}} \quad v_{\frac{O_1}{4}i_{1,1}+O_1, \frac{O_2}{4}i_{1,2}+O_2} \quad v_{\frac{O_1}{4}i_{1,1}, \frac{O_2}{4}i_{1,2}+O_2} \right]$$

| 3 | $N_2 = 1$ |
|---|---|

| $i_{1,1}$ | $i_{1,2}$ |
|---|---|
| 0, 1, ..., 4N$_1$ | 0 |

$$x_{i_{1,1},i_{1,2}} = \frac{1}{\sqrt{N_1 N_2}} \left[ v_{\frac{O_1}{4}i_{1,1}, \frac{O_2}{4}i_{1,2}} \quad v_{\frac{O_1}{4}i_{1,1}+2O_1, \frac{O_2}{4}i_{1,2}} \quad v_{\frac{O_1}{4}i_{1,1}+4O_1, \frac{O_2}{4}i_{1,2}} \quad v_{\frac{O_1}{4}i_{1,1}+5O_1, \frac{O_2}{4}i_{1,2}} \right]$$

TABLE 23-continued

W₁ Codebook for 1-layer and 2-layer CSI reporting using antenna ports 15 to 14 + P

| | |
|---|---|
| | $N_1 \geq N_2 > 1$ |
| | $i_{1,1}$      $i_{1,2}$ |
| | $0, 1, \ldots, 4N_1$      $0, 1, \ldots, 4N_2$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}} \quad v_{\frac{o_1}{4}i_{1,1}+2o_1,\frac{o_2}{4}i_{1,2}+o_2} \quad v_{\frac{o_1}{4}i_{1,1}+o_1,\frac{o_2}{4}i_{1,2}+o_2} \right]$ |
| | $N_1 < N_2$ |
| | $i_{1,1}$      $i_{1,2}$ |
| | $0, 1, \ldots, 4N_1$      $0, 1, \ldots, 4N_2$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}} \quad v_{\frac{o_1}{4}i_{1,1}+o_1,\frac{o_2}{4}i_{1,2}+2o_2} \quad v_{\frac{o_1}{4}i_{1,1}+o_1,\frac{o_2}{4}i_{1,2}+o_2} \right]$ |
| 4 | $N_2 = 1$ |
| | $i_{1,1}$      $i_{1,2}$ |
| | $0, 1, \ldots, 4N_1$      $0$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}} \quad v_{\frac{o_1}{4}i_{1,1}+2o_1,\frac{o_2}{4}i_{1,2}} \quad v_{\frac{o_1}{4}i_{1,1}+3o_1,\frac{o_2}{4}i_{1,2}} \right]$ |
| | $N_1 \geq N_2 > 1$ |
| | $i_{1,1}$      $i_{1,2}$ |
| | $0, 1, \ldots, 4N_1$      $0, 1, \ldots, 4N_2$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}} \quad v_{\frac{o_1}{4}i_{1,1}+2o_1,\frac{o_2}{4}i_{1,2}} \quad v_{\frac{o_1}{4}i_{1,1}+3o_1,\frac{o_2}{4}i_{1,2}} \right]$ |
| | $N_1 < N_2$ |
| | $i_{1,1}$      $i_{1,2}$ |
| | $0, 1, \ldots, 4N_1$      $0, 1, \ldots, 4N_2$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1},\frac{o_2}{4}i_{1,2}+o_2} \quad v_{\frac{o_1}{4}i_{1,1},\frac{o_2}{4}i_{1,2}+2o_2} \quad v_{\frac{o_1}{4}i_{1,1},\frac{o_2}{4}i_{1,2}+3o_2} \right]$ |

P = 16/20/24/28/32

| Value of Codebook-Config | Configuration |
|---|---|
| 1 | $N_2 = 1$ |
| | $i_{1,1}$      $i_{1,2}$ |
| | $0, 1, \ldots, 4N_1$      $0$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}} \quad v_{\frac{o_1}{4}i_{1,1}+6o_1,\frac{o_2}{4}i_{1,2}} \quad v_{\frac{o_1}{4}i_{1,1}+7o_1,\frac{o_2}{4}i_{1,2}} \right]$ |
| | $N_1 \geq N_2 > 1$ |
| | $i_{1,1}$      $i_{1,2}$ |
| | $0, 1, \ldots, 4N_1$      $0, 1, \ldots, 4N_2$ |
| | $x_{i_{1,1},i_{1,2}}$ |
| | $x_{i_{1,1},i_{1,2}} = \frac{1}{\sqrt{N_1 N_2}} \left[ v_{\frac{o_1}{4}i_{1,1},\frac{o_2}{4}i_{1,2}} \quad v_{\frac{o_1}{4}i_{1,1}+o_1,\frac{o_2}{4}i_{1,2}+o_2} \quad v_{\frac{o_1}{4}i_{1,1}+2o_1,\frac{o_2}{4}i_{1,2}} \quad v_{\frac{o_1}{4}i_{1,1}+3o_2,\frac{o_2}{4}i_{1,2}+o_2} \right]$ |

TABLE 23-continued

W$_1$ Codebook for 1-layer and 2-layer CSI reporting using antenna ports 15 to 14 + P

| | |
|---|---|
| | $N_1 < N_2$ |
| | $i_{1,1}$            $i_{1,2}$ <br> $0, 1, \ldots, 4N_1$      $0, 1, \ldots, 4N_2$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}+O_2} \quad v_{\frac{O_1}{4} i_{1,1}, \frac{O_2}{4} i_{1,2}+2O_2} \quad v_{\frac{O_1}{4} i_{1,1}+O_2, \frac{O_2}{4} i_{1,2}+3O_2} \right]$ |
| 2 | $N_2 = 1$ |
| | $i_{1,1}$            $i_{1,2}$ <br> $0, 1, \ldots, 4N_1$      $0$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+4O_1, \frac{O_2}{4} i_{1,2}} \quad v_{\frac{O_1}{4} i_{1,1}+5O_1, \frac{O_2}{4} i_{1,2}} \right]$ |
| | $N_1 > 1, N_2 > 1$ |
| | $i_{1,1}$            $i_{1,2}$ <br> $0, 1, \ldots, 4N_1$      $0, 1, \ldots, 4N_2$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+O_1, \frac{O_2}{4} i_{1,2}+O_2} \quad v_{\frac{O_1}{4} i_{1,1}, \frac{O_2}{4} i_{1,2}+O_2} \right]$ |
| 3 | $N_2 = 1$ |
| | $i_{1,1}$            $i_{1,2}$ <br> $0, 1, \ldots, 4N_1$      $0$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+2O_1, \frac{O_2}{4} i_{1,2}} \quad v_{\frac{O_1}{4} i_{1,1}+4O_1, \frac{O_2}{4} i_{1,2}} \quad v_{\frac{O_1}{4} i_{1,1}+6O_1, \frac{O_2}{4} i_{1,2}} \right]$ |
| | $N_1 \geq N_2 > 1$ |
| | $i_{1,1}$            $i_{1,2}$ <br> $0, 1, \ldots, 4N_1$      $0, 1, \ldots, 4N_2$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+2O_1, \frac{O_2}{4} i_{1,2}+O_2} \quad v_{\frac{O_1}{4} i_{1,1}+3O_1, \frac{O_2}{4} i_{1,2}+O_2} \right]$ |
| | $N_1 < N_2$ |
| | $i_{1,1}$            $i_{1,2}$ <br> $0, 1, \ldots, 4N_1$      $0, 1, \ldots, 4N_2$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}, \frac{O_2}{4} i_{1,2}+O_2} \quad v_{\frac{O_1}{4} i_{1,1}+O_1, \frac{O_2}{4} i_{1,2}+2O_2} \quad v_{\frac{O_1}{4} i_{1,1}+O_1, \frac{O_2}{4} i_{1,2}+3O_2} \right]$ |
| 4 | $N_2 = 1$ |
| | $i_{1,1}$            $i_{1,2}$ <br> $0, 1, \ldots, 4N_1$      $0$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+2O_1, \frac{O_2}{4} i_{1,2}} \quad v_{\frac{O_1}{4} i_{1,1}+3O_1, \frac{O_2}{4} i_{1,2}} \right]$ |
| | $N_1 \geq N_2 > 1$ |
| | $i_{1,1}$            $i_{1,1}$ <br> $0, 1, \ldots, 4N_1$      $0, 1, \ldots, 4N_1$ <br> $x_{i_{1,1}, i_{1,2}}$ |
| | $x_{i_{1,1}, i_{1,2}} = \frac{1}{\sqrt{N_1 N_2}} \left[ v_{\frac{O_1}{4} i_{1,1}, \frac{O_2}{4} i_{1,2}} \quad v_{\frac{O_1}{4} i_{1,1}+O_1, \frac{O_2}{4} i_{1,2}} \quad v_{\frac{O_1}{4} i_{1,1}+2O_1, \frac{O_2}{4} i_{1,2}} \quad v_{\frac{O_1}{4} i_{1,1}+3O_1, \frac{O_2}{4} i_{1,2}} \right]$ |

TABLE 23-continued $W_1$ Codebook for 1-layer and 2-layer CSI reporting using antenna ports 15 to 14 + P $N_1 < N_2$

| $i_{1,1}$ | $i_{1,2}$ |
|---|---|
| $0, 1, \ldots, 4N_1$ | $0, 1, \ldots, 4N_2$ |

$x_{i_{1,1},i_{1,2}}$ $$x_{i_{1,1},i_{1,2}} = \frac{1}{\sqrt{N_1 N_2}} \left[ v_{\frac{O_1}{4}i_{1,1},\frac{O_2}{4}i_{1,2}} \quad v_{\frac{O_1}{4}i_{1,1},\frac{O_2}{4}i_{1,2}+O_2} \quad v_{\frac{O_1}{4}i_{1,1},\frac{O_2}{4}i_{1,2}+2O_2} \quad v_{\frac{O_1}{4}i_{1,1},\frac{O_2}{4}i_{1,2}+3O_2} \right]$$

In some embodiments, a UE is configured with a dual-stage or double LC codebook: W=W1W2 which supports both non-orthogonal (e.g. LTE Rel. 13 or 14 Class A rank 1 W1 basis) and unrestricted or unconstrained orthogonal W1 basis (based on DFT basis). In one alternative of such a codebook, referred to as CB0, rank 1 is defined that the W1 codebook corresponds to the W1 codebook in LTE Rel. 13 (and an extension in LTE Rel. 14) Class A codebook for Codebook-Config 2, 3, and 4, and rank 2 is defined that the W1 codebook corresponds to unrestricted orthogonal W1.

In another alternative of such a codebook, referred to as CB1, Codebook-Config 2, 3, 4 is defined that W1 codebook corresponds to the W1 codebook in LTE Rel. 13 (and an extension in LTE Rel. 14) Class A codebook for both rank 1 and 2, and Codebook-Config 1 is defined that W1 codebook corresponds to unrestricted orthogonal W1 for both rank 1 and 2.

In some embodiments, a UE is configured with an LC codebook, CB 1, via higher layer RRC signaling of $N_1$, $N_2$, $O_1$, $O_2$, and Codebook-Config, whose W1 codebook is constructed based on a basis comprising of L' beams (shown as black squares) as shown to FIG. 31. The leading beam (0, 0) of the basis is indicated by $(i'_{1,1}, i_{1,2})$, where $i'_{1,1}$ = $0, 1, \ldots, O_1 N_1 / s_1$ and $i_{1,2}$=0 for 1D port layouts ($N_2$=1), and $i_{1,2}$=$0, 1, \ldots, O_2 N_2 / s_2$ for 2D port layouts.

Three alternatives for $(s_1, s_2)$ are $(1, 1)$, $(2, 2)$ and $$\left(\frac{O_1}{4}, \frac{O_2}{4}\right)$$

for 2D and $(1, -)$, $(2, -)$, and $$\left(\frac{O_1}{4}, -\right)$$

for 1D port layouts. So, the number of bits to report $i'_{1,1}$ and $i_{1,2}$ is $$B_1 = \left\lceil \log_2 \frac{O_1 N_1}{s_1} \right\rceil \text{ and}$$

$$B_2 = \left\lceil \log_2 \frac{O_2 N_2}{s_2} \right\rceil,$$

respectively. The value of L' depends on the Codebook-Config and antenna ports layouts.

If Codebook-Config=1, then the basis for W1 codebook is as follows. In one example of 1D port layouts with 4 ports, in this case $N_1$=2 and $N_2$=1, and the basis has L'=2 orthogonal beams as shown in FIG. 31. In one example of 1D port layouts with 8 ports, in this case $N_1$=4 and $N_2$=1, and the basis has L'=4 orthogonal beams as shown in FIG. 31. In one example of 1D port layouts with {16, 20, 24, 28, 32} ports, in this case $N_1 \geq 8$ and $N_2$=1, and the basis has L'=8 orthogonal beams as shown in FIG. 31.

In one example of 2D port layouts with 8 ports, in this case $N_1$=2 and $N_2$=2, and the basis has L'=4 orthogonal beams as shown in FIG. 31. In one example of 2D port layouts with 12 ports, in this case $(N_1, N_2)$=(3, 2) or (2, 3), and the basis has L'=6 orthogonal beams as shown in FIG. 31. In one example of 2D port layouts with {16, 20, 24, 28, 32} ports, in this case $(N_1, N_2)$ is such that $N_1 \times N_2 \geq 8$ and either $N_1 \geq N_2$ or $N_1 < N_2$, and the basis has L'=8 orthogonal beams as shown in FIG. 31.

If Codebook-Config=2 or 3, then the basis for W1 codebook is defined as 2D port layouts with {8, 16, 20, 24, 28, 32} ports. In this case $(N_1, N_2)$ is such that either $N_1 \geq N_2$ or $N_1 < N2$, and the basis has L'=4 non-orthogonal beams as shown in FIG. 31 (same as in LTE Rel. 13 Class A W1 codebook).

If Codebook-Config=4, then the basis for W1 codebook is as follows. In one example of 1D port layouts with {4, 8, 16, 20, 24, 28, 32} ports, in this case $(N_1, N_2)$ is such that either $N_1 \geq 2$ or $N_2$=1, and the basis has L'=4 non-orthogonal beams as shown in FIG. 31 (same as in LTE Rel. 13 Class A $W_1$ codebook). In another example of 2D port layouts with {8, 16, 20, 24, 28, 32} ports, in this case $(N_1, N_2)$ is such that either $N_1 \geq N_2$ or $N_1 < N_2$, and the basis has L'=4 non-orthogonal beams as shown in FIG. 31 (same as in LTE Rel. 13 Class A W1 codebook).

In some embodiments of beam selection, to construct LC pre-coder, L out of L' beams in the basis are selected, where L=2, 4. The value of L is either fixed in the specification (e.g. L=4) or the UE is configured with one of L=2 or 4 via 1-bit higher layer RRC parameter signaling. In one example of Codebook-Config=1, the beam selection is WB. In another example of Codebook-Config=2, 3, 4, the beam selection is either WB or per SB.

The number of bits for beam selection, B, is reported jointly with that to report $i'_{1,1}$ if reported WB and with that to report $i_2$ if reported per SB. In one alternative, B bits correspond to the least significant bits (LSB) of the joint report. In another alternative, B bits correspond to the most significant bits (MSB) of the joint report. Table 25 summarizes the number of bits for beam selection.

TABLE 25

Number of bits for beam selection from the basis

| Codebook-Config | Port layouts, Number of ports | Number of beams (L') | Number of bits (B) for L out of L' beam selection, $\left\lceil \log_2 \binom{L'}{L} \right\rceil$ | |
|---|---|---|---|---|
| | | | L = 2 | L = 4 |
| 1 | 1D, 4 ports | 2 | 1 | — |
| | 1D, 8 ports | 4 | 3 | 0 |
| | 1D, {16, 20, 24, 28, 32} ports | 8 | 5 | 7 |
| | 2D, 8 ports | 4 | 3 | 0 |
| | 2D, 12 ports | 6 | 4 | 4 |
| | 2D, {16, 20, 24, 28, 32} ports | 8 | 5 | 7 |
| 2 | 2D, {8, 16, 20, 24, 28, 32} ports | 4 | 3 | 0 |
| 3 | 2D, {8, 16, 20, 24, 28, 32} ports | 4 | 3 | 0 |
| 4 | 1D, {4, 8, 16, 20, 24, 28, 32} ports | 4 | 3 | 0 |
| | 2D, {8, 16, 20, 24, 28, 32} ports | 4 | 3 | 0 |

If Codebook-Config=2, 3, and 4, then the UE reports the first PMI pair $(i_{1,1}, i_{1,2})$ where $i_{1,1}=i'_{1,1}$ if beam selection is reported per SB in $i_2$, otherwise $i_{1,1}=0, 1, \ldots, 2^{B+B_1}-1$ if the beam selection is reported WB.

In some embodiments of Beam power, if Codebook-Config=1, then power (or amplitude) of L beams are also reported jointly in the first PMI $i_{1,1}$. Without loss of generality, we can assume that the power of the strongest of the L beams is 1. Let P be the number of bits to report beam powers. There are two options to report beam power. In one example of option 0, the leading beam (0, 0) (in FIG. 31) of the basis corresponds to the strongest beam, which is indicated by $(i'_{1,1}, i_{1,2})$. So, no additional indication of the strongest beam is needed. In another example of Option 1, $\log_2 L$ bits are used to indicate the strongest beam.

Let M bits are used to report beam power per beam. Then, P=(L−1)M for Alt 0 and P=(L−1)M+$\log_2$ L for Alt 1. The number of bits for beam power, P, is reported jointly with that to report $i'_{1,1}$. The UE reports the first PMI pair $(i_{1,1}, i_{1,2})$ where $i_{1,1}=0, 1, \ldots, 2^{P+B+B_1}-1$.

In one alternative, P bits correspond to the least significant bits (LSB) of the joint report. In another alternative, P bits correspond to the most significant bits (MSB) of the joint report.

It is assumed that for each beam, the same beam power is applied for the polarizations, i.e., $$\begin{bmatrix} 1 & 0 & \cdots & 0 & & & & \\ 0 & \sqrt{p_1} & \cdots & 0 & & & & \\ 0 & 0 & \ddots & 0 & & 0 & & \\ 0 & 0 & \cdots & \sqrt{p_{L-1}} & & & & \\ & & & & 1 & 0 & \cdots & 0 \\ & & & & 0 & \sqrt{p_1} & \cdots & 0 \\ & 0 & & & 0 & 0 & \ddots & 0 \\ & & & & 0 & 0 & \cdots & \sqrt{p_{L-1}} \end{bmatrix}$$

$$\begin{bmatrix} b_0, b_1, \ldots b_{L-1} & 0\ 0\ \ldots\ 0 \\ 0\ 0\ \ldots\ 0 & b_0, b_1, \ldots b_{L-1} \end{bmatrix}$$

In some embodiments of Number of bits to report $(i_{1,1}, i_{1,2})$, the number of bits to report the first PMI pair $(i_{1,1}, i_{1,2})$ are summarized in Table 26 for $$(s_1, s_2) = \left(\frac{O_1}{4}, \frac{O_2}{4}\right),$$

M=2, $(N_1, N_2)$=(4, 4) and Option 0 to report beam power. Note that for Option 1 to report beam power, $\log_2$ L additional bits are reported. Note also that the number of bits to report the first PMI pair can fit into the PUCCH Format 3 based periodic CSI reporting.

TABLE 26

Number of bits for the first PMI pair $(i_{1,1}, i_{1,2})$ reporting

| Codebook-Config | Number of beams (L') in the basis | $(B_1, B_2)$ | L = 2 beams | | | L = 4 beams | | |
|---|---|---|---|---|---|---|---|---|
| | | | B | P | Total # bits | B | P | Total # bits |
| 1 | 8 | (2, 4) | 5 | 2 | 13 | 7 | 6 | 19 |
| 2, 3, 4 | 4 | (4, 4) | 0 | 0 | 8 | 0 | 0 | 14 |

In some embodiments, a UE is configured with an LC codebook, CB1, which supports fewer Codebook-Config values. For instance, the supported Codebook-Config values are according to one of the following combinations. In one example of 2 Codebook-Config values, combination 0 is defined as Codebook-Config=1 (unrestricted W1) and Codebook-Config=2 (LTE Rel. 13 Class A rank 1 W1); combination 1 is defined as Codebook-Config=1 (unrestricted W1) and Codebook-Config=3 (LTE Rel. 13 Class A rank 1 W1); and combination 2 is defined as Codebook-Config=1 (unrestricted W1) and Codebook-Config=4 (LTE Rel. 13 Class A rank 1 W1). In another example of 3 Codebook-Config values, combination 3 is defined as Codebook-Config=1 (unrestricted W1) and Codebook-Config=2 and 3 (LTE Rel. 13 Class A rank 1 W1); combination 4 is defined as Codebook-Config=1 (unrestricted W1) and Codebook-Config=2 and 4 (LTE Rel. 13 Class A rank 1 W1); and combination 5 is defined as Codebook-Config=1 (unrestricted W1) and Codebook-Config=3 and 4 (LTE Rel. 13 Class A rank 1 W1). In yet another example of 4 Codebook-Config values, combination 6 is defined as Codebook-Config=1 (unrestricted W1) and Codebook-Config=2, 3, and 4 (LTE Rel. 13 Class A rank 1 W1). Only one of these Combination 0-6 will be supported and specified in the specification.

In some embodiments, a UE is configured with an LC codebook, CB2, which is the exactly the same as CB1, except that the basis for Codebook-Config=1 is the full orthogonal DFT basis comprising of $N_1 \times N_2$ orthogonal beams. The basis for different antenna port layouts are illustrated in FIG. 32. Note that when compared with CB 1 in previous embodiments, CB2 requires more number of bits (B) for L out of L' beam selection.

In some embodiments, the $W_2$ codebook in the above-mentioned LC codebooks, CB0, CB1, and CB2 are according to one of the following alternatives: for both rank 1 and 2, the W2 codebook (for LC coefficients) is the same for the two types of W1, orthogonal W1 for Codebook-Config 1, and non-orthogonal W1 for Codebook-Config 2, 3, and 4; for rank 1, the W2 codebook is the same for the two types of W1, and for rank 2, it is different; for rank 2, the W2 codebook is the same for the two types of W1, and for rank 1, it is different; and for both rank 1 and 2, the W2 codebook is different for the two types of W1. In these W2 codebook alternatives, the W2 codebook is according to some embodiment of the present disclosure.

In some embodiments, a UE is configured with a dual-stage or double LC codebook: W=W1W2 which supports both non-orthogonal (LTE Rel. 13 or 14 Class A rank 1 W1 basis) and orthogonal W1 basis (LTE Rel. 13 or 14 Class A rank 3/5/7 W1 basis). In one alternative of such a codebook, referred to as CB3, rank 1 is defined that the W1 codebook corresponds to the rank 1 W1 codebook in LTE Rel. 13 (and an extension in LTE Rel. 14) Class A codebook for Codebook-Config 2, 3, and 4, and rank 2 is determined that the W1 codebook corresponds to rank >2 W1 codebook in LTE Rel. 13 (and an extension in LTE Rel. 14) Class A codebook for Codebook-Config 2, 3, and 4. In one sub-alternative (CB3-0), the rank 2 W1 LC codebook corresponds to LTE Rel. 13 (or 14) rank 3 Class A W1 codebook. In another sub-alternative (CB3-1), the rank 2 W1 LC codebook corresponds to LTE Rel. 13 (or 14) rank 5 Class A W1 codebook. In another sub-alternative (CB3-2), the rank 2 W1 LC codebook corresponds to LTE Rel. 13 (or 14) rank 7 Class A W1 codebook.

In another alternative of such a codebook, referred to as CB4, Codebook-Config 2, 3, 4 is defined that W1 codebook corresponds to the W1 codebook in LTE Rel. 13 (and an extension in LTE Rel. 14) Class A codebook for both rank 1 and 2, and Codebook-Config 1 is defined that W1 codebook corresponds to rank >2 W1 codebook in LTE Rel. 13 (and an extension in LTE Rel. 14) Class A codebook for both rank 1 and 2. In one sub-alternative (CB4-0), the rank 1 and rank 2 W1 LC codebook corresponds to LTE Rel. 13 (or 14) rank 3 Class A W codebook. In another sub-alternative (CB4-1), the rank 1 and rank 2 $W_1$ LC codebook corresponds to LTE Rel. 13 (or 14) rank 5 Class A $W_1$ codebook. In another sub-alternative (CB4-2), the rank 1 and rank 2 W1 LC codebook corresponds to LTE Rel. 13 (or 14) rank 7 Class A W1 codebook.

For Codebook-Config=1, i.e., codebooks CB4-0, CB4-1, and CB4-2, there are four possible rank 3/5/7 Class A W1 codebooks (for four LTE Rel. 13 Class A Codebook-Config values). It may be proposed to select two of them depending on antenna port layouts if Codebook-Config=1 is configured for LC codebook. In one example of 1D antenna port layouts, the Class A W1 codebook in codebooks CB4-0, CB4-1, and CB4-2 corresponds to Codebook-Config=4). In another example of 2D antenna port layouts: the Class A W1 codebook in codebooks CB4-0, CB4-1, and CB4-2 corresponds to Codebook-Config=2).

Figure 27:
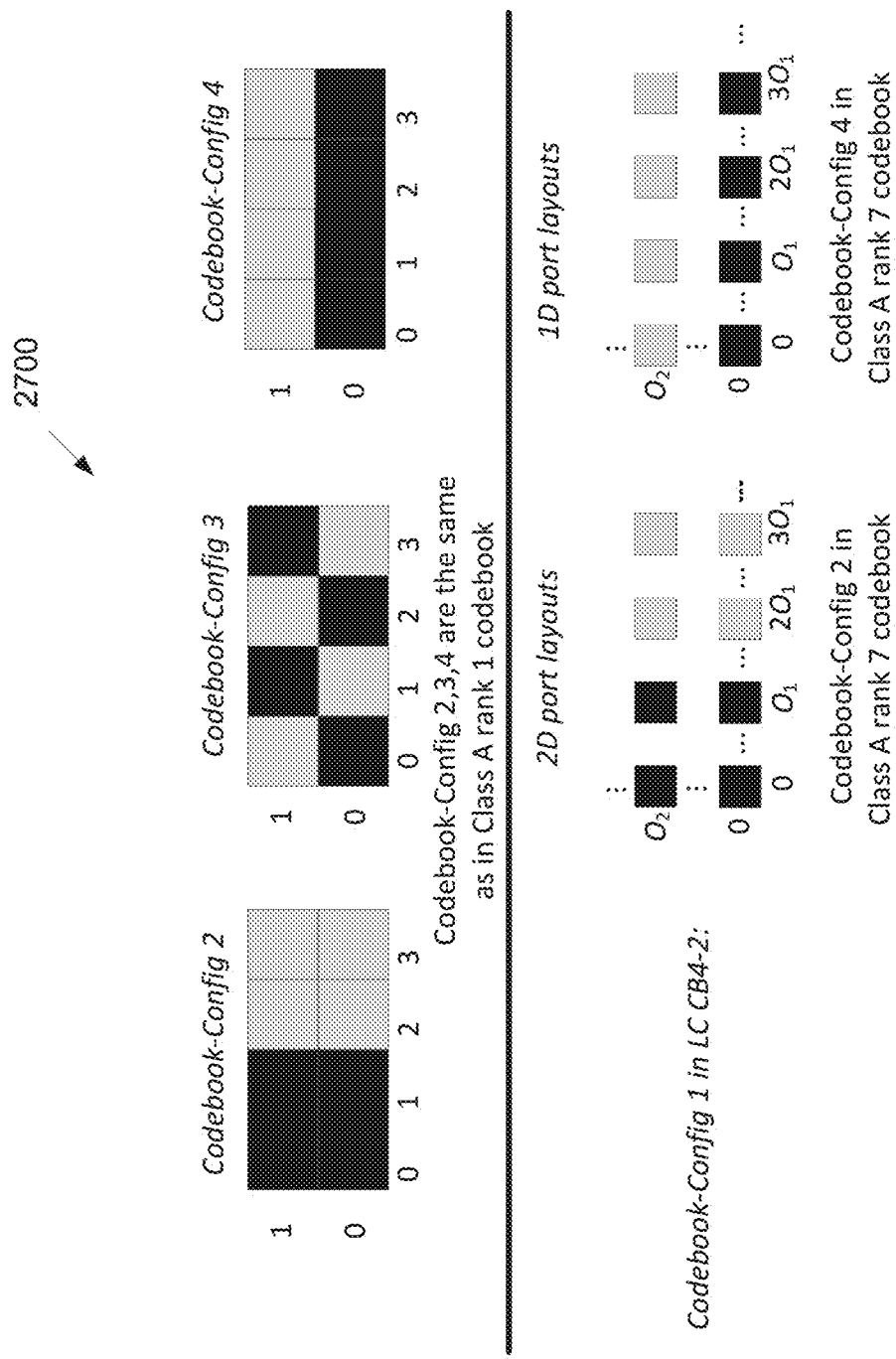
FIG. 27 illustrates an example LC codebook CB4-2 according to embodiments of the present disclosure.

FIG. 27 illustrates an example LC codebook CB4-2 2700 according to embodiments of the present disclosure. An embodiment of the LC codebook CB4-2 2700 shown in FIG. 27 is for illustration only. One or more of the components illustrated in FIG. 27 can be implemented in specialized circuitry configured to perform the noted functions or one or more of the components can be implemented by one or more processors executing instructions to perform the noted functions. Other embodiments are used without departing from the scope of the present disclosure.

An illustration of this proposal for CB4-2 is shown in FIG. 27. As shown, if Codebook-Config 1 is configured for LC codebook CB4-2, then for 1D port layouts, 4 orthogonal beams (shown as black squares) form a line and correspond to Codebook-Config 4 in LTE Rel. 13 rank 7 Class A codebook, and for 2D port layouts, 4 orthogonal beams (shown as black squares) form a square and correspond to Codebook-Config 2 in LTE Rel. 13 rank 7 Class A codebook.

The $W_1$ and $W_2$ codebook details for LC codebook CB4-2 are as follows. In one embodiment of Codebook-Config=1, $W_1$ codebook comprises of the following components: fixed orthogonal basis as in LTE Rel. 13 Class A rank 7 $W_1$ codebook for Codebook-Config=2 (2D port layouts) and 4 (1D port layouts); L={2, 4} beams which are selected WB from the selected orthogonal basis; and strongest beam index. In such instance, there are two alternatives for the strongest beam indication; the beam at (0, 0) is the strongest beam, so no indication is needed; and the index of the strongest beam in the reported orthogonal basis is indicated, which requires $\log_2 4=2$ bits indication. If L=2, then index of remaining 1 out of 3 beam, which requires $\log_2(_1^3)=2$ bits. In such instance of beam power levels for L−1 beams, assuming 2 bits per beam, the index of the beam requires 2(L−1) bits. Note that the strongest beam power is 1. An example of 2-bit beam power codebook is $\{1, \sqrt{0.5}, \sqrt{0.25}, \sqrt{0.125}\}$. Another example of 2-bit beam power codebook is $\{1, \sqrt{0.5}, \sqrt{0.25}, 0\}$.

$W_2$ codebook comprises of LC coefficient vectors $c^{(r)}=[1 \ c_1^{(r)} \ldots c_{L-1}^{(r)} \ \phi_0^{(r)} \ \phi_1^{(r)} c_1^{(r)} \ldots \phi_{L-1}^{(r)} c_{L-1}^{(r)}]^T$ where r=0,R−1 are for R layers, $[\phi_0^{(r)} \ \phi_1^{(r)} \ldots \phi_{L-1}^{(r)}]^T$ are L co-phase values for layer r, $[1 \ c_1^{(r)} \ldots c_{L-1}^{(r)}]^T$ are L coefficients for layer r, and both $\phi_l^{(r)}$ and $c_l^{(r)}$ belong to QPSK alphabet for each r and l. The detailed proposal about $W_2$ codebook is provided later in the present disclosure.

In another embodiment of Codebook-Config=2, 3, 4, $W_1$ codebook comprises of non-orthogonal basis as in LTE Rel. 13 Class A rank 1 $W_1$ codebook for Codebook-Config=2, 3, 4; and $W_2$ codebook comprises of the following components: L={2, 4} beams which are selected SB (if L=2); and LC coefficient vectors $c^{(r)}$ are as explained for Codebook-Config=1.

The $W_1$ beam group can then be expressed as $$W = \begin{bmatrix} B \cdot P & 0 \\ 0 & B \cdot P \end{bmatrix},$$

where $B = [b_{k_{1,0},k_{2,0}} b_{k_{1,1},k_{2,1}} \ldots b_{k_{1,L-1},k_{2,L-1}}]$ whose columns correspond to L $W_1$ beams; and $$P = \begin{bmatrix} 1 & 0 & 0 & 0 \\ 0 & p_1 & 0 & 0 \\ 0 & 0 & \ddots & 0 \\ 0 & 0 & 0 & p_{L-1} \end{bmatrix}$$

if Codebook-Config=1, then $p_i$ corresponds to the squared-root of beam power; otherwise P is an identity matrix.

The spacing between leading beams of two adjacent beam groups, denoted as $(s_1, s_2)$, determines the number of bits needed to indicate a beam group using the first PMI pair $$(i_{1,1}, i_{1,2}): i_{1,1} = 0, 1, \ldots \frac{N_1 O_1}{s_1} - 1 \text{ and}$$

-continued $$i_{1,2} = 0, 1, \ldots \frac{N_2 O_2}{s_2} - 1$$

indicate a $W_1$ beam group.

Since the oversampling factor $(O_1, O_2)$ can take a value from $\{(4, 4), (8, 4), (8, 8), (4, -), (8, -)\}$ depending on the antenna port layouts, for simplicity, we propose to set $(s_1, s_2)=(O_1/4, O_2/4)$ for 2D port layouts and $(O_1/4, -)$ for 1D port layouts, regardless of the number of antenna ports and Codebook-Config parameter value. Note that this choice of $(s_1, s_2)$ parameter ensures that the effective oversampling across the leading beams of the beam groups is 4. Also, the overhead associated with the beam group selection does not change across antenna port layouts. For Codebook-Config 1-4, all WB $W_1$ codebook components are reported jointly as the first PMI pair $(i_{1,1}, i_{1,2})$ and all SB $W_2$ codebook components are reported jointly as the second PMI $i_2$.

If $c_l^{(r)}$ and $\phi_l^{(r)}$ belong to QPSK alphabet $\{1, -1, j, -j\}$, then the number of bits to report rank-2 LC coefficients (i.e. $2^{nd}$ PMI reporting overhead associated with $W_2$ codebook) is $\log_2 4^{2(2L-1)} = 4(2L-1)$. This implies that the $2^{nd}$ PMI reporting overhead is doubled when compared with that for rank-1. This increase in PMI reporting overhead is an issue if $2^{nd}$ PMI has to be reported periodically using PUCCH because the limited number of CSI bits that can be reported using PUCCH. For example, if L=4, then the number of bits to report rank 1 and rank 2 $2^{nd}$ PMIs are respectively 14 and 28 bits. While 14 bits rank 1 $2^{nd}$ PMI can be reported, for example, using PUCCH Format 3, 28 bits rank 2 $2^{nd}$ PMI can't. It is therefore desired to design higher rank LC codebooks (e.g. rank 2) with PMI reporting overhead comparable to that for rank 1 and keeping periodic CSI reporting on PUCCH in mind. To reduce $2^{nd}$ PMI reporting overhead for rank 2 LC codebook, we can exploit the structure in the coefficient vector (because of decoupling of co-phase and coefficients): $c^{(r)} = [1 \ c_1^{(r)} \ \ldots \ c_{L-1}^{(r)} \ \phi_0^{(r)} \ \phi_1^{(r)} c_1^{(r)} \ \ldots \ \phi_{L-1}^{(r)} c_{L-1}^{(r)}]^T$.

Two alternatives (CB0 and CB1) for rank 2 LC $W_2$ codebook are proposed in Table 28. For comparison, the alternative (CB2) in which co-phase and coefficients of two layers are treated independently is also shown in the table. Note that the number of bits for rank 1 LC codebook assuming QPSK alphabet for co-phase and coefficients are 6+3 and 14 for L=2 and 4, respectively. We can observe that the proposed CB0 and CB1 maintained the $W_2$ reporting payload to be the same as rank 1. The payload doubles for CB2.

TABLE 28

Rank 2 LC codebook alternatives and W2 reporting payload

| | CB0 | CB1 | CB2 |
|---|---|---|---|
| Co-phase $[\phi_l^{(0)} \ \phi_l^{(1)}]$ ($2^{nd}$ antenna polarization) | $[\phi_l^{(0)} \ \phi_l^{(1)}] \in \{[1\ -1], [j\ -j], [-1\ 1], [-j\ j]\}$ | | $\phi_l^{(0)}, \phi_l^{(1)} \in \{1, j, -1, -j\}$ |
| Coefficient $[c_l^{(0)} \ c_l^{(1)}]$ | $c_l^{(0)} = c_l^{(1)} \in \{1, j, -1, -j\}$ | $[c_l^{(0)} \ c_l^{(1)}] \in \{[1\ -1], [j\ -j], [-1\ 1], [-j\ j]\}$ | $c_l^{(0)}, c_l^{(1)} \in \{1, j, -1, -j\}$ |
| Co-phase (bits) | | 2L | — |
| Coefficient (bits) | 2(L − 1) | 2(L − 1) | 8L − 4 |
| Total (bits) | 4L − 2 | 4L − 2 | 8L − 4 |
| L = 2 (bits) | 6 + 3 | 6 + 3 | 12 + 3 |
| L = 4 (bits) | 14 | 14 | 28 |

The $W_1$ and $W_2$ reporting payloads for the proposed rank 2 LC codebook (CB0 and CB 1) is shown in Table 29, where we assume that $N_1=N_2=O_1=O_2=4$. In this table, the overhead of L=2 out of 4 beams (6 such selection possibilities) is taken into consideration.

TABLE 29

W1 and W2 reporting payload

| Config 1 | | | Config 2, 3, 4 | | |
|---|---|---|---|---|---|
| L | $W_1$ (bits) | $W_2$ (bits) | L | $W_1$ (bits) | $W_2$ (bits) |
| 2 | 12 | 6 | 2 | 8 | 9 |
| 4 | 8 | 10 | 4 | 8 | 14 |

In the following embodiments and elsewhere in disclosure, the co-phase refers to the weighting applied to one (e.g. −45) of the two antenna polarizations (+45 and −45). The weighting at the other polarization (e.g. +45) is always 1.

In an alternative embodiment, if the UE is configured with an extension of LC codebook CB4-2 (Codebook-Config 1 corresponds to Class A rank 7 W1 and Codebook-Config 2,3,4 corresponds to Class A rank 1 W1) in which for L=2 and Codebook-Config=2, 3, or 4, the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase $\{1, j, -1, -j\}$ selection, and rank 2 corresponds to 1 out of 4 beam selection and 1 out of 2 co-phase pair $\{(1, -1), (j, -j)\}$ selection; and two beam selection based on W2 codebook in LC codebook CB4-2 for L=2.

In another alternative embodiment, if the UE is configured with an extension of LC codebook CB4-2 (Codebook-Config 1 corresponds to Class A rank 7 W1 and Codebook-Config 2,3,4 corresponds to Class A rank 1 W1) in which for L=4 and Codebook-Config=2, 3, or 4, the W2 codebook comprises of (hence is a union of two W2 codebooks) both single beam selection based on legacy W2 (LTE Rel. 13

Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and four beam selection based on W2 codebook in LC codebook CB4-2 for L=4.

In another alternative embodiment, if the UE is configured with an extension of LC codebook CB2 (Codebook-Config 1 corresponds to unrestricted orthogonal W1 and Codebook-Config 2,3,4 corresponds to Class A rank 1 W1) in which for L=2 and Codebook-Config=2, 3, or 4, the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and two beam selection based on W2 codebook in LC codebook CB2 for L=2.

In another alternative embodiment, if the UE is configured with an extension of LC codebook CB2 (Codebook-Config 1 corresponds to unrestricted orthogonal W1 and Codebook-Config 2,3,4 corresponds to Class A rank 1 W1) in which for L=4 and Codebook-Config=2, 3, or 4, the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and four beam selection based on W2 codebook in LC codebook CB2 for L=4.

In another alternative embodiment, if the UE is configured with an LC codebook which for rank 1 corresponds to the rank 1 LC codebook CB2 (Codebook-Config 1 corresponds to unrestricted orthogonal basis), and rank 2 corresponds to the rank 2 LC codebook CB4-2 (Codebook-Config 1 corresponds to Class A rank 7 orthogonal basis). Note that the rank 1 and rank 2 LC codebooks for Codebook-Config 2, 3, 4 are the same in both CB2 and CB4-2.

In one extension, if the UE is configured with L=2 and Codebook-Config=2, 3, or 4, then the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and two beam selection based on W2 codebook in LC codebook CB2 or CB4-2 for L=2.

In another extension, if the UE is configured with L=4 and Codebook-Config=2, 3, or 4, then the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and four beam selection based on W2 codebook in LC codebook CB2 or CB4-2 for L=4.

In yet another extension, if the UE is configured with L=2 or 4 and Codebook-Config=2, 3, or 4, then the W2 codebook comprises of (hence is a union of two W2 codebooks) both single beam selection based on legacy W2 (LTE Rel. 13 Class A codebook), which for rank 1 corresponds to 1 out of 4 beam selection and 1 out of 4 co-phase {1, j, −1, −j} selection, and rank 2 corresponds to 1 out of 4 beam selection and 1 out of 2 co-phase pair {(1, −1), (j, −j)} selection; and two or four beam selection based on W2 codebook in LC codebook CB2 or CB4-2 for L=2 or 4.

In another embodiment, the union of legacy (LTE Rel. 13 or 14 Class A) and LC W2 codebooks is always supported for one (e.g. L=2) or all L values (e.g. L=2, 4) and for Codebook-Config 2,3,4, and the UE reports one of the two types of W2 (or $2^{nd}$ PMI $i_2$) in the CSI report.

In yet another embodiment, whether to use legacy (LTE Rel. 13 or 14 Class A) W2 or LC codebook W2 or their union is configurable via higher-layer RRC signaling and the UE reports one of the three types of W2 ($2^{nd}$ PMI $i_2$) in the CSI report depending on the configuration.

In yet another embodiment, the UE reports both the W2 codebook (legacy or LC codebook) and the corresponding $2^{nd}$ PMI in the CSI report.

Figure 28:
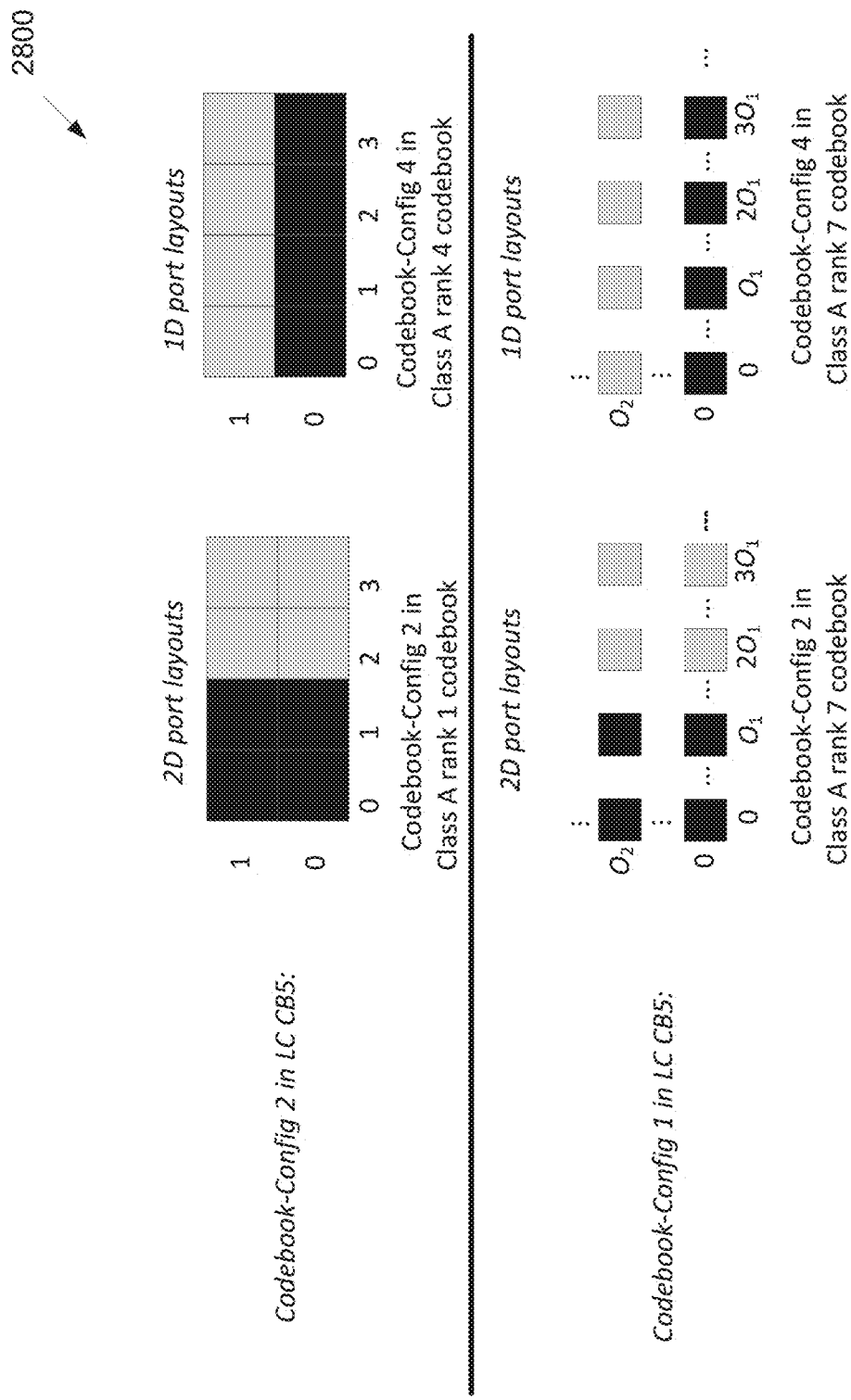
FIG. 28 illustrates an example LC codebook CB5 according to embodiments of the present disclosure.

FIG. 28 illustrates an example LC codebook CB5 2800 according to embodiments of the present disclosure. An embodiment of the LC codebook CB5 2800 shown in FIG. 28 is for illustration only. One or more of the components illustrated in FIG. 28 can be implemented in specialized circuitry configured to perform the noted functions or one or more of the components can be implemented by one or more processors executing instructions to perform the noted functions. Other embodiments are used without departing from the scope of the present disclosure.

In some embodiments, a UE is configured with a dual-stage or double LC codebook: W=W1W2, referred to as CB5 as shown in FIG. 28, using RRC parameter Codebook-Config, where for Codebook-Config 1, W1 codebook corresponds orthogonal W1 codebook based on Rel-13 Class A rank 7 codebook for both rank 1 and 2 LC codebook, where orthogonal basis has 4 fixed beams, which for 1D port layouts correspond to Class A rank 7 for Codebook-Config 4, i.e. (4,1) orthogonal, and 2D port layouts correspond to Class A rank 7 for Codebook-Config 2, i.e. (2,2) orthogonal; non-equal WB beam power using 2-bit per beam is used to combine 4 beams; and L out of 4 beams are selected WB.

In some embodiments, a UE is configured with a dual-stage or double LC codebook: W=W1W2, referred to as CB5 as shown in FIG. 28, using RRC parameter Codebook-Config, where for Codebook-Config 2, W1 codebook corresponds non-orthogonal W1 codebook based on Rel-13 Class A rank 1 codebook for both rank 1 and 2 LC codebook, where non-orthogonal basis has 4 fixed beams, which for 1D port layouts correspond to Class A rank 1 for Codebook-Config 4, i.e. (4,1) non-orthogonal, and 2D port layouts correspond to Class A rank 1 for Codebook-Config 2, i.e. (2,2) non-orthogonal; equal gain combining (so, WB beam power indication is needed); and L out of 4 beams selected SB.

The W2 codebook is common to both Codebook-Configs and is according to some embodiments of disclosure. Also, there are two alternatives for L: UE recommends a preferred L value; and L is configured via higher layer RRC signaling.

In some embodiments, a UE is configured with a dual-stage or double LC codebook: W=W1W2, referred to as CB6, using RRC parameter Codebook-Config, where for rank 1, LC codebook CB2 proposed earlier in the present disclosure is used; and for rank 2, LC codebook CB5 proposed earlier in the present disclosure is used.

In some embodiments, a UE is configured with a dual-stage or double LC codebook: W=W1W2, referred to as CB6, using RRC parameter Codebook-Config, where for rank 1, LC codebook CB5 proposed earlier in the present disclosure is used; and for rank 2, LC codebook CB2 proposed earlier in the present disclosure is used.

In some embodiments, a UE is configured with the LC codebook for advanced CSI reporting using an RRC parameter advancedCodebookEnabled such that the RI reporting is according to one of the following alternatives. In one example of RI=0 bit (no RI reporting), if UE is configured with advanced CSI reporting (i.e., advancedCodebookEnabled is turned ON), then there is no RI reporting, which the reported CSI corresponds to rank 1 LC codebook proposed in disclosure (e.g. CB0-CB6), regardless of how many layers UE can support. In this case, the dynamic SU/MU switching is restricted to 1 layers. In another example of RI=1 bit: if UE is configured with advanced CSI reporting (i.e., advancedCodebookEnabled is turned ON), then RI reporting is always 1 bit, regardless of how many layers UE can support. In this case, the dynamic SU/MU switching is restricted to 2 layers. The reported RI corresponds to one of the following sub-alternatives: rank 1 and 2 LC codebooks proposed in disclosure (e.g. CB0-CB6); and rank 1 is LC codebook proposed in disclosure (e.g. CB0-CB6), and rank 2 is LTE Rel. 13 (and 14) Class A codebook. In yet another example of RI=2 bits, if UE is configured with advanced CSI reporting (i.e., advancedCodebookEnabled is turned ON), then RI reporting is always 2 bit, regardless of how many layers UE can support. In this case, the dynamic SU/MU switching is restricted to 4 layers. The reported RI corresponds to one of the following sub-alternatives: rank 1-4 LC codebooks where rank 1-2 are as proposed in disclosure (e.g. CB0-CB6); rank 1-2 is LC codebook proposed in disclosure (e.g. CB0-CB6), and rank 3-4 is LTE Rel. 13 (and 14) Class A codebook; and rank 1 is LC codebook proposed in disclosure (e.g. CB0-CB6), and rank 2-4 is LTE Rel. 13 (and 14) Class A codebook. In yet another example of RI=3 bits, if UE is configured with advanced CSI reporting (i.e., advancedCodebookEnabled is turned ON), then RI reporting is always 3 bit, regardless of how many layers UE can support. In this case, the dynamic SU/MU switching is restricted to 8 layers. The reported RI corresponds to one of the following sub-alternatives: rank 1-4 LC codebooks where rank 1-2 are as proposed in disclosure (e.g. CB0-CB6), and rank 3-8 is LTE Rel. 13 (and 14) Class A codebook; rank 1-2 is LC codebook proposed in disclosure (e.g. CB0-CB6), and rank 3-8 is LTE Rel. 13 (and 14) Class A codebook; and rank 1 is LC codebook proposed in disclosure (e.g. CB0-CB6), and rank 2-8 is LTE Rel. 13 (and 14) Class A codebook.

In some embodiments, a UE is configured with an LC codebook W=W1W2 with L=2 beams for both rank 1 and rank 2, where W1 and W2 codebooks are used to report WB and SB components of the PMI, respectively. The W1 codebook comprises of the following components. In one example, uniformly spaced orthogonal beam groups of size $(L_1, L_2)$ that are constructed as follows: for $N_1N_2 \leq 8$, orthogonal beam group correspond to the full $N_1 \times N_2$ orthogonal DFT basis, i.e. $(L_1, L_2)=(N_1, N_2)$; and for $N_1N_2>8$, a group of 8 uniformly spaced orthogonal beams are selected which corresponds to either $(L_1, L_2)=(4,2)$ if 2D antenna port layouts with $N_1 \geq N_2$ and $N_2 \neq 1$; $(L_1, L_2)=(2, 4)$ if 2D antenna port layouts with $N_1 < N_2$ and $N_2 \neq 1$; or $(L_1, L_2)=(8,1)$ if 1D antenna port layouts with $N_2=1$. In another example of beam selection, L=2 beams are selected from $L_1L_2$ beams in the selected orthogonal beam group. In yet another example of beam power, L=2 selected beams are associated with beam power level using a 2-bit beam power codebook. Note that the power level of the stronger beam (beam with larger power) can be assumed to be 1 without loss of generality. So, the power level of the $2^{nd}$ beam (beam with lower or equal power level than the $1^{st}$ beam) need to be selected from the beam power codebook.

The illustration of orthogonal beams in the proposed codebook is the same as shown in FIG. 31 for Codebook-Config 1. The W2 codebook comprising of the following components: L=2 beams are combined using QPSK={1, j, −1, −j} phase codebook; and in case of rank 2, the phase to combine two beams are selected independently for the two layers.

Mathematically, the structure of the proposed LC codebook is as follows $$W_1 = \begin{bmatrix} B & 0 \\ 0 & B \end{bmatrix},$$

$$B = \left[ p_0 b_{k_1^{(0)}, k_2^{(0)}}, p_1 b_{k_1^{(1)}, k_2^{(1)}} \right],$$

where for rank 1:

$$W = \begin{bmatrix} \tilde{w}_{0,0} \\ \tilde{w}_{1,1} \end{bmatrix} = W_1 W_2, \text{ and } W_2 = \begin{bmatrix} c_{0,0} \\ c_{1,0} \end{bmatrix},$$

for rank 2:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2, \text{ and}$$

$$W_2 = \begin{bmatrix} c_{0,0} & c_{0,1} \\ c_{1,0} & c_{1,1} \end{bmatrix}, c_{r,l} = [c_{r,l,0}, c_{r,l,1}]^T,$$

$$r = 0, 1, l = 0, 1 \tilde{w}_{r,l} = \sum_{i=0}^{1} b_{k_1^{(i)}, k_2^{(i)}} \cdot p_i \cdot c_{r,l,i};$$

$$r = 0, 1, l = 0, 1$$

$b_{k_1, k_2}$ is a 2D DFT beam from the oversampled DFT beam grid, where $k_1=0, 1, \ldots N_1O_1-1$, and $k_2=0, 1, \ldots N_2O_2-1$. $0 \leq p_i \leq 1$ beam power scaling factor for beam i. $c_{r,l,i}$ beam combining coefficient for beam i and on polarization r and layer l, where $(O_1, O_2)$ is the oversampling factor in two dimensions. An example value for which is $(O_1, O_2)=(4, 4)$ for 2D port layouts, and (4,1) for 1D port layouts. Another example is to use LTE Rel. 13 and LTE Rel. 14 $(O_1, O_2)$ values for different $(N_1, N_2)$ values, where $2N_1N_2 \in \{4, 8, 12, 16, 20, 24, 28, 32\}$. There are three alternatives for the supported values of $(N_1, N_2)$. In one example of Alt 0, all possible $(N_1, N_2)$ values are supported. In another example of Alt 1, all possible $(N_1, N_2)$ values are supported for 2D port layouts, and all $(N_1, N_2)$ values are supported for 1D port layouts with $N_2=1$. In yet another example of Alt 2, $(N_1, N_2)$ values supported in LTE Rel. 13 and LTE Rel. 14 Class A codebook are supported in the proposed LC codebook.

The leading beam index $(k_1^{(0)}, k_2^{(0)})$ is given by $k_1^{(0)}=0, 1, \ldots N_1O_1-1$ and $k_2^{(0)}=0, 1, \ldots N_2O_2-1$. The leading beam corresponds to the strongest beam with beam power $p_0=1$. The second beam index $(k_1^{(1)}, k_2^{(1)})$ is given by $k_1^{(1)}=k_1^{(0)}+O_1d_1$ and $k_2^{(1)}=k_2^{(0)}+O_2d_2$, where $(d_1, d_2)$ satisfies the following: $d_1 \in \{0, 1, \ldots, \min(N_1, L_1)-1\}$; $d_2 \in \{0, 1, \ldots, \min(N_2, L_2)-1\}$; and $(d_1, d_2) \neq (0,0)$, where $(L_1, L_2)$ is defined above.

The beam power level for the two beams are as follows: $p_0=1$, $p_1 \in \{1, \sqrt{0.5}, \sqrt{0.25}, 0\}$. The W2 codebook for layer 1 and layer 2 is given by $c_{0,0,0}=c_{0,1,0}=1$; and $c_{r,l,i} \in \{1, j, -1, -j\}$, $\forall i, r, l \in \{0, 1\}$.

The W1 payload for $N_1=N_2=O_1=O_2=4$ can be decomposed as follows: indicating the leading beam with stronger power: $\lceil \log_2(N_1 N_2 O_1 O_2) \rceil = \lceil \log 2(16 N_1 N_2) \rceil = 8$ bits; indicating the second beam, which requires $$\left\lceil \log_2 \binom{7}{1} \right\rceil = 3 \text{ bits};$$

and the power level of the $2^{nd}$ beam, which requires 2 bits. The W1 and W2 payload sizes is summarized in Table 30.

The WB components of the codebook is reported jointly as the first PMI pair ($i_{1,1}$, $i_{1,2}$). For example, the first PMI $i_{1,1}$ jointly indicates one of $N_1 O_1$ states for the first index of the leading beam $k_1^{(o)}$, one of 7 states for selecting the 2nd beam and one of 4 states for the beam power level for the 2nd beams, which amounts to $7 \times 4 \times N_1 O_1$ states in total. If $B=B1+B2+B3$ is the total number of bits for this joint reporting, where B1, B2, and B3 are for the three WB components, i.e. $i_{1,1}=0, 1, \ldots, 2^B-1$, and B1 corresponds to the least significant bits (LSB) and B3 corresponds to the most significant bits (MSB), then there may be following alternatives for this joint indication: B1=$\lceil \log_2 N_1 O_1 \rceil$ for the first index of the leading beam $k_1^{(o)}$, B2=2 for the power level of the 2nd beam, and B3=3 for selecting the 2nd beam; B1=$\lceil \log_2 N_1 O_1 \rceil$ for the first index of the leading beam $k_1^{(o)}$, B3=2 for the power level of the 2nd beam, and B2=3 for selecting the 2nd beam; B2=$\lceil \log_2 N_1 O_1 \rceil$ for the first index of the leading beam $k_1^{(o)}$, B1=2 for the power level of the 2nd beam, and B3=3 for selecting the 2nd beam; B2=$\lceil \log_2 N_1 O_1 \rceil$ for the first index of the leading beam $k_1^{(o)}$, B3=2 for the power level of the 2nd beam, and B=3 for selecting the 2nd beam; B3=$\lceil \log_2 N_1 O_1 \rceil$ for the first index of the leading beam $k_1^{(o)}$, B1=2 for the power level of the 2nd beam, and B2=3 for selecting the 2nd beam; and B3=$\lceil \log_2 N_1 O_1 \rceil$ for the first index of the leading beam $k_1^{(o)}$, B2=2 for the power level of the 2nd beam, and B1=3 for selecting the 2nd beam. The 2nd PMI $i_{1,2}$ indicates one of $N_2 O_2$ states for the second index of the leading beam $k_2^{(o)}$.

In a sub-embodiment of this embodiment, the second orthogonal beam index ($d_1$, $d_2$) relative to the leading beam index ($k_0^{(o)}, k_2^{(o)}$) is satisfies $d_1=0, 1, \ldots, L_1-1$ and $d_2=0,$ $1, \ldots, L_2-1$, where ($L_1, L_2$) is according to the following: $N_1 \geq N_2 > 1$: $L = \min(N_1, 4)$, $L_2=2$; $N_2 > N_1 > 1$: $L_2 = \min(N_2, 4)$, $L_1=2$; and $N_2=1$: $L_1 = \min(N_1, 8)$, $L_2=1$.

The detailed values of the second beam index ($d_1, d_2$) for different antenna port layouts are tabulated in Table 31. The number of different second beam indices is $L_1 L_2 - 1$ (note that (0, 0) is not included). Therefore, the number of bits to report the second beam index is $\lceil \log_2(L_1 L_2) \rceil$ (if (0, 0) is also counted) or $\lceil \log_2 (L_1 L_2 - 1) \rceil$ (if (0, 0) is not counted) if reported as one PMI and is $\lceil \log_2 (L_1) \rceil$ and $\lceil \log_2 (L_2) \rceil$ if reported as two PMIs for the two dimension.

TABLE 31

Mapping between second beam index and ($d_1, d_2$)

| | ($d_1, d_2$) | Index |
|---|---|---|
| 4 ports ($N_1 = 2, N_2 = 1$) | (1, 0) | 0 |
| 8 ports ($N_1 = 4, N_2 = 1$) | {(1, 0), (2, 0), (3, 0)} | 0-2 |
| 8 ports ($N_1 = 2, N_2 = 2$) | {(1, 0), (0, 1), (1, 1)} | 0-2 |
| 12 ports ($N_1 = 2, N_2 = 3$) | {(0, 1), (0, 2), (1, 0), (1, 1), (1, 2)} | 0-4 |
| 12 ports ($N_1 = 3, N_2 = 2$) | {(1, 0), (2, 0), (0, 1), (1, 1), (2, 1)} | 0-4 |
| 16/20/24/28/32 ports ($N_2 > N_1 > 1$) | {(0, 1), (0, 2), (0, 3), (1, 0), (1, 1), (1, 2), (1, 3)} | 0-6 |
| 16/20/24/28/32 ports ($N_1 \geq N_2 > 1$) | {(1, 0), (2, 0), (3, 0), (0, 1), (1, 1), (2, 1), (3, 1)} | 0-6 |
| 16/20/24/28/32 ports ($N_1 \geq 8, N_2 = 1$) | {(1, 0), (2, 0), (3, 0), (4, 0), (5, 0), (6, 0), (7, 0)} | 0-6 |

TABLE 30

W1 and W2 payload

| Rank | W1 (bits) | W2 (bits) |
|---|---|---|
| 1 | 13 | 6 |
| 2 | 13 | 12 |

In one embodiment 0, the UE is configured with an LC codebook where rank 1 and rank 2 pre-coders are given according to at least one of the following sub-embodiments. In sub-embodiment 0-1, the rank 1 and rank 2 LC pre-coders are derived without beam selection and with different co-phase for all beams, and are given by:

$$W^{(1)}_{l,m,n,k} = \frac{1}{\sqrt{2}} \begin{bmatrix} w^{(+)}_{l,m,k} \\ w^{(-)}_{l,m,n,k} \end{bmatrix},$$

$$W^{(2)}_{l,m,n,k} = \frac{1}{2} \begin{bmatrix} w^{(+)}_{l,m,k_0} & w^{(+)}_{l,m,k_1} \\ w^{(-)}_{l,m,n_0,k_0} & w^{(-)}_{l,m,n_1,k_1} \end{bmatrix}$$

Where $w^{(+)}_{l,m,k} = \frac{x_{l,m} c_k}{\|x_{l,m} c_k + x_{l,m} \phi_n c_k\|}$ and $w^{(-)}_{l,m,n,k} = \frac{x_{l,m} \phi_n c_k}{\|x_{l,m} c_k + x_{l,m} \phi_n c_k\|}$ for rank 1;

$w^{(+)}_{l,m,k_r} = \frac{x_{l,m} c_{k_r}}{\|x_{l,m} c_{k_r} + x_{l,m} \phi_{n_r} c_{k_r}\|}$ and $w^{(-)}_{l,m,n,k_r} = \frac{x_{l,m} \phi_{n_r} c_{k_r}}{\|x_{l,m} c_{k_r} + x_{l,m} \phi_{n_r} c_{k_r}\|}$ for layer $r = 0, 1$ of rank 2;

$n=[n_0\ n_1]$ and $k=[k_0\ k_1]$ respectively are co-phase pair and coefficient pair indices for rank 2; $x_{l,m}$ is a beam group (comprising of L beams), selected from a codebook, an example of which are Table 30 (non-orthogonal basis) and Table 31 (orthogonal basis) for L=4; $\phi_n = \text{diag}(\varphi_{n,0}\ \varphi_{n,1} \ldots \varphi_{n,L-1})$ is a diagonal matrix with co-phase values $\varphi_{n,0}$, $\varphi_{n,1}, \ldots, \varphi_{n,L-1}$ at the diagonal entries that are selected from a co-phase codebook proposed earlier in the present disclosure. For rank 2, $\varphi_{n_r}$ where r=0, 1 is defined similarly.

In sub-embodiment 0-2, the rank 1 and rank 2 LC pre-coders are derived with B out of L beam selection, where $1 \leq B \leq L$, and with different co-phase for all beams, and are given by:

$$W^{(1)}_{l,m,b,n,k} = \frac{1}{\sqrt{2}} \begin{bmatrix} w^{(+)}_{l,m,b,n,k} \\ w^{(-)}_{l,m,b,n,k} \end{bmatrix},$$

$$W^{(2)}_{l,m,b,n,k} = \frac{1}{2} \begin{bmatrix} w^{(+)}_{l,m,b,k_0} & w^{(+)}_{l,m,b,k_1} \\ w^{(-)}_{l,m,b,n_0,k_0} & -w^{(-)}_{l,m,b,n_1,k_1} \end{bmatrix}$$

Where $w^{(+)}_{l,m,b,k} = \dfrac{x_{l,m} E_{B,b} c_k}{\|x_{l,m} c_k + x_{l,m} E_{B,b} \phi_n c_k\|}$ and $w^{(-)}_{l,m,b,n,k} = \dfrac{x_{l,m} E_{B,b} \phi_n c_k}{\|x_{l,m} c_k + x_{l,m} E_{B,b} \phi_n c_k\|}$ for rank 1;

$w^{(+)}_{l,m,b,k_r} = \dfrac{x_{l,m} E_{B,b} c_{k_r}}{\|x_{l,m} c_{k_r} + x_{l,m} E_{B,b} \phi_{n_r} c_{k_r}\|}$ and $w^{(-)}_{l,m,b,n_r,k_r} = \dfrac{x_{l,m} E_{B,b} \phi_{n_r} c_{k_r}}{\|x_{l,m} c_{k_r} + x_{l,m} E_{B,b} \phi_{n_r} c_{k_r}\|}$ for layer $r = 0, 1$ of rank 2;

$n=[n_0\ n_1]$ and $k=[k_0\ k_1]$ respectively are co-phase pair and coefficient pair indices for rank 2; $x_{l,m}$ is a beam group (comprising of L beams), selected from a codebook, an example of which are Table 30 (non-orthogonal basis) and Table 31 (orthogonal basis) for L=4; $E_{B,b}$ is the beam selection matrix, an example of which is Table 31 for L=4; $\phi_n = \text{diag}(\varphi_{n,0}\ \varphi_{n,1}\ \ldots\ \varphi_{n,L-1})$ is a diagonal matrix with co-phase values $\varphi_{n,0}, \varphi_{n,1}, \ldots, \varphi_{n,L-1}$ at the diagonal entries that are selected from a co-phase codebook proposed earlier in the present disclosure. For rank 2, $\phi_{n_r}$ where r=0, 1 is defined similarly.

$c_k=[c_{k,0}\ c_{k,1}\ \ldots\ c_{k,L-1}]^T$ is a length-L coefficient vector, selected from a coefficient codebook proposed earlier in the present disclosure. For rank 2, $c_k$ where r=0, 1 is defined similarly.

According to Alt 0 in FIG. 14, the pre-coder for layer r=0, 1, . . . , R−1 of the rank-R LC codebook is given by $$p^{(r)} = Bc = \begin{bmatrix} b_0 b_1 \ldots b_{L-1} & 0\ 0\ \ldots\ 0 \\ 0\ 0\ \ldots\ 0 & b_0 b_1 \ldots b_{L-1} \end{bmatrix} \begin{bmatrix} 1 \\ c_1^{(r)} \\ \vdots \\ c_{2L-1}^{(r)} \end{bmatrix}.$$

If $c_l^{(r)}$ belongs to QPSK alphabet $\{1, -1, j, -j\}$, then the number of bits to report rank-R LC coefficients (i.e. $2^{nd}$ PMI reporting overhead associated with $W_2$ codebook) is $r \times 4^{2L-1}$. This implies that for rank-2 (i.e. R=2), the $2^{nd}$ PMI reporting overhead is doubled when compared with that for rank-1. This increase in PMI reporting overhead may be an issue if $2^{nd}$ PMI has to be reported periodically using PUCCH because the limited number of CSI bits that can be reported using PUCCH Format 2 or 3, for example. It is therefore desired to design higher rank LC codebooks (e.g. rank 2) with PMI reporting overhead comparable to that for rank 1. An example of such reduced overhead rank-2 LC codebook is proposed below based on Alt 1 in FIG. 14, where co-phase for the two polarizations and LC coefficients are separated, hence can be quantized using respective codebooks.

In some embodiments, a UE is configured with a dual-stage LC codebook $W=W_1 W_2$, according to some embodiments to the present disclosure, in which the laye r r=0, 1, . . . , R−1 of the second stage rank-R $W_2$ codebook has pre-coders for linear combination of L $W_1$ beams with the following structure:

$$a^{(r)} = \begin{bmatrix} e_0 & e_1 & \ldots & e_{L-1} \\ \phi_0^{(r)} e_0 & \phi_1^{(r)} e_1 & \ldots & \phi_{L-1}^{(r)} e_{L-1} \end{bmatrix} \begin{bmatrix} 1 \\ c_1^{(r)} \\ \vdots \\ c_{L-1}^{(r)} \end{bmatrix} =$$

$$[1\ c_1^{(r)}\ \ldots\ c_{L-1}^{(r)}\ \phi_0^{(r)}\ \phi_1^{(r)}\ c_1^{(r)}\ \ldots\ \phi_{L-1}^{(r)} c_{L-1}^{(r)}]^T,$$

where $\phi^{(r)}=[\phi_0^{(r)}\ \phi_1^{(r)}\ \ldots\ \phi_{L-1}^{(r)}]$ corresponds to the co-phase component of the $W_2$ codebook; and $c^{(r)}=[1\ c_1^{(r)}\ \ldots\ c_{L-1}^{(r)}]$ corresponds to the coefficient component of the $W_2$ codebook.

Note that the coefficient for the $1^{st}$ beam can be assumed to be 1, i.e., $c_0^{(r)}=1$, for all layers r. For L=2, the rank 2 $W_2$ pre-coder is then given by $$\begin{bmatrix} a^{(0)} \\ a^{(1)} \end{bmatrix} = \begin{bmatrix} 1 & c_1^{(0)} & \phi_0^{(0)} & \phi_1^{(0)} c_1^{(0)} \\ 1 & c_1^{(1)} & \phi_0^{(1)} & \phi_1^{(1)} c_1^{(1)} \end{bmatrix}^T.$$

For L=4, the rank 2 pre-coder is given by a $$\begin{bmatrix} a^{(0)} \\ a^{(1)} \end{bmatrix} = \begin{bmatrix} 1 & c_1^{(0)} & c_2^{(0)} & c_3^{(0)} & \phi_0^{(0)} & \phi_1^{(0)} c_1^{(0)} & \phi_2^{(0)} c_2^{(0)} & \phi_3^{(0)} c_3^{(0)} \\ 1 & c_1^{(1)} & c_2^{(1)} & c_3^{(1)} & \phi_0^{(1)} & \phi_1^{(1)} c_1^{(1)} & \phi_2^{(1)} c_2^{(1)} & \phi_3^{(1)} c_3^{(1)} \end{bmatrix}^T.$$

Let $W_{coph}^{(2)}$ and $W_{coef}^{(2)}$ be the rank-2 codebooks for the co-phase component $$\begin{bmatrix} \phi^{(0)} \\ \phi^{(1)} \end{bmatrix} = \begin{bmatrix} \phi_0^{(0)} & \phi_1^{(0)} & \ldots & \phi_{L-1}^{(0)} \\ \phi_0^{(1)} & \phi_1^{(1)} & \ldots & \phi_{L-1}^{(1)} \end{bmatrix}^T$$

and the coefficient component $$\begin{bmatrix} c^{(0)} \\ c^{(1)} \end{bmatrix} = \begin{bmatrix} 1 & c_1^{(0)} & \ldots & c_{L-1}^{(0)} \\ 1 & c_1^{(1)} & \ldots & c_{L-1}^{(1)} \end{bmatrix}^T$$

for the two layers, respectively.

In some embodiments, the rank-2 $W_{coph}^{(2)}$ codebook is according to one or a combination of the following alternatives. In one example of Alt A for a given beam $l \in \{0, 1, \ldots, L-1\}$, the same co-phase is used for the two layers, i.e., $\phi_l^{(0)}=\phi_l^{(1)} \in \{1, j, -1, -j\}$, for example. So, the total number co-phase pair combinations for L beams is $4^L$. In another example of Alt B for a given beam $l \in \{0, 1, \ldots, L-1\}$, the co-phase pair for the two layers $[\phi_l^{(0)}\ \phi_l^{(1)}]$ belongs to $\{[1\ -1], [j\ -j]\}$. Note that these are the two co-phase pairs in the LTE Rel. 13 Class A rank-2 codebook. So, the total number co-phase pair combinations for L beams is $2^L$. In yet another example of Alt C for each beam $l \in \{0, 1, \ldots, L-1\}$ and for each layer $r \in \{0,1\}$, the co-phase $\phi_l^{(r)}$ belongs to $\{1, -1\}$. So, the total number co-phase pair combinations for L beams is $2^L \times 2^L$. In yet another example of Alt D for each beam $l \in \{0, 1, \ldots, L-1\}$, the co-phase pair for the two layers $[\phi_l^{(0)}\ \phi_l^{(1)}]$ belongs to $\{[1\ -1], [-j\ j], [-1\ 1], [-j\ j]\}$. So, the total number co-phase pair combinations for L beams is $4^L$. In yet another example of Alt E for each beam $l \in \{0, 1, \ldots, L-1\}$ and for each layer $r \in \{0,1\}$, the co-phase $\phi_l^{(r)}$ belongs to $\{1, j, -1, -j\}$. So, the total number co-phase pair combinations for L beams is $4^L \times 4^L$. In yet another example of Alt F, the $W_{coph}^{(2)}$ codebook is determined based on a condition such as one of the following. In one instance of Orthogonality condition, $(\phi^{(0)})^H \phi^{(1)} = 0$, which ensures that the co-phase values for the two layers that are applied at the $2^{nd}$ antenna polarization are orthogonal. Note the $1^{st}$ antenna polarization has a fixed co-phase equal to 1. In another instance of identity condition, $(\phi_{(l)}^{(0)})^H \phi_{(l)}^{(1)} = -1$, which ensures that the correlation between two layers for the $2^{nd}$ antenna polarization cancels that for the $1^{st}$ antenna polarization (whose co-phase is fixed to 1). Note that this identity condition guarantees that $(a^{(0)})^H a^{(1)} = (c^{(0)})^H c^{(1)} + (c^{(0)})^H (\phi^{(0)})^H \phi^{(1)} c^{(1)} = (c^{(0)})^H c^{(1)} - (c^{(0)})^H c^{(1)} = 0$ regardless of coefficients for two layers $c^{(0)}$ and $c^{(1)}$. In yet another example of Alt G, a combination of Alt A-Alt F is considered.

The co-phase codebook $W_{coph}^{(2)}$ alternatives A-E are summarized in Table 32. Note that the number of co-phase pair combinations for rank 1 codebook is $4^L$ assuming QPSK $\{1, j, -1, -j\}$ co-phase alphabet. So, Alt A-D ensures that the size of co-phase codebook for rank 2 is at most equal to that for rank 1.

TABLE 32

Rank 2 co-phase codebook $W_{coph}^{(2)}$ alternatives

| Alternative | Rank-2 co-phase for two layers $[\phi_l^{(0)} \phi_l^{(1)}]$ ($2^{nd}$ antenna polarization) | Number of co-phase pair combinations for L beams |
|---|---|---|
| A | $\phi_l^{(0)} = \phi_l^{(1)} \in \{1, j, -1, -j\}$ | $4^L$ |
| B | $[\phi_l^{(0)} \phi_l^{(1)}] \in \{[1\ -1], [j, -j]\}$ | $2^L$ |
| C | $[\phi_l^{(0)}, \phi_l^{(1)}] \in \{1\ -1\}$ | $2^L \times 2^L = 4^L$ |
| D | $[\phi_l^{(0)} \phi_l^{(1)}] \in \{[1\ -1], [j\ -j], [-1\ 1], [-j\ j]\}$ | $4^L$ |
| E | $\phi_l^{(0)}, \phi_l^{(1)} \in \{1, j, -1, -j\}$ | $4^L \times 4^L$ |

In some embodiments, the rank-2 $W_{coph}^{(2)}$ codebook alternatives (Alt A-Alt G) depends on the number of beams (L value). For example, if L=2, the rank-2 $W_{coph}^{(2)}$ codebook is according to one of Alt A or D or E, and if L=4, then the rank-2 $W_{coph}^{(2)}$ codebook is according to one of Alt A-D.

In some embodiments, the rank-2 $W_{coef}^{(2)}$ codebook is according to one or a combination of the following alternatives. In one alternative of Alt H for a given beam $l \in \{1, \ldots, L-1\}$, the same coefficient is used for the two layers, i.e., $c_l^{(0)} = c_l^{(1)} \in \{1, j, -1, -j\}$, for example. So, the total number coefficient pair combinations for L beams is $4^{L-1}$. In another alternative of Alt I for a given beam $l \in \{1, \ldots, L-1\}$, the coefficient pair for the two layers $[c_l^{(0)}\ c_l^{(1)}]$ belongs to $\{[1\ -1], [j\ -j]\}$. So, the total number coefficient pair combinations for L beams is $2^{L-1}$. In yet another alternative of Alt J for each beam $l \in \{1, \ldots, L-1\}$ and for each layer $r \in \{0, 1\}$, the coefficient $c_l^{(r)}$ belongs to $\{1, -1\}$. So, the total number coefficient pair combinations for L beams is $2^{L-1} \times 2^{L-1}$. In yet another alternative of Alt K for each beam $l \in \{1, \ldots, L-1\}$, the coefficient pair for the two layers $[c_l^{(0)}\ c_l^{(1)}]$ belongs to $\{[1\ -1], [j\ -j], [-1\ 1], [-j\ j]\}$. So, the total number coefficient pair combinations for L beams is $4^{L-1}$. In yet another alternative of Alt L for each beam $l \in \{1, \ldots, L-1\}$ and for each layer $r \in \{0, 1\}$, the coefficient $c_l^{(r)}$ belongs to $\{1, j, -1, -j\}$. So, the total number coefficient pair combinations for L beams is $4^{L-1} \times 4^{L-1}$. In yet another alternative of Alt M), the $W_{coef}^{(2)}$ codebook is determined based on a condition such as one of the following. In one instance of orthogonality condition, $(c^{(0)})^H c^{(1)} = 0$, which ensures that the coefficients for the two layers are orthogonal. In yet another instance of Alt N, a combination of Alt H-Alt M may be considered.

TABLE 33

Rank 2 coefficient codebook $W_{coef}^{(2)}$ alternatives

| Alternative | Rank-2 coefficient for two layers $[c_l^{(0)}\ c_l^{(1)}]$ ($2^{nd}$ antenna polarization) | Number of coefficient pair combinations for L beams |
|---|---|---|
| H | $c_l^{(0)} = c_l^{(1)} \in \{1, j, -1, -j\}$ | $4^{L-1}$ |
| I | $[c_l^{(0)}\ c_l^{(1)}] \in \{[1\ -1], [j\ -j]\}$ | $2^{L-1}$ |
| J | $[c_l^{(0)}\ c_l^{(1)}] \in \{1\ -1\}$ | $2^{L-1} \times 2^{L-1} = 4^{L-1}$ |
| K | $[c_l^{(0)}\ c_l^{(1)}] \in \{[1\ -1], [j\ -j], [-1\ 1], [-j\ j]\}$ | $4^{L-1}$ |
| L | $c_l^{(0)}, c_l^{(1)} \in \{1, j, -1, -j\}$ | $4^{L-1} \times 4^{L-1}$ |

In some embodiments, the rank-2 $W_{coef}^{(2)}$ codebook alternatives (Alt H-Alt N) depends on the number of beams (L value). For example, if L=2, the rank-2 $W_{coef}^{(2)}$ codebook is according to one of Alt H or K or L, and if L=4, then the rank-2 $W_{coef}^{(2)}$ codebook is according to one of Alt H-K.

In some embodiments, a UE is configured with the LC codebook according to some embodiments of the present disclosure in which the co-phase (derived from codebook $W_{coph}^{(2)}$ for $2^{nd}$ polarization) for each layer r in $\{0, 1, \ldots, R-1\}$ of the rank-R LC codebook is different for each of R layers, but LC coefficients (derived from codebook $W_{coef}^{(2)}$) for each of R layers is the same. In this case, the overhead associated with the LC coefficient reporting does not increase as the rank increases, and hence stays the same for all rank. The overhead associated with the co-phase ($2^{nd}$ polarization) for L beams can be according to one or a combination of the straightforward extensions of Alt A-L in Table 32 and Table 33 for higher rank (R>2).

In some embodiments, a UE is configured with a dual-stage LC codebook $W = W_1 W_2$, according to some embodiments of the present disclosure, in which the number of beams (i.e. L value) for linear combination depends on the rank of codebook. In one alternative, L>1 for rank 1 and 2, and L=1 for rank 3-8. Therefore, the proposed LC codebook is used to report rank 1 and 2 CSI, and LTE Rel. 13 Class A or an extension of LTE Rel. 14 is used to report rank 3-8 CSI. A few examples of this alternative is as follows. In one example 0, L=4 for rank 1 and 2; and L=1 for rank 3-8 (Class A codebook). In another example 1, L=4 for rank 1; L=2 out of 4 per SB beam selection for rank 2; and L=1 for rank 3-8 (Class A codebook). In another example 2, L=2 out of 4 per SB beam selection for rank 1 and 2; and L=1 for rank 3-8 (Class A codebook).

In another alternative, L>1 for rank 1-4, and L=1 for rank 5-8. Therefore, the proposed LC codebook is used to report rank 1-4 CSI, and LTE Rel. 13 Class A or an extension of LTE Rel. 14 is used to report rank 3-8 CSI. A few examples of this alternative is as follows. In one example 3, L=4 for rank 1-4; and L=1 for rank 5-8 (Class A codebook). In another example 4, L=4 for rank 1-2; L=2 out of 4 per SB beam selection for rank 3-4; and L=1 for rank 5-8 (Class A codebook). In yet another example 5, L=4 for rank 1; L=2 out of 4 per SB beam selection for rank 2-4; and L=1 for rank 5-8 (Class A codebook). In yet another example 6, L=2 out of 4 per SB beam selection for rank 1-4; and L=1 for rank 5-8 (Class A codebook). In yet another alternative, for a given rank 1-8, a combination of the above two alternatives or Examples 0-6 is used to configure the LC codebook.

In some embodiments, a UE is configured with a dual-stage LC codebook W=W$_1$W$_2$, according to some embodiments of the present disclosure, in which W$_1$ beam groups for each layer r in {0, 1, . . . , R−1} of the rank-R LC codebook are according to one of the following alternatives. In one alternative of common W$_1$ beam group for R layers, an example of which is orthogonal (DFT) beam group such as LTE Rel. 13 Class A rank 7-8 W$_1$. In another alternative of different W$_1$ beam group for R layers, an example of which is as follows: LTE Rel. 13 Class A rank 1 W$_1$ for LC rank 1 W$_1$; LTE Rel. 13 Class A rank 3 W$_1$ for LC rank 2 W$_1$; LTE Rel. 13 Class A rank 5 W$_1$ for LC rank 3 W$_1$; and LTE Rel. 13 Class A rank 7 W$_1$ for LC rank 4 W$_1$.

In some embodiments, a UE is configured with the LC codebook according to some embodiments of the present disclosure in which Codebook-Config for beam group type configuration (e.g., FIGS. 23-26) for rank-R LC codebook is according to one of the following alternatives: common Codebook-Config for all rank, for example Codebook-Config=2 and 4 for all rank; and different Codebook-Config for some or all ranks, for example Codebook-Config=2, 3, and 4 for rank 1-2, and Codebook-Config=2 and 4 for rank >2.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:

1. A user equipment (UE) for a channel state information (CSI) feedback in an advanced communication system, the UE comprises:
   a transceiver configured to receive, from a base station (BS), CSI feedback configuration information for a pre-coding matrix indicator (PMI) feedback based on a linear combination (LC) codebook, wherein the PMI comprises a first PMI value ($i_1$) and a second PMI value ($i_2$); and
   at least one processor configured to determine the first PMI value ($i_1$) and the second PMI value ($i_2$) indicating an LC pre-coder that corresponds to a weighted linear combination of a first beam and a second beam, wherein:
   the first PMI value ($i_1$) includes a first beam indicator ($i_{1,1}$, $i_{1,2}$) that indicates the first beam in a first dimension and a second dimension, respectively, and a second beam indicator ($i_{1,3}$) that indicates a distance ($d_1$, $d_2$) of the second beam relative to the first beam in the first and second dimensions, respectively; and
   the second PMI value ($i_2$) indicates weights assigned to the first beam and the second beam; and wherein
   the transceiver is further configured to transmit, to the BS, the CSI feedback over an uplink channel including the first PMI value ($i_1$) and the second PMI value ($i_2$).

2. The UE of claim 1, wherein the first PMI value ($i_1$) includes a relative power indicator (RPI) ($I_p$) indicating a power of a weight assigned to the second beam relative to a power of a weight assigned to the first beam, wherein the power of the weight assigned to the first beam is set to 1 and the power of the weight assigned to the second beam is set to a value among {0, $\sqrt{1/4}$, $\sqrt{1/2}$, 1} {0, $\sqrt{1/4}$, $\sqrt{1/2}$, 1}, and wherein a first index value ($i_{1,1}$) and a second index value ($i_{1,2}$) indicate an index of the first beam in a first dimension and a second dimension, respectively, and a first distance value ($d_1$) and a second distance value ($d_2$) indicate a distance of the second beam from the first beam in the first dimension and the second dimension, respectively.

3. The UE of claim 1, wherein the first beam and the second beam correspond to two discrete Fourier transform (DFT) beams selected from an oversampled DFT codebook comprising DFT beams:

$$v_{l_1,l_2} = \left[ u_{l_2} \ e^{j\frac{2\pi l}{O_1 N_1}} u_{l_2} \ \ldots \ e^{j\frac{2\pi l_1 (N_1-1)}{O_1 N_1}} u_{l_2} \right]^T,$$

$$u_{l_2} = 1 \text{ if } N_2 = 1; u_{l_2} = \left[ 1 \ e^{j\frac{2\pi l_2}{O_2 N_2}} \ \ldots \ e^{j\frac{2\pi l_2(N_2-1)}{O_2 N_2}} \right] \text{ otherwise,}$$

$$0 \leq l_1 \leq O_1 N_1 - 1, \text{ and } 0 \leq l_2 \leq O_2 N_2 - 1,$$

where $N_1$ and $N_2$ indicate a first and a second number of antenna ports in the first and the second dimensions, respectively, and $O_1$ and $O_2$ indicate a first and a second oversampling factors in the first and second dimensions, respectively,
   wherein the distance ($d_1$, $d_2$) of the second beam relative to a first beam index indicated by the first beam indicator ($i_{1,1}$, $i_{1,2}$) is such that a first distance value ($d_1$) belongs to a set of integers {0, 1, . . . , L−1} and a second distance value ($d_2$) belongs to a set of integers {0, 1, . . . , L$_2$−1}, respectively; and
   wherein a beam group size (L$_1$, L$_2$) is determined by:

$$N_1 \geq N_2 > 1: L_1 = \min(N_1, 4), L_2 = 2;$$

$$N_2 > N_1 > 1: L_2 = \min(N_2, 4), L_1 = 2; \text{ and}$$

$$N_2 = 1: L_1 = \min(N_1, 8), L_2 = 1.$$

4. The UE of claim 3, wherein a second beam index ($k_1^{(1)}, k_2^{(1)}$) is determined by:

$$k_1^{(1)} = k_1^{(0)} + O_1 d_1, k_2^{(1)} = k_2^{(0)} + O_2 d_2,$$

where the ($d_1$, $d_2$) is such that the ($d_1$) belongs to a set of integers {0, 1, . . . , min($N_1$,$L_1$)−1}, the ($d_2$) belongs to a set of integers {0, 1, . . . , min($N_2$, $L_2$)−1}, and ($d_1$, $d_2$)≠(0,0).

5. The UE of claim 1, wherein the at least one processor is further configured to map between the second beam indicator ($i_{1,3}$) and the distance ($d_1$, $d_2$) of the second beam based on a table given by:

|  | $N_1 \geq N_2$, $N_1 \geq 4$, $N_2 \neq 1$ | | $N_1 = 3$, $N_2 = 2$ | | $N_1 = 2$, $N_2 = 2$ | | $N_2 > N_1$, $N_2 \geq 4$, $N_1 \neq 1$ | | $N_2 = 3$, $N_1 = 2$ | | $N_1 \geq 8$, $N_2 = 1$ | | $N_1 = 2$, $N_2 = 1$ | | $N_1 = 4$, $N_2 = 1$ | |
|---|---|---|---|---|---|---|---|---|---|---|---|---|---|---|---|---|
| Value of $i_{1,3}$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ |
| 0 | 1 | 0 | 1 | 0 | 1 | 0 | 0 | 1 | 0 | 1 | 1 | 0 | 1 | 0 | 1 | 0 |
| 1 | 2 | 0 | 2 | 0 | 0 | 1 | 0 | 2 | 0 | 2 | 2 | 0 | | | 2 | 0 |
| 2 | 3 | 0 | 0 | 1 | 1 | 1 | 0 | 3 | 1 | 0 | 3 | 0 | | | 3 | 0 |
| 3 | 0 | 1 | 1 | 1 | | | 1 | 0 | 1 | 1 | 4 | 0 | | | | |
| 4 | 1 | 1 | 2 | 1 | | | 1 | 1 | 1 | 2 | 5 | 0 | | | | |
| 5 | 2 | 1 | | | | | 1 | 2 | | | 6 | 0 | | | | |
| 6 | 3 | 1 | | | | | 1 | 3 | | | 7 | 0. | | | | |

6. The UE of claim 1, wherein the at least one processor is further configured to at least one of:
  report a single wideband (WB) bit stream that indicates three components jointly, the $(i_{1,1}, i_{1,2})$ indicating the first beam, the $(i_{1,3})$ indicating the distance $(d_1, d_2)$ of the second beam from the first beam, and the $(I_p)$ indicating a power of the weight assigned to the second beam; or
  report multiple WB bit streams that indicate three components separately, a first bit stream for the $(i_{1,1}, i_{1,2})$ indicating the first beam, and either a second bit stream jointly indicating the $(i_{1,3})$ and the $(I_p)$ for the second beam or a second bit stream and a third bit stream separately indicating the $(i_{1,3})$ and the $(I_p)$ for the second beam, respectively.

7. The UE of claim 1, wherein the at least one processor is further configured to separate the distance $(d_1, d_2)$ of the second beam in accordance with a PMI $(i_{1,1\text{-}2}, i_{1,2\text{-}2})$, wherein the $(d_1)$ of the distance $(d_1, d_2)$ corresponds to a $(i_{1,1\text{-}2})$ of the PMI $(i_{1,1\text{-}2}, i_{1,2\text{-}2})$ and the $(d_2)$ of the distance $(d_1, d_2)$ corresponds to a $(i_{1,2\text{-}2})$ of the PMI $(i_{1,1\text{-}2}, i_{1,2\text{-}2})$, and wherein if one PMI $(i_3)$ or $(i_{1,1\text{-}2}, i_{1,2\text{-}2})$ is reported to the BS, a bit width for the PMI is determined by $\lceil \log_2 (L_1 L_2) \rceil$ and if two PMIs, $(i_{1,1\text{-}2})$ and $(i_{1,2\text{-}2})$, are reported to the BS, bit widths for the two PMIs are determined by $\lceil \log_2 (L_1) \rceil$ and $\lceil \log_2 (L_2) \rceil$, respectively.

8. A base station (BS) for a channel state information (CSI) feedback in an advanced communication system, the BS comprises:
  a transceiver configured to:
    transmit, to a user equipment (UE), CSI feedback configuration information for a pre-coding matrix indicator (PMI) feedback based on a linear combination (LC) codebook, wherein the PMI comprises a first PMI value $(i_1)$ and a second PMI value $(i_2)$, wherein:
      the first PMI value $(i_1)$ and the second PMI value $(i_2)$ indicate an LC pre-coder that corresponds to a weighted linear combination of a first beam and a second beam;
      the first PMI value $(i_1)$ includes a first beam indicator $(i_{1,1}, i_{1,2})$ that indicates the first beam in a first dimension and a second dimension, respectively, and a second beam indicator $(i_{1,3})$ that indicates a distance $(d_1, d_2)$ of the second beam relative to the first beam in the first and second dimensions, respectively; and
      the second PMI value $(i_2)$ indicates weights assigned to the first beam and the second beam; and
    receive, from the UE, the CSI feedback over an uplink channel including the first PMI value $(i_1)$ and the second PMI value $(i_2)$.

9. The BS of claim 8, wherein the first PMI $(i_1)$ includes a relative power indicator (RPI) $(I_p)$ indicating a power of a weight assigned to the second beam relative to a power of a weight assigned to the first beam, wherein the power of the weight assigned to the first beam is set to 1 and the power of the weight assigned to the second beam is set to a value among $\{0, \sqrt{1/4}, \sqrt{1/2}, 1\}$, and wherein a first index value $(i_{1,1})$ and a second index value $(i_{1,2})$ indicate an index of the first beam in a first dimension and a second dimension, respectively, and a first distance value $(d_1)$ and a second distance value $(d_2)$ indicate a distance of the second beam from the first beam in the first dimension and the second dimension, respectively.

10. The BS of claim 8, wherein the first beam and the second beam correspond to two discrete Fourier transform (DFT) beams selected from an oversampled DFT codebook comprising DFT beams:

$$v_{l_1,l_2} = \left[ u_{l_2} \; e^{j\frac{2\pi l_1}{O_1 N_1}} u_{l_2} \; \ldots \; e^{j\frac{2\pi l_1(N_1-1)}{O_1 N_1}} u_{l_2} \right]^T,$$

$$u_{l_2} = 1 \text{ if } N_2 = 1; u_{l_2} = \left[ 1 \; e^{j\frac{2\pi l_2}{O_2 N_2}} \; \ldots \; e^{j\frac{2\pi l_2(N_2-1)}{O_2 N_2}} \right] \text{ otherwise,}$$

$$0 \leq l_1 \leq O_1 N_1 - 1, \text{ and } 0 \leq l_2 \leq O_2 N_2 - 1,$$

where $N_1$ and $N_2$ indicate a first and a second number of antenna ports in the first and the second dimensions, respectively, and $O_1$ and $O_2$ indicate a first and a second oversampling factors in the first and second dimensions, respectively, the distance $(d_1, d_2)$ of the second beam relative to a first beam index indicated by the first beam indicator $(i_{1,1}, i_{1,2})$ is such that a first distance value $(d_1)$ belongs to a set of integers $\{0, 1, \ldots, L_1-1\}$ and a second distance value $(d_2)$ belongs to a set of integers $\{0, 1, \ldots, L_2-1\}$, respectively, and
wherein a beam group size $(L_1, L_2)$ is determined by:

$N_1 \geq N_2 > 1: L_1 = \min(N_1, 4), L_2 = 2;$ $N_2 > N_1 > 1: L_2 = \min(N_2, 4), L_1 = 2;$ and $N_2 = 1: L_1 = \min(N_1, 8), L_2 = 1.$ 11. The BS of claim 10, wherein a second beam index $(k_1^{(1)}, k_2^{(1)})$ is determined by:

$k_1^{(1)} = k_1^{(0)} + O_1 d_1, k_2^{(1)} = k_2^{(0)} + O_2 d_2,$ where the $(d_1, d_2)$ is such that the $(d_1)$ belongs to a set of integers $\{0, 1 \ldots, \min(N_1, L_1)-1\}$, the $(d_2)$ belongs to a set of integers $\{0, 1, \ldots, \min(N_2, L_2)-1\}$, and $(d_1, d_2) \neq (0,0)$.

12. The BS of claim 8, wherein the second beam indicator $(i_{1,3})$ and the distance $(d_1, d_2)$ of the second beam are mapped based on a table given by:

| | $N_1 \geq N_2$, $N_1 \geq 4$, $N_2 \neq 1$ | | $N_1 = 3$, $N_2 = 2$ | | $N_1 = 2$, $N_2 = 2$ | | $N_2 > N_1$, $N_2 \geq 4$, $N_1 \neq 1$ | | $N_2 = 3$, $N_1 = 2$ | | $N_1 \geq 8$, $N_2 = 1$ | | $N_1 = 2$, $N_2 = 1$ | | $N_1 = 4$, $N_2 = 1$ | |
|---|---|---|---|---|---|---|---|---|---|---|---|---|---|---|---|---|
| Value of $i_{1,3}$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ |
| 0 | 1 | 0 | 1 | 0 | 1 | 0 | 0 | 1 | 0 | 1 | 1 | 0 | 1 | 0 | 1 | 0 |
| 1 | 2 | 0 | 2 | 0 | 0 | 1 | 0 | 2 | 0 | 2 | 2 | 0 | | | 2 | 0 |
| 2 | 3 | 0 | 0 | 1 | 1 | 1 | 0 | 3 | 1 | 0 | 3 | 0 | | | 3 | 0 |
| 3 | 0 | 1 | 1 | 1 | | | 1 | 0 | 1 | 1 | 4 | 0 | | | | |
| 4 | 1 | 1 | 2 | 1 | | | 1 | 1 | 1 | 2 | 5 | 0 | | | | |
| 5 | 2 | 1 | | | | | 1 | 2 | | | 6 | 0 | | | | |
| 6 | 3 | 1 | | | | | 1 | 3 | | | 7 | 0. | | | | |

13. The BS of claim 8, wherein the transceiver is further configured to at least one of:
  receive a single wideband (WB) bit stream that indicates three components jointly, the ($i_{1,1}$, $i_{1,2}$) indicating the first beam, the ($i_{1,3}$) indicating the distance ($d_1$, $d_2$) of the second beam from the first beam, and the ($I_p$) indicating a power of the weight assigned to the second beam; or
  receive multiple WB bit streams that indicate three components separately, a first bit stream for the ($i_{1,1}$, $i_{1,2}$) indicating the first beam, and either a second bit stream jointly indicating the ($i_{1,3}$) and the ($I_p$) for the second beam or a second bit stream and a third bit stream separately indicating the ($i_{1,3}$) and the ($I_p$) for the second beam, respectively.

14. A method of a user equipment (UE) for a channel state information (CSI) feedback in an advanced communication system, the method comprising:
  receiving, from a base station (BS), CSI feedback configuration information for a pre-coding matrix indicator (PMI) feedback based on a linear combination (LC) codebook, wherein the PMI comprises a first PMI value ($i_1$) and a second PMI value ($i_2$);
  determining the first PMI value ($i_1$) and the second PMI value ($i_2$) indicating an LC pre-coder that corresponds to a weighted linear combination of a first beam and a second beam, wherein:
    the first PMI value ($i_1$) includes a first beam indicator ($i_{1,1}$, $i_{1,2}$) that indicates the first beam in a first dimension and a second dimension, respectively, and a second beam indicator ($i_{1,3}$) that indicates a distance ($d_1$, $d_2$) of the second beam relative to the first beam in the first and second dimensions, respectively; and
    the second PMI value ($i_2$) indicates weights assigned to the first beam and the second beam; and
  transmitting, to the BS, the CSI feedback over an uplink channel including the determined first PMI value ($i_1$) and the second PMI value ($i_2$).

15. The method of claim 14, wherein the first PMI ($i_1$) includes a relative power indicator (RPI) indicating a power of a weight assigned to the second beam relative to a power of a weight assigned to the first beam, and wherein the power of the weight assigned to the first beam is set to 1 and the power of the weight assigned to the second beam is set to a value among $\{0, \sqrt{1/4}, \sqrt{1/2}, 1\}$, and wherein a first index value ($i_{1,1}$) and a second index value ($i_{1,2}$) indicate an index of the first beam in a first dimension and a second dimension, respectively, and a first distance value ($d_1$) and a second distance value ($d_2$) indicate a distance of the second beam from the first beam in the first dimension and the second dimension, respectively.

16. The method of claim 14, wherein the first beam and the second beam correspond to two discrete Fourier transform (DFT) beams selected from an oversampled DFT codebook comprising DFT beams:

$$v_{l_1, l_2} = \left[ u_{l_2} \ e^{j\frac{2\pi l_1}{O_1 N_1}} u_{l_2} \ \ldots \ e^{j\frac{2\pi l_1(N_1-1)}{O_1 N_1}} u_{l_2} \right]^T,$$

$$u_{l_2} = 1 \text{ if } N_2 = 1; u_{l_2} = \left[ 1 \ e^{j\frac{2\pi l_2}{O_2 N_2}} \ \ldots \ e^{j\frac{2\pi l_2(N_2-1)}{O_2 N_2}} \right] \text{otherwise,}$$

$$0 \leq l_1 \leq O_1 N_1 - 1, \text{ and } 0 \leq l_2 \leq O_2 N_2 - 1,$$

where $N_1$ and $N_2$ indicate a first and a second number of antenna ports in the first and the second dimensions, respectively, and $O_1$ and $O_2$ indicate a first and a second oversampling factors in the first and second dimensions, respectively,
  the distance ($d_1$, $d_2$) of the second beam relative to a first beam index indicated by the first beam indicator ($i_{1,1}$, $i_{1,2}$) is such that a first distance value ($d_1$) belongs to a set of integers $\{0, 1, \ldots, L_1-1\}$ and a second distance value ($d_2$) belongs to a set of integers $\{0, 1, \ldots, L_2-1\}$, respectively, and
  where a beam group size ($L_1$, $L_2$) is determined by:

$$N_1 \geq N_2 > 1: L_1 = \min(N_1, 4), L_2 = 2;$$

$$N_2 > N_1 > 1: L_2 = \min(N_2, 4), L_1 = 2; \text{ and}$$

$$N_2 = 1: L_1 = \min(N_1, 8), L_2 = 1.$$

17. The method of claim 16, wherein a second beam index ($k_1^{(1)}, k_2^{(1)}$) is determined by:

$$k_1^{(1)} = k_1^{(0)} + O_1 d_1, k_2^{(1)} = k_2^{(0)} + O_2 d_2,$$

where the ($d_1$, $d_2$) is such that the ($d_1$) belongs to a set of integers $\{0, 1, \ldots, \min(N_1, L_1)-1\}$, the ($d_2$) belongs to a set of integers $\{0, 1, \ldots, \min(N_2, L_2)-1\}$, and ($d_1$, $d_2$) $\neq$ (0,0).

18. The method of claim 14, further comprising mapping between the second beam indicator ($i_{1,3}$) and the distance ($d_1$, $d_2$) of the second beam based on a table given by:

| Value of $i_{1,3}$ | $N_1 \geq N_2$, $N_1 \geq 4$, $N_2 \neq 1$ | | $N_1 = 3$, $N_2 = 2$ | | $N_1 = 2$, $N_2 = 2$ | | $N_2 > N_1$, $N_2 \geq 4$, $N_1 \neq 1$ | | $N_2 = 3$, $N_1 = 2$ | | $N_1 \geq 8$, $N_2 = 1$ | | $N_1 = 2$, $N_2 = 1$ | | $N_1 = 4$, $N_2 = 1$ | |
|---|---|---|---|---|---|---|---|---|---|---|---|---|---|---|---|---|
| | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ | $d_1$ | $d_2$ |
| 0 | 1 | 0 | 1 | 0 | 1 | 0 | 0 | 1 | 0 | 1 | 1 | 0 | 1 | 0 | 1 | 0 |
| 1 | 2 | 0 | 2 | 0 | 0 | 1 | 0 | 2 | 0 | 2 | 2 | 0 | | | 2 | 0 |
| 2 | 3 | 0 | 0 | 1 | 1 | 1 | 0 | 3 | 1 | 0 | 3 | 0 | | | 3 | 0 |
| 3 | 0 | 1 | 1 | 1 | | | 1 | 0 | 1 | 1 | 4 | 0 | | | | |
| 4 | 1 | 1 | 2 | 1 | | | 1 | 1 | 1 | 2 | 5 | 0 | | | | |
| 5 | 2 | 1 | | | | | 1 | 2 | | | 6 | 0 | | | | |
| 6 | 3 | 1 | | | | | 1 | 3 | | | 7 | 0. | | | | |

19. The method of claim 14, further comprising at least one of:
reporting a single wideband (WB) bit stream that indicates three components jointly, the ($i_{1,1}$, $i_{1,2}$) indicating the first beam, the ($i_{1,3}$) indicating the distance ($d_1$, $d_2$) of the second beam from the first beam, and the ($I_p$) indicating a power of the weight assigned to the second beam; or
reporting multiple WB bit streams that indicate three components separately, a first bit stream for the ($i_{1,1}$, $i_{1,2}$) indicating the first beam, and either a second bit stream jointly indicating the ($i_{1,3}$) and the ($I_p$) for the second beam or a second bit stream and a third bit stream separately indicating the ($i_{1,3}$) and the ($I_p$) for the second beam, respectively.

20. The method of claim 14, further comprising separating the distance ($d_1$, $d_2$) of the second beam in accordance with a PMI ($i_{1,1\text{-}2}$, $i_{1,2\text{-}2}$), wherein the ($d_1$) of the distance ($d_1$, $d_2$) corresponds to a ($i_{1,1\text{-}2}$) of the PMI ($i_{1,1\text{-}2}$, $i_{1,2\text{-}2}$) and the ($d_2$) of the distance ($d_1$, $d_2$) corresponds to a ($i_{1,2\text{-}2}$) of the PMI ($i_{1,1\text{-}2}$, $i_{1,2\text{-}2}$), and wherein if one PMI ($i_3$) or ($i_{1,1\text{-}2}$, $i_{1,2\text{-}2}$) is reported to the BS, a bit width for the PMI is determined by $\lceil \log_2 (L_1 L_2) \rceil$ and if two PMIs, ($i_{1,1\text{-}2}$) and ($i_{1,2\text{-}2}$), are reported to the BS, bit widths for the two PMIs are determined by $\lceil \log_2 (L_1) \rceil$ and $\lceil \log_2 (L_2) \rceil$, respectively.

* * * * *